US007173766B2

United States Patent
Kimura et al.

(10) Patent No.: US 7,173,766 B2
(45) Date of Patent: Feb. 6, 2007

(54) ZOOM LENS, IMAGE MAGNIFICATION PROJECTION SYSTEM AND VIDEO PROJECTOR USING THE ZOOM LENS AND REAR PROJECTOR AND MULTI-VISION SYSTEM USING THE VIDEO PROJECTOR

(75) Inventors: Syunsuke Kimura, Nishinomiya (JP); Masayuki Takahashi, Kawanishi (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/561,073

(22) PCT Filed: May 17, 2004

(86) PCT No.: PCT/JP2004/007003

§ 371 (c)(1),
(2), (4) Date: Dec. 19, 2005

(87) PCT Pub. No.: WO2004/113986

PCT Pub. Date: Dec. 29, 2004

(65) Prior Publication Data

US 2006/0119955 A1     Jun. 8, 2006

(30) Foreign Application Priority Data

Jun. 20, 2003   (JP)   ............................. 2003-177127

(51) Int. Cl.
*G02B 9/00*    (2006.01)
*G02B 15/14*   (2006.01)
(52) U.S. Cl. ...................... 359/649; 359/676
(58) Field of Classification Search ........ 359/676–692, 359/649–651, 754
See application file for complete search history.

(56) References Cited

U.S. PATENT DOCUMENTS

| | | | |
|---|---|---|---|
| 6,038,078 A | 3/2000 | Yamamoto | 359/651 |
| 6,075,653 A | 6/2000 | Narimatsu et al. | 359/686 |
| 6,115,194 A | 9/2000 | Yoneyama | 359/757 |
| 6,147,812 A | 11/2000 | Narimatsu et al. | 359/691 |
| 6,285,509 B1 | 9/2001 | Nakayama et al. | 359/676 |
| 6,480,340 B1 | 11/2002 | Yamamoto | 359/676 |
| 6,809,877 B2 * | 10/2004 | Nagahara | 359/676 |
| 6,816,320 B2 * | 11/2004 | Wada | 359/683 |
| 2002/0018301 A1 | 2/2002 | Narimatsu et al. | 359/683 |

FOREIGN PATENT DOCUMENTS

| | | |
|---|---|---|
| JP | 2000-98222 | 4/2000 |
| JP | 2001-51195 | 2/2001 |
| JP | 2001-205682 | 7/2001 |
| JP | 2001-228398 | 8/2001 |
| JP | 2001-249275 | 9/2001 |
| JP | 2001-311872 | 11/2001 |
| JP | 2002-148515 | 5/2002 |
| JP | 2002-341242 | 11/2002 |

* cited by examiner

*Primary Examiner*—Scott J. Sugarman
*Assistant Examiner*—M. Hasan
(74) *Attorney, Agent, or Firm*—Hamre, Schumann, Mueller & Larson, P.C.

(57) ABSTRACT

The present invention provides a zoom lens that suppresses the generation of unnecessary light and is suitable for a projection lens. The zoom lens is used as a projection lens of a projector in which a prism is located between the projection lens and a spatial optical modulating element B. A lens closest to the spatial optical modulating element B is a meniscus positive lens whose convex surface faces a screen. A refractive index of the meniscus positive lens is 1.75 or more.

9 Claims, 28 Drawing Sheets

ZOOM LENS, IMAGE MAGNIFICATION PROJECTION SYSTEM AND VIDEO PROJECTOR USING THE ZOOM LENS AND REAR PROJECTOR AND MULTI-VISION SYSTEM USING THE VIDEO PROJECTOR

TECHNICAL FIELD

The present invention relates to a zoom lens and a projector that magnifies and projects an image of a spatial optical modulating element onto a screen. In particular, the present invention relates to a zoom lens suitable for a projection lens of a projector using a reflection-type spatial optical modulating element, and a projector using the zoom lens.

BACKGROUND ART

This type of zoom lens is disclosed, e.g., in JP 2001-311872 A, JP 2000-98222 A, JP 2001-51195 A, and JP 2002-148515 A.

In a projector that uses a transmission-type spatial optical modulating element for three primary colors of red, green and blue, a prism (color composition prism) for composing the three colors is located between a projection lens and a spatial optical modulating element. Because of this, the projection lens requires a long back focus. Since spectral characteristics of the color composition prism are dependent on the incident angle, the projector requires an optical system that allows the position of the pupil on the shorter side conjugate distance to be sufficiently far away from the spatial optical modulating element, i.e., an optical system having a telecentricity.

There has been an attempt to improve the degree of freedom in installation of a projector by deviating the optical axis of a projection lens from the center of a projected image. A projector that can vary the amount of deviation between the optical axis of the projection lens and the center of the projected image also has been proposed.

In a projector that uses a reflection-type spatial optical modulating element, a light source should be placed on the same side of the spatial optical modulating element as a projection lens. In this case, it is necessary to arrange the light source so that the illumination light from the light source does not interfere with the projection lens. For this purpose, e.g., the optical axis of the projection lens deviates from the center of the spatial optical modulating element. In this method, however, the amount of deviation between the optical axis of the projection lens and the center of the spatial optical modulating element cannot be varied and has to be fixed.

To vary the amount of deviation between the optical axis of the projection lens and the center of the projected image, it has been proposed that a prism utilizing total internal reflection is located between the projection lens and the spatial optical modulating element. In a projector using this total reflection prism, the projection lens requires a long back focus for arranging the total reflection prism and a telecentricity for maintaining the total reflection conditions. These requirements are the same as those for the projection lens of the projector including a transmission-type spatial optical modulating element.

When a projector includes a reflection-type spatial optical modulating element, a total reflection prism, and a telecentric-type projection lens, unnecessary light is generated and becomes a serious problem. Such unnecessary light is not generated in a projector that includes a transmission-type spatial optical modulating element, a color composition prism, and a telecentric-type projection lens.

The reflection-type spatial optical modulating element has a high reflectance for light from the projection lens. Therefore, unnecessary light caused by the projection lens is reflected from the reflection-type spatial optical modulating element, passes through the projection lens again, and is projected onto the screen.

For the projector including the transmission-type spatial optical modulating element, the color composition prism, and the telecentric-type projection lens, unnecessary light does not become a serious problem because the reflectance of the transmission-type spatial optical modulating element is low. While the transmission-type spatial optical modulating element has a reflectance of 4%, the reflection-type spatial optical modulating element has a reflectance of 90%, which is 22.5 times as high as the reflectance of the transmission-type spatial optical modulating element.

In a projector in which the amount of deviation between the reflection-type spatial optical modulating element and the optical axis of the projection lens is fixed, the amount of deviation is large, and thus the reflection-type spatial optical modulating element is not located at a symmetrical position with respect to the optical axis of the projection lens. Generally, unnecessary light often is generated at the symmetrical position with respect to the optical axis of the projection lens. Therefore, in the projector in which the amount of deviation between the reflection-type spatial optical modulating element and the optical axis of the projection lens is fixed, the unnecessary light caused by the projection lens is not likely to be reflected from the reflection-type spatial optical modulating element, pass through the projection lens again, and is projected onto the screen.

DISCLOSURE OF INVENTION

The present invention was arrived at in order to solve the foregoing problems of the prior art, and it is an object thereof to provide a zoom lens suitable for a projection lens that can have a long back focus, suppress distortion, longitudinal chromatic aberration, and lateral chromatic aberration, and reduce unnecessary light and any change in performance even by changing the projection distance in order to realize a projector that includes a reflection-type spatial optical modulating element and can change the position of a projected image relative to the optical axis of a projection lens, and a projector using the zoom lens.

To achieve the foregoing object, a zoom lens according to the present invention is used as a projection lens of a projector in which a prism is located between the projection lens and a spatial optical modulating element. A lens closest to the spatial optical modulating element is a meniscus positive lens whose convex surface faces a screen. A refractive index of the meniscus positive lens is 1.75 or more.

When this zoom lens is used as a projection lens of a projector in which a prism is located between the projection lens and a spatial optical modulating element, unnecessary reflected light caused by the lens closest to the spatial optical modulating element is not imaged on the spatial optical modulating element. Moreover, the unnecessary light reflected from the spatial optical modulating element travels toward the zoom lens as projection lens at a large angle with respect to the optical axis. Therefore, only part of the unnecessary reflected light caused by the lens closest to the spatial optical modulating element can pass through the zoom lens and reach the screen. The lens closest to the spatial optical modulating element has a high refractive index, and the reflectance of the lens after being subjected to antireflection coating is lower than that of the lens having a low refractive index. Thus, it is possible to reduce the unnecessary reflected light caused by the lens closest to the spatial optical modulating element. Accordingly, it is possible to realize the zoom lens that is capable of suppressing ghosts and obtaining a high-contrast image when the zoom lens is used as a projection lens of a projector having the above configuration.

In the configuration of the zoom lens according to the present invention, it is preferable that the following conditional expression (1) is satisfied:

$$-0.3 < (GLR1/GLnd-Bfw)/fw < -0.05 \quad (1)$$

where GLR1 is a radius of curvature of a surface of the lens closest to the spatial optical modulating element, the surface facing the screen, GLnd is a refractive index at the d-line of the lens, Bfw is an air equivalent back focus of the zoom lens at a wide-angle end, and fw is a focal length of an entire zoom lens system at the wide-angle end.

This preferred example can prevent unnecessary light reflected from the surface of the lens closest to the spatial optical modulating element, the surface facing the screen, from being imaged on the spatial optical modulating element. Moreover, the unnecessary light reflected from the surface of the lens closest to the spatial optical modulating element is reflected again from the spatial optical modulating element and travels toward the zoom lens as projection lens at a large angle with respect to the optical axis. Therefore, only part of the unnecessary reflected light caused by the lens closest to the spatial optical modulating element can pass through the zoom lens and reach the screen. Thus, it is possible to prevent degradation of the quality of a projected image.

In the configuration of the zoom lens according to the present invention, it is preferable that the following conditional expression (2) is satisfied:

$$5 < (GLR2-Bfw)/fw \quad (2)$$

where GLR2 is a radius of curvature of a surface of the lens closest to the spatial optical modulating element, the surface facing the spatial optical modulating element, Bfw is an air equivalent back focus of the zoom lens at a wide-angle end, and fw is a focal length of an entire zoom lens system at the wide-angle end.

This preferred example can prevent unnecessary light reflected from the surface of the lens closest to the spatial optical modulating element, the surface facing the spatial optical modulating element, from being imaged on the spatial optical modulating element.

In the configuration of the zoom lens according to the present invention, it is preferable that the following conditional expression (3) is satisfied:

$$2.5 < fGL/fw < 3.5 \quad (3)$$

where fGL is a focal length of the lens closest to the spatial optical modulating element, and fw is a focal length of an entire zoom lens system at the wide-angle end.

This preferred example can correct the distortion favorably and ensure good balance of aberration between the wide-angle end and the telephoto end.

In the configuration of the zoom lens according to the present invention, it is preferable that an Abbe number of the lens closest to the spatial optical modulating element is 30 or less. This preferred example can suppress the lateral chromatic aberration of the whole lens and improve the performance of the zoom lens.

In the configuration of the zoom lens according to the present invention, it is preferable that the following conditional expression (4) is satisfied:

$$0.01 < PgFGL - 0.6457 + 0.0017 \times vdGL \quad (4)$$

where PgFGL is a partial dispersion of the lens closest to the spatial optical modulating element, and vdGL is an Abbe number of the lens.

This preferred example can suppress the lateral chromatic aberration of three colors of red, green and blue.

In the configuration of the zoom lens according to the present invention, it is preferable that the following conditional expressions (5) and (6) are satisfied:

$$PgFGLn < 0.61 \quad (5)$$

$$(PgFGLn - PgFGL)/(vdGLn - vdGL) < -0.0027 \quad (6)$$

where PgFGLn is a partial dispersion of a negative lens closest to the spatial optical modulating element, vdGLn is an Abbe number of the negative lens, PgFGL is a partial dispersion of the lens closest to the spatial optical modulating element, and vdGL is an Abbe number of the lens.

This preferred example can suppress the lateral chromatic aberration of three colors of red, green and blue.

In the configuration of the zoom lens according to the present invention, the zoom lens may have a first cemented surface, a second cemented surface, and a third cemented surface that are present in the indicated order from the screen side. It is preferable that the following conditional expressions (7) to (11) are satisfied:

$$6 < vdGp1 - vdGn1 < 12 \quad (7)$$

$$PgFGp1 - PgFGn1 < -0.02 \quad (8)$$

$$20 < vdGp2 - vdGn2 < 40 \quad (9)$$

$$|PgFGp2 - PgFGn2| < 0.007 \quad (10)$$

$$|PgFGp3 - PgFGn3| < 0.07 \quad (11)$$

where vdG1p is an Abbe number of a positive lens making up the first cemented surface, PgFG1p is a partial dispersion of the positive lens making up the first cemented surface, vdG1n is an Abbe number of a negative lens making up the first cemented surface, PgFG1n is a partial dispersion of the negative lens making up the first cemented surface, vdG2p is an Abbe number of a positive lens making up the second cemented surface, PgFG2p is a partial dispersion of the positive lens making up the second cemented surface, vdG2n is an Abbe number of a negative lens making up the second cemented surface, PgFG2n is a partial dispersion of the negative lens making up the second cemented surface, PgFG3p is a partial dispersion of a positive lens making up the third cemented surface, and PgFG3n is a partial dispersion of a negative lens making up the third cemented surface.

This preferred example can suppress the lateral chromatic aberration of three colors of red, green and blue.

In this case, it is preferable that the Abbe number of the positive lens making up the second cemented surface is 90 or more. This preferred example can suppress the longitudinal chromatic aberration of three colors of red, green and blue.

In the configuration of the zoom lens according to the present invention, it is preferable that the meniscus positive lens whose convex surface faces the screen, a positive lens, and a positive lens are arranged in the indicated order in a direction from the spatial optical modulating element to the screen. This preferred example not only can diminish the effect of unnecessary light reflected from the surface of the lens closest to the spatial optical modulating element, but also can suppress the spherical aberration. Moreover, this preferred example can diminish the effect of assembly error on the resolving power of the lens.

In the configuration of the zoom lens according to the present invention, it is preferable that the zoom lens includes a first lens group having a negative refractive power, a second lens group having a positive refractive power, a third lens group having a positive refractive power, a fourth lens group having a negative refractive power, and a fifth lens group having a positive refractive power, arranged in the indicated order from the screen side, when zooming from the wide-angle end to the telephoto end, the second lens group, the third lens group, and the fourth lens group are moved toward the screen along the optical axis, while the first lens group and the fifth lens group are stationary, the third lens group is composed of a cemented lens consisting of a positive lens and a negative lens and a cemented lens consisting of a positive lens and a negative lens, arranged in the indicated order from the screen side, and the fourth lens group is composed of a biconcave negative lens, a cemented lens consisting of a biconcave negative lens and a biconvex positive lens, a positive lens, and a positive lens, arranged in the indicated order from the screen side. This preferred example can achieve small distortion and favorable lateral and longitudinal chromatic aberrations for each magnification of the zoom lens.

In the configuration of the zoom lens according to the present invention, it is preferable that the zoom lens includes a first lens group having a negative refractive power, a second lens group having a positive refractive power, a third lens group having a negative refractive power, and a fourth lens group having a positive refractive power, arranged in the indicated order from the screen side, when zooming from the wide-angle end to the telephoto end, the second lens group and the third lens group are moved toward the screen along the optical axis, while the first lens group and the fourth lens group are stationary, and the first lens group is composed of an eleventh lens group having a negative refractive power and a twelfth lens group having a positive refractive power, arranged in the indicated order from the screen side, and a space between the eleventh lens group and the twelfth lens group is changed during focusing. This preferred example can simplify the lens configuration and suppress a variation in aberration caused by changing the projection distance. Moreover, this preferred example can achieve small distortion and favorable lateral and longitudinal chromatic aberrations for each magnification of the zoom lens.

In this case, it is preferable that the twelfth lens group is composed of a meniscus positive lens whose convex surface faces the spatial optical modulating element. This preferred example can suppress the distortion.

In the configuration of the zoom lens according to the present invention, it is preferable that the magnification of the entire zoom lens system ranges from 0.0023 times to 0.0188 times. With this preferred example, it is possible to obtain a projection lens that is capable of realizing a bright and compact projector.

In the configuration of the zoom lens according to the present invention, it is preferable that an F number at a wide-angle end is 1.7. With this preferred example, it is possible to obtain a projection lens that is capable of realizing a bright projector.

In the configuration of the zoom lens according to the present invention, it is preferable that a zoom ratio is 1.3. With this preferred example, it is possible to realize a zoom lens that is capable of obtaining a projector having a large degree of freedom in installation.

A configuration of an image magnification projection system according to the present invention includes a light source, a spatial optical modulating element that is illuminated with light emitted from the light source and forms an optical image, and a projection means for projecting the optical image formed on the spatial optical modulating element. The zoom lens of the present invention is used as the projection means.

The image magnification projection system uses the zoom lens of the present invention as the projection means and thus can project an image while reducing unnecessary light. Accordingly, it is possible to realize the image magnification projection system that is capable of obtaining a projected image in which ghosts and a reduction in contrast are suppressed.

A configuration of a video projector according to the present invention includes a light source, a means for temporally restricting light from the light source to three colors of blue, green and red, a spatial optical modulating element that is illuminated with light emitted from the light source and forms optical images corresponding to the three colors of blue, green and red that are changed temporally, and a projection means for projecting the optical images formed on the spatial optical modulating element. The zoom lens of the present invention is used as the projection means.

The video projector uses the zoom lens of the present invention as the projection means and thus can correct the lateral chromatic aberration favorably, so that the three color images of blue, green and red can be superimposed on the screen without deviating from one another. Accordingly, it is possible to realize the video projector that is capable of obtaining a bright and high-definition image.

A configuration of a rear projector according to the present invention includes the video projector of the present invention, a mirror for bending light projected by the projection means, and a transmission-type screen for displaying an image of the light bent by the mirror.

The rear projector uses the video projector of the present invention, and thus it is possible to realize the rear projector that is capable of obtaining a high-definition projected image.

A configuration of a multi-vision system according to the present invention includes a plurality of systems, each of which includes the video projector of the present invention, a transmission-type screen for displaying an image of light projected by the projection means, and a cabinet, and an image dividing circuit for dividing an image signal and sending the divided image signal to each of the video projectors.

The multi-vision system uses the video projector of the present invention and thus can correct the distortion favorably, so that portions joining the images from the video projectors coincide exactly. Accordingly, it is possible to realize the multi-vision system that is capable of obtaining a high-definition projected image.

DESCRIPTION OF THE INVENTION

Figure 1A:
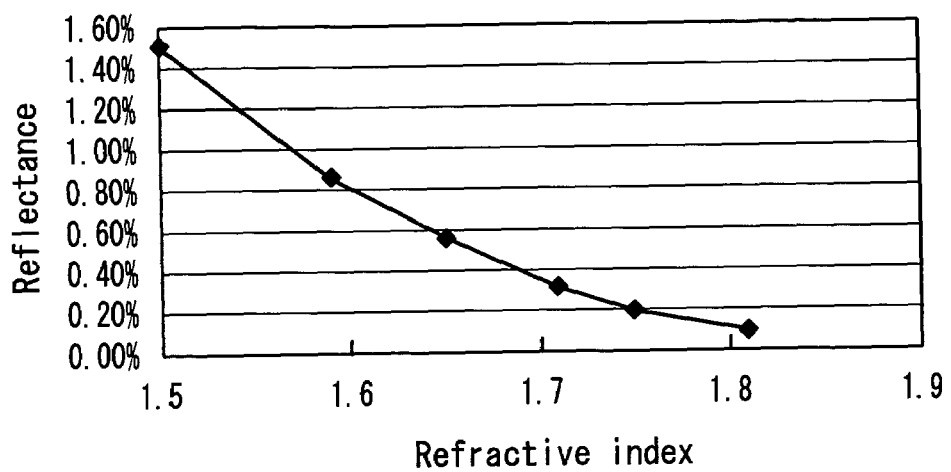
FIG. 1A shows the relationship between a refractive index and a reflectance of a lens closest to a spatial optical modulating element according to a first embodiment of the present invention.

Considering unnecessary light caused by reflection from the lens surfaces of a projection lens and reflection from a reflection-type spatial optical modulating element in a projector, the present invention aims to realize a zoom lens as a projection lens that is capable of reducing the degradation of a projected image due to the unnecessary light while suppressing aberrations by controlling each of the lens surfaces of the projection lens.

In the projection lens (zoom lens), an antireflection coating material is deposited on the lens surfaces to reduce reflection. However, even after the coating treatment, the lens surfaces still have a reflectance of about 0.4%. When a projector includes a reflection-type spatial optical modulating element, light reflected from the lens surfaces of the projection lens (zoom lens) can be damaging unnecessary light. The unnecessary light becomes a problem if it is imaged as a small spot on the reflection-type spatial optical modulating element. In this case, the reflection surface in question is concentric with respect to the reflection-type spatial optical modulating element.

When a prism is located between a projection lens and a spatial optical modulating element in a projector, the projection lens requires a long back focus and a telecentricity. Therefore, it is desirable that a positive lens is used on the side of the projection lens that faces the spatial optical modulating element so as to make the projection lens compact in size. For this positive lens, aberrations should be suppressed because both the axial ray height and chief ray height are high. Thus, the positive lens may be divided into two or three positive lenses having a small refractive power. The height of the axial ray through these positive lenses is high, so that they are configured to have an optimum shape for spherical aberration.

However, the surfaces of the positive lenses for reducing the spherical aberration, the surfaces facing the screen, are likely to be concentric with respect to the spatial optical modulating element.

One possibility to prevent the surfaces of the positive lenses facing the screen from being concentric with respect to the spatial optical modulating element is that a positive lens having a large refractive power is used as the lens closest to the spatial optical modulating element. However, the positive lens with a large refractive power causes large aberrations, and it is difficult to ensure the balance of aberrations for each magnification of zooming.

Another possibility to prevent the surfaces of the positive lenses facing the screen from being concentric with respect to the spatial optical modulating element is that a positive lens having a small refractive power is used as the lens closest to the spatial optical modulating element. Although light rays reflected from the surface of the positive lens facing the screen form a large spot on the reflection-type spatial optical modulating element, the angle between each of the reflected rays and the optical axis is small, and most of the unnecessary light that is reflected again from the reflection-type spatial optical modulating element passes through the projection lens and reaches the screen. Consequently, the projected image does not involve a considerable defect such as ghosts, but is affected by flare and has a low contrast.

Yet another possibility to prevent the surfaces of the positive lenses facing the screen from being concentric with respect to the spatial optical modulating element is that the positive lenses are made of a glass material having a low refractive index, and a positive lens having a large curvature of the surfaces and a large refractive power for reflection is used as the lens closest to the spatial optical modulating element. However, the positive lens with a large refractive power causes large aberrations, and it is difficult to ensure the balance of aberrations for each magnification of zooming.

In the present invention, among the lenses constituting the zoom lens used as a projection lens, the lens closest to the spatial optical modulating element is a meniscus positive lens whose convex surface faces the screen. The meniscus positive lens has a refractive index of 1.75 or more. Accordingly, the lens closest to the spatial optical modulating element can increase the refractive power of the surface facing the screen for the reflected rays from the spatial optical modulating element, and thus unnecessary light is not allowed to reach the screen. Moreover, aberrations can be suppressed without significantly increasing the total refractive power of the lens closest to the spatial optical modulating element, thereby achieving a high-definition zoom lens.

The meaning the refractive index of the meniscus positive lens being 1.75 or more will be described in detail below.

The unnecessary light generated inside the zoom lens, which is used as a projection lens of a projector, causes ghosts or reduces the contrast. When the reflected rays from the lens surfaces of the zoom lens return to the spatial optical modulating element and form a small spot, they can cause ghosts. However, it is possible to design the lens shape so that the reflected rays do not form a small spot. On the other hand, when the reflected rays form a large spot on the spatial optical modulating element and return to the zoom lens, they pass through the zoom lens as projection lens again and reach the screen. These light rays are diffused greatly on the screen, and thus are not recognized as ghosts. However, the portions of the screen at which the light rays have arrived should be black in the projected image, so that the contrast is low and the image quality is poor.

Therefore, it is necessary not only to design the lens shape appropriately, but also to reduce the reflectance of the lens surfaces in order to prevent ghosts and obtain a high-contrast projected image.

Antireflection coatings are applied to the lens surfaces to reduce the reflectance. However, since the available coating materials are limited, the ideal antireflection conditions cannot be satisfied, and the lens surfaces still have a certain reflectance. When magnesium fluoride that is a general coating material is used for coating a lens, the reflectance can be calculated by varying the refractive index of the lens as follows (see FIG. 1A). The reflectance is 1.50% for a refractive index of 1.5, 1.2041% for a refractive index of 1.53, 0.86% for a refractive index of 1.59, 0.614% for a refractive index of 1.63, 0.55% for a refractive index of 1.65, 0.31% for a refractive index of 1.71, 0.2373% for a refractive index of 1.73, 0.18% for a refractive index of 1.75, 0.08% for a refractive index of 1.81, and 0.0426% for a refractive index of 1.83.

The amount of unnecessary light can be estimated by

Amount of unnecessary light=Amount of normal
light×Reflectance of lens×Reflectance at spatial
optical modulating element where the amount of normal light (i.e., the light rays traveling along the normal optical path) is 100.

Figure 1B:
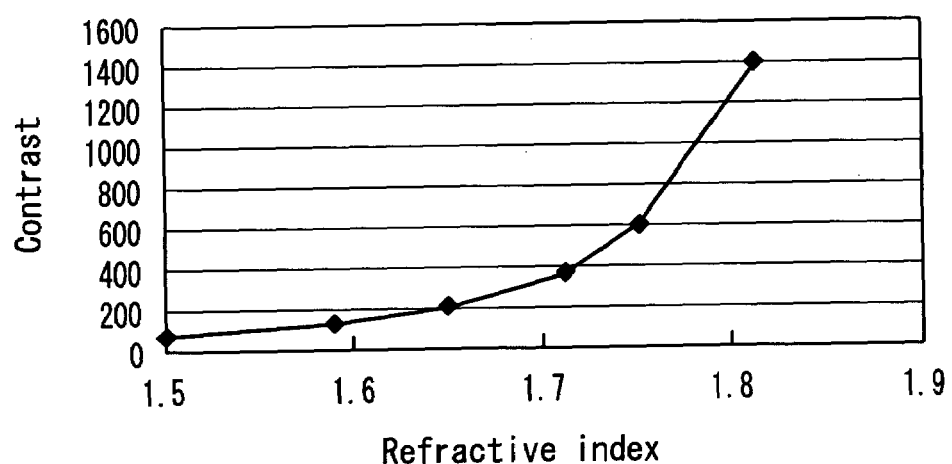
FIG. 1B shows the relationship between a refractive index and a contrast of the lens.

The contrast can be determined by Amount of normal light÷Amount of unnecessary light. The reflectance of the spatial optical modulating element is 90%. Therefore, the contrast can be calculated by varying the refractive index of the lens as follows (see FIG. 1B). The contrast is 74.07407 for a refractive index of 1.5, 92.3 for a refractive index of 1.53, 129.199 for a refractive index of 1.59, 181 for a refractive index of 1.63, 202.0202 for a refractive index of 1.65, 358.4229 for a refractive index of 1.71, 468 for a refractive index of 1.73, 617.284 for a refractive index of 1.75, 1388.889 for a refractive index of 1.81, and 2608 for a refractive index of 1.83.

Table 1 shows the results of the calculations.

TABLE 1

| Refractive index of glass | Reflectance (%) | Contrast | Evaluation |
|---|---|---|---|
| 1.5 | 1.50 | 74.07407 | X |
| 1.53 | 1.2041 | 92.3 | X |
| 1.59 | 0.86 | 129.199 | X |
| 1.63 | 0.614 | 181 | X |
| 1.65 | 0.55 | 202.0202 | X |
| 1.71 | 0.31 | 358.4229 | X |
| 1.73 | 0.2373 | 468 | X |
| 1.75 | 0.18 | 617.284 | ○ |
| 1.81 | 0.08 | 1388.889 | ○ |
| 1.83 | 0.0426 | 2608 | ○ |

Although the highest possible contrast is desirable, a contrast of about 500 is enough for a projector for presentation that is often used in an environment with some degree of brightness. Thus, as can be seen from Table 1, the refractive index of the meniscus positive lens closest to the spatial optical modulating element may be at least 1.75.

The zoom lens to fulfill the object of the present invention has the above configuration and also can provide favorable optical performance by meeting the following requirements.

It is desirable that the following conditional expression (1) is satisfied:

$$-0.3<(GLR1/GLnd-Bfw)/fw<-0.05 \quad (1)$$

where GLR1 is a radius of curvature of a surface of the lens GL closest to the spatial optical modulating element, the surface facing the screen, GLnd is a refractive index at the d-line of the lens GL, Bfw is an air equivalent back focus of the zoom lens at a wide-angle end, and fw is a focal length of an entire zoom lens system at the wide-angle end.

In the conditional expression (1), the radius of curvature GLR1 of the surface of the lens GL closest to the spatial optical modulating element, the surface facing the screen, is defined by the refractive index at the d-line of the lens GL, the air equivalent back focus Bfw of the zoom lens at a wide-angle end, and the focal length fw of the entire zoom lens system at the wide-angle end. When (GLR1/GLnd−Bfw)/fw is −0.3 or less, the refractive power of the surface of the lens GL facing the screen is increased, and aberrations caused by this surface become larger. Therefore, it is difficult to correct the aberrations with the entire lens system. When (GLR1/GLnd−Bfw)/fw is −0.05 or more, the refractive power of the surface of the lens GL facing the screen is decreased, and unnecessary light reflected from this surface forms a small spot on the spatial optical modulating element. Consequently, the unnecessary light reaches the screen and may degrade the quality of a projected image.

It is desirable that the following conditional expression (2) is satisfied:

$$5<(GLR2-Bfw)/fw \quad (2)$$

where GLR2 is a radius of curvature of a surface of the lens GL closest to the spatial optical modulating element, the surface facing the spatial optical modulating element, Bfw is an air equivalent back focus of the zoom lens at the wide-angle end, and fw is a focal length of the entire zoom lens system at the wide-angle end.

In the conditional expression (2), the radius of curvature GLR2 of the surface of the lens GL closest to the spatial optical modulating element, the surface facing the spatial optical modulating element, is defined by the air equivalent back focus of the zoom lens at the wide-angle end and the focal length fw of the entire zoom lens system at the wide-angle end. When (GLR2−Bfw)/fw is 5 or less, unnecessary light reflected from the surface of the lens GL facing the spatial optical modulating element forms a small spot on the spatial optical modulating element. Consequently, the unnecessary light reaches the screen and may degrade the quality of a projected image.

It is desirable that the following conditional expression (3) is satisfied:

$$2.5<fGL/fw<3.5 \quad (3)$$

where fGL is a focal length of the lens GL closest to the spatial optical modulating element, and fw is a focal length of the entire zoom lens system at the wide-angle end.

In the conditional expression (3), the focal length fGL of the lens GL closest to the spatial optical modulating element is defined by the focal length fw of the entire zoom lens system at the wide-angle end. When fGL/fw is 2.5 or less, large aberrations occur, and it becomes difficult to correct the aberrations. When fGL/fw is 3.5 or more, unnecessary light forms a small spot on the spatial optical modulating element. Consequently, the unnecessary light reaches the screen and may degrade the quality of a projected image.

It is desirable that an Abbe number of the lens GL closest to the spatial optical modulating element is 30 or less. The lens GL closest to the spatial optical modulating element is located where the chief ray height is high. Therefore, a requirement for improving the performance of the zoom lens is that the lateral chromatic aberration of the whole lens is suppressed by generating lateral chromatic aberration at a position where lateral chromatic aberration is likely to be generated. When the Abbe number of the lens GL closest to the spatial optical modulating element is 30 or less, the lens GL can control the lateral chromatic aberration so as to suppress the lateral chromatic aberration of the whole lens, thus improving the performance of the zoom lens.

It is desirable that the following conditional expression (4) is satisfied:

$$0.01<PgFGL-0.6457+0.0017\times vdGL \quad (4)$$

where PgFGL is a partial dispersion of the lens GL closest to the spatial optical modulating element, and vdGL is an Abbe number of the lens GL.

The partial dispersion is expressed by $PgF=(ng-nF)/(nF-nC)$ where ng is a refractive index at the g-line, nF is a refractive index at the F-line, and nC is a refractive index at the C-line.

In the conditional expression (4), the partial dispersion PgFGL of the lens GL closest to the spatial optical modulating element is defined by the Abbe number vdGL of the lens GL. When PgFGL−0.6457+0.0017×vdGL is 0.01 or less, the lateral chromatic aberration is over-corrected.

It is desirable that the following conditional expressions (5) and (6) are satisfied:

$$PgFGLn < 0.61 \quad (5)$$

$$(PgFGLn - PgFGL)/(vdGLn - vdGL) < -0.0027 \quad (6)$$

where PgFGLn is a partial dispersion of the negative lens GLn closest to the spatial optical modulating element when viewed from the spatial optical modulating element, vdGLn is an Abbe number of the negative lens GLn, PgFGL is a partial dispersion of the lens GL closest to the spatial optical modulating element, and vdGL is an Abbe number of the lens GL.

In the conditional expression (5), the partial dispersion PgFGLn of the negative lens GLn closest to the spatial optical modulating element is defined. When PgFGLn is 0.61 or more, the lateral chromatic aberration is over-corrected.

In the conditional expression (6), the relationship between the partial dispersion PgFGLn of the negative lens GLn closest to the spatial optical modulating element and the partial dispersion PgFGL of the positive lens GL closest to the spatial optical modulating element is defined by the Abbe number vdGL n of the negative lens GLn and the Abbe number vdGL of the positive lens GL. Thus, the lateral chromatic aberration is balanced between the negative lens GLn closest to the spatial optical modulating element and the positive lens GL closest to the spatial optical modulating element. When (PgFGLn−PgFGL)/(vdGLn−vdGL) is −0.0027 or more, the lateral chromatic aberration is over-corrected.

The present zoom lens has three cemented surfaces: a first cemented surface, a second cemented surface, and a third cemented surface that are present in the indicated order from the screen side. The first cemented surface is made up of a positive lens G1p and a negative lens G1n. The second cemented surface is made up of a positive lens G2p and a negative lens G2n. The third cemented surface is made up of a positive lens G3p and a negative lens G3n. In this case, it is desirable that the following conditional expressions (7) to (11) are satisfied:

$$6 < vdGp1 - vdGn1 < 12 \quad (7)$$

$$PgFGp1 - PgFGn1 < -0.02 \quad (8)$$

$$20 < vdGp2 - vdGn2 < 40 \quad (9)$$

$$|PgFGp2 - PgFGn2| < 0.007 \quad (10)$$

$$|PgFGp3 - PgFGn3| < 0.07 \quad (11)$$

where vdG1p is an Abbe number of a positive lens G1p, PgFG1p is a partial dispersion of the lens G1p, vdG1n is an Abbe number of the lens G1n, PgFG1n is a partial dispersion of the lens G1n, vdG2p is an Abbe number of the lens G2p, PgFG2p is a partial dispersion of the lens G2p, vdG2n is an Abbe number of the lens G2n, PgFG2n is a partial dispersion of the lens G2n, PgFG3p is a partial dispersion of the lens G3p, and PgFG3n is a partial dispersion of the lens G3n.

The conditional expression (7) defines a difference in Abbe number between the positive lens G1p making up the first cemented surface and the negative lens G1n making up the first cemented surface and relates to correction of the lateral chromatic aberration. When vdGp1−vdGn1 is 6 or less, the lateral chromatic aberration is over-corrected. When vdGp1−vdGn1 is 12 or more, the lateral chromatic aberration is under-corrected.

The conditional expression (8) defines a difference in partial dispersion between the positive lens G1p making up the first cemented surface and the negative lens G1n making up the first cemented surface and relates to correction of the lateral chromatic aberration. When PgFGp1−PgFGn1 is −0.02 or more, the lateral chromatic aberration is under-corrected.

The conditional expression (9) defines a difference in Abbe number between the positive lens G2p making up the second cemented surface and the negative lens G2n making up the second cemented surface and relates to correction of the longitudinal chromatic aberration. When vdGp2−vdGn2 is 20 or less, the longitudinal chromatic aberration is over-corrected. When vdGp2−vdGn2 is 40 or more, the longitudinal chromatic aberration is under-corrected.

The conditional expression (10) defines a difference in partial dispersion between the positive lens G2p making up the second cemented surface and the negative lens G2n making up the second cemented surface and relates to correction of the longitudinal chromatic aberration. When |PgFGp2−PgFGn2| is 0.007 or more, the longitudinal chromatic aberration is over-corrected.

The conditional expression (11) defines a difference in partial dispersion between the positive lens G3p making up the third cemented surface and the negative lens G3n making up the third cemented surface and relates to correction of the lateral chromatic aberration. When |PgFGp3−PgFGn3| is 0.07 or more, the lateral chromatic aberration is over-corrected.

It is desirable that the Abbe number of the positive lens G2p making up the second cemented surface is 90 or more. The positive lens G2p making up the second cemented surface is located at an optimum position for correcting the longitudinal chromatic aberration, while having relatively little effect on other aberrations. Therefore, when the Abbe number of the positive lens G2p making up the second cemented surface is 90 or more, the longitudinal chromatic aberration can be suppressed.

In the zoom lens of the present invention, it is desirable that the meniscus positive lens (the positive lens GL closest to the spatial optical modulating element) whose convex surface faces the screen, a positive lens, and a positive lens are arranged in the indicated order in the direction from the spatial optical modulating element to the screen. These lenses are located where the axial ray height is high and may affect the spherical aberration significantly. Therefore, this configuration can suppress the spherical aberration at both the wide-angle end and the telephoto end.

It is desirable that the zoom lens of the present invention includes a first lens group having a negative refractive power, a second lens group having a positive refractive power, a third lens group having a positive refractive power, a fourth lens group having a negative refractive power, and a fifth lens group having a positive refractive power, arranged in the indicated order from the screen side, when zooming from the wide-angle end to the telephoto end, the second lens group, the third lens group, and the fourth lens group are moved toward the screen along the optical axis, while the first lens group and the fifth lens group are stationary, the third lens group is composed of a cemented lens consisting of a positive lens and a negative lens and a cemented lens consisting of a positive lens and a negative lens, arranged in the indicated order from the screen side, and the fourth lens group is composed of a biconcave negative lens, a cemented lens consisting of a biconcave negative lens and a biconvex positive lens, a positive lens, and a positive lens, arranged in the indicated order from the screen side.

In the zoom lens of the present invention, it is desirable that the magnification of an entire zoom lens system ranges from 0.0023 times to 0.0188 times.

In the zoom lens of the present invention, it is desirable that the zoom ratio is 1.3.

To obtain an F number, a long back focus, a telecentricity, a relative illumination, and a zoom ratio required for a projection lens of a projector, the zoom lens of the present invention includes the first lens group having a negative refractive power, the second lens group having a positive refractive power, the third lens group having a positive refractive power, the fourth lens group having a negative refractive power, and the fifth lens group having a positive refractive power, arranged in the indicated order from the screen side, and when zooming from the wide-angle end to the telephoto end, the second lens group, the third lens group, and the fourth lens group are moved toward the screen along the optical axis, while the first lens group and the fifth lens group are stationary. With this configuration, it is possible to realize the zoom lens that is capable of being compact in size and suppressing the lateral chromatic aberration and the distortion.

The height of the axial ray through the third lens group is high. Therefore, the third lens group is located at an important position to correct the spherical aberration or the longitudinal chromatic aberration. Consequently, it is possible to suppress the longitudinal chromatic aberration by configuring the third lens group including the cemented lens consisting of a positive lens and a negative lens and the cemented lens consisting of a positive lens and a negative lens, arranged in the indicated order from the screen side.

The height of the axial ray through the fourth lens group is high, and the height of the axial ray through the fourth lens group is changed between the wide-angle end and the telephoto end. Therefore, the fourth lens group is located at an important position to correct the spherical aberration. Consequently, it is possible to suppress the spherical aberration at both the wide-angle end and the telephoto end by configuring the fourth lens group including the biconcave negative lens, the cemented lens consisting of a biconcave negative lens and a biconvex positive lens, the positive lens, and the positive lens, arranged in the indicated order from the screen side.

It is desirable that the zoom lens of the present invention includes a first lens group having a negative refractive power, a second lens group having a positive refractive power, a third lens group having a negative refractive power, and a fourth lens group having a positive refractive power, arranged in the indicated order from the screen side, when zooming from the wide-angle end to the telephoto end, the second lens group and the third lens group are moved toward the screen along the optical axis, while the first lens group and the fourth lens group are stationary, and the first lens group is composed of an eleventh lens group having a negative refractive power and a twelfth lens group having a positive refractive power, arranged in the indicated order from the screen side, and a space between the eleventh lens group and the twelfth lens group is changed during focusing.

To obtain an F number, a long back focus, a telecentricity, a relative illumination, and a zoom ratio required for a projection lens of a projector, the zoom lens of the present invention includes the first lens group having a negative refractive power, the second lens group having a positive refractive power, the third lens group having a negative refractive power, and the fourth lens group having a positive refractive power, arranged in the indicated order from the screen side, and when zooming from the wide-angle end to the telephoto end, the second lens group and the third lens group are moved toward the screen along the optical axis, while the first lens group and the fourth lens group are stationary. With this configuration, it is possible to realize the zoom lens that is capable of being compact in size and suppressing the lateral chromatic aberration and the distortion.

The first lens group is moved along the optical axis for focusing. The first lens group includes the eleventh lens group having a negative refractive power and the twelfth lens group having a positive refractive power, and focusing is performed by changing a space between the eleventh lens group and the twelfth lens group, so that the movement of the first lens group can be reduced during focusing. Thus, it is possible to suppress a variation in aberration caused by changing the projection distance and to increase the range of the projection distance.

It is desirable that the twelfth lens group is composed of a meniscus positive lens whose convex surface faces the spatial optical modulating element. The twelfth lens group is located where the chief ray height is high and may affect the distortion significantly. Therefore, the twelfth lens group having the above configuration can suppress the distortion.

First Embodiment

Figure 2:
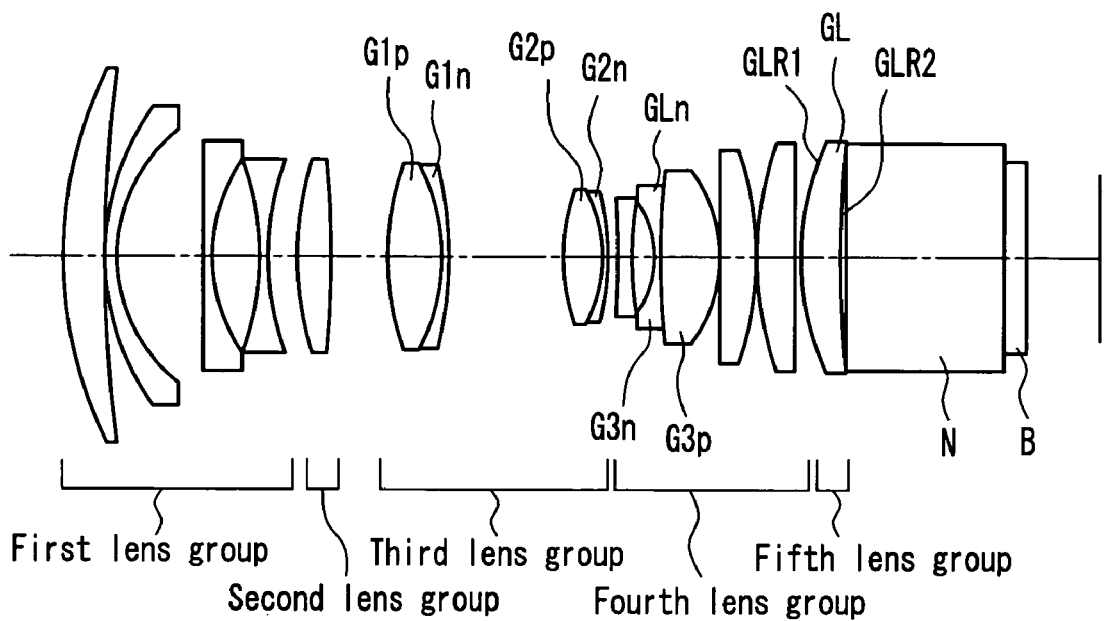
FIG. 2 shows the configuration of a zoom lens at the wide-angle end according to a first embodiment of the present invention.
Figure 3:
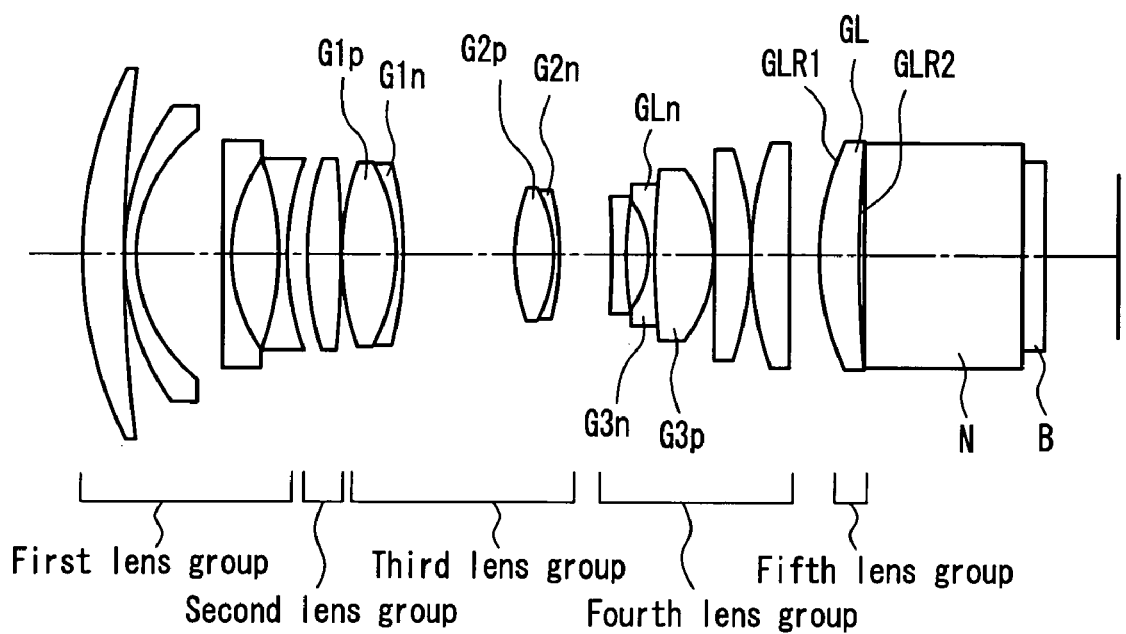
FIG. 3 shows the configuration of a zoom lens at the telephoto end according to a first embodiment of the present invention.

A zoom lens according to a first embodiment of the present invention will be described with reference to the drawings. FIG. 2 shows the configuration of a zoom lens at the wide-angle end according to the first embodiment of the present invention. FIG. 3 shows the configuration of the zoom lens at the telephoto end according to the first embodiment of the present invention (FIGS. 2 and 3 also show a zoom lens in Example 1, which will be described later).

As shown in FIG. 2, the zoom lens of this embodiment includes a first lens group having a negative refractive power, a second lens group having a positive refractive power, a third lens group having a positive refractive power, a fourth lens group having a negative refractive power, and a fifth lens group having a positive refractive power (five group configuration), arranged in the indicated order from the screen side (on the left side in FIG. 2). In FIG. 2, N denotes a glass block such as a prism, and B denotes a reflection-type spatial optical modulating element.

As shown in FIGS. 2 and 3, when zooming from a wide-angle end to a telephoto end, the second lens group, the third lens group, and the fourth lens group are moved toward the screen along the optical axis, while the first lens group and the fifth lens group are stationary.

The first lens group is composed of four lenses, i.e., a positive lens, a negative lens, a negative lens, and a negative lens, arranged in the indicated order from the screen side. The positive lens closest to the screen is designed to generate higher order distortion, thereby suppressing the distortion of the entire lens system. To prevent lateral chromatic aberration from occurring due to the higher order distortion, the positive lens is made of a glass material with a large Abbe number. Moreover, the refractive index of the positive lens is high enough not to increase the astigmatism. The negative lenses are made of a glass material with a large Abbe number so as to suppress the chromatic aberration.

The second lens group is composed of a single positive lens and used to suppress a variation in aberration by zooming.

The third lens group is a variable magnification lens group and includes a first cemented lens consisting of a positive lens and a negative lens and a second cemented lens consisting of a positive lens and a negative lens, arranged in the indicated order from the screen side. An aperture stop is arranged between the first cemented lens and the second cemented lens. To suppress the lateral chromatic aberration, the first cemented lens is made of glass materials having a small difference in Abbe number and a large difference in partial dispersion ratio. In this case, increasing the partial dispersion ratio of the negative lens can relieve over-correction for the blue lateral chromatic aberration that occurs on the periphery of a screen. To suppress the longitudinal chromatic aberration, the second cemented lens is made of glass materials having a large difference in Abbe number and a small difference in partial dispersion ratio. In this case, increasing the Abbe number and the partial dispersion ratio of the positive lens can relieve over-correction for the blue longitudinal chromatic aberration.

The fourth lens group is designed to suppress variations in focal position by zooming, thereby reducing variations in telecentricity and distortion. The fourth lens group is composed of a biconcave negative lens, a cemented lens consisting of a biconcave negative lens and a biconvex positive lens, a positive lens, and a positive lens, arranged in the indicated order from the screen side. The negative lens of the cemented lens has a large refractive power and is made of a glass material with a small partial dispersion ratio. Thus, the lateral and longitudinal chromatic aberrations can be corrected favorably. When the two positive lenses located closer to the spatial optical modulating element B have a small refractive power, it is possible to ensure tolerance of the lens assembly.

The fifth lens group does not shift its position during zooming, and therefore the effective diameter of the lens can be minimized. The fifth lens group is composed of a single positive lens. The fifth lens group is important for ghosts and contrast. When light is emitted from the spatial optical modulating element B and passes through the fifth lens group, only part of the light is reflected from the fifth lens group and returns to the spatial optical modulating element B. The return light is reflected again from the spatial optical modulating element B, passes through the zoom lens as projection lens, and reaches the screen, thus resulting in unnecessary light. This unnecessary light appears as ghosts or a reduction in contrast. For a transmission-type spatial optical modulating element, there is no problem because the reflectance is low when the light is reflected again from the spatial optical modulating element. For a reflection-type spatial optical modulating element, however, the intensity of unnecessary light is increased to the extent that it is not negligible. Therefore, if light is reflected from the inside of the zoom lens and forms a small spot on the spatial optical modulating element B, it may act as a ghost and degrade the image quality significantly. This phenomenon occurs when the position of center of curvature of the surface of the zoom lens (projection lens) is equal to the position of the spatial optical modulating element B. The surface of the fifth lens group facing the screen is likely to meet the above conditions. A first desirable requirement for suppressing ghosts or a reduction in contrast is that the light rays reflected from the surface of the zoom lens (projection lens) are imaged on the same side of the spatial optical modulating element B as the screen. In this case, the spot of the reflected light on the spatial optical modulating element B is larger, while the F number of the reflected light is smaller. Accordingly, most of the light that passes through the zoom lens (projection lens) again and travels toward the screen is cut by the aperture stop in the zoom lens (projection lens), so that the amount of light reaching the screen is decreased. A second desirable requirement for suppressing ghosts or a reduction in contrast is that the light rays reflected from the surface of the zoom lens (projection lens) are imaged on the opposite side of the spatial optical modulating element B from the screen, and the image is farther away from the spatial optical modulating element B. In this case, although the spot of the reflected light on the spatial optical modulating element B is larger, the F number of the reflected light is larger. Accordingly, most of the light passes through the zoom lens (projection lens) and reaches the screen, so that no ghost occurs, but the contrast is reduced. The positive lens (located closest to the spatial optical modulating element B) of the fifth lens group preferably has a meniscus shape whose convex surface faces the screen to suppress ghosts or a reduction in contrast. The meniscus shape can reduce the radius of curvature of the surface facing the screen and increase the refractive power for light to be reflected from this surface without increasing the refractive power of the positive lens. When the positive lens of the fifth lens group is biconvex instead of meniscus, and the radius of curvature of the surface of this lens facing the screen is reduced to deal with the problems of ghosts and contrast, the refractive power of the positive lens is increased and makes the aberration correction difficult. In particular, it is difficult to suppress a variation in aberration by zooming. The refractive power of the positive lens may be reduced by reducing the refractive index of the glass material. In such a case, however, the Petzval sum is increased, and the field curvature cannot be corrected easily.

This embodiment can provide a compact zoom lens that suppresses ghosts or a reduction in contrast and is optimum for a projector using a reflection-type spatial optical modulating element.

Hereinafter, a zoom lens of this embodiment will be described in more detail by way of specific examples.

EXAMPLE 1

FIG. 2 shows the configuration of a zoom lens at the wide-angle end in Example 1 according to the first embodiment of the present invention. FIG. 3 shows the configuration of the zoom lens at the telephoto end in Example 1 according to the first embodiment of the present invention.

In this example, a zoom lens having an F number $F_{NO}$ of 1.7, a focal length f of 23.95 mm, and a half angle of view W of 27.75° at the wide-angle end was designed based on the configuration of the present invention so as not to cause ghosts or reduce the contrast.

Table 2 shows a specific numerical example. In Table 2, ri denotes the radius of curvature of the lens surfaces, di denotes the lens thickness or the distance between the lens surfaces, ni denotes the refractive index at the d line of the lenses, and vi denotes the Abbe number at the d line of the lenses (theses are also applicable to the another examples described later).

TABLE 2

| | |
|---|---|
| Conditional expression (1) | (GLR1/GLnd − Bfw)/fw = −0.1315 |
| Conditional expression (2) | (GLR2 − Bfw)/fw = 6.976 |
| Conditional expression (3) | fGL/fw = 3.291 |
| Conditional expression (4) | PgFGL − 0.6457 + 0.0017 × vdGL = 0.0137 |

TABLE 2-continued

| Conditional expression (5) | PgFGLn = 0.609 |
|---|---|
| Conditional expression (6) | (PgFGLn − PgFGL)/(vdGLn − vdGL) = −0.0037 |
| Conditional expression (7) | vdGp1 − vdGn1 = 8.3 |
| Conditional expression (8) | PgFGp1 − PgFGn1 = −0.0233 |
| Conditional expression (9) | vdGp2 − vdGn2 = 29.02 |
| Conditional expression (10) | |PgFGp2 − PgFGn2| = 0.0056 |
| Conditional expression (11) | |PgFGp3 − PgFGn3| = 0.0688 |

| Radius of curvature (mm) | Axial distance between surfaces (mm) | Refractive index (d line) | Abbe number (d line) |
|---|---|---|---|
| r1 = 68.397 | d1 = 6.5 | n1 = 1.80420 | ν1 = 46.50 |
| r2 = 239.747 | d2 = 0.2 | | |
| r3 = 42.601 | d3 = 1.6 | n2 = 1.77250 | ν2 = 49.62 |
| r4 = 26.600 | d4 = 12.9 | | |
| r5 = 270.537 | d5 = 1.5 | n3 = 1.60311 | ν3 = 60.69 |
| r6 = 26.764 | d6 = 7.5 | | |
| r7 = −54.374 | d7 = 1.4 | n4 = 1.49700 | ν4 = 81.61 |
| r8 = 42.343 | d8 = 4.8 | | |
| r9 = 66.067 | d9 = 5.0 | n5 = 1.83500 | ν5 = 42.98 |
| r10 = −186.947 | d10 = 9.2 | | |
| r11 = 50.223 | d11 = 8.4 | n6 = 1.64769 | ν6 = 33.84 |
| r12 = −30.869 | d12 = 1.0 | n7 = 1.80518 | ν7 = 25.46 |
| r13 = −72.041 | d13 = 18.4 | | |
| r14 = 60.417 | d14 = 5.0 | n8 = 1.45650 | ν8 = 90.27 |
| r15 = −23.818 | d15 = 1.0 | n9 = 1.58913 | ν9 = 61.25 |
| r16 = −35.656 | d16 = 2.2 | | |
| r17 = −112.071 | d17 = 2.2 | n10 = 1.71736 | ν10 = 29.50 |
| r18 = 43.684 | d18 = 3.5 | | |
| r19 = −16.985 | d19 = 1.0 | n11 = 1.75520 | ν11 = 27.53 |
| r20 = 77.377 | d20 = 9.1 | n12 = 1.60311 | ν12 = 60.69 |
| r21 = −22.845 | d21 = 0.2 | | |
| r22 = −2626.417 | d22 = 5.5 | n13 = 1.77250 | ν13 = 49.62 |
| r23 = −57.487 | d23 = 0.2 | | |
| r24 = 52.434 | d24 = 5.7 | n14 = 1.60311 | ν14 = 60.69 |
| r25 = 168.606 | d25 = 1.3 | | |
| r26 = 48.037 | d26 = 6.1 | n15 = 1.78472 | ν15 = 25.72 |
| r27 = 197.165 | d27 = 0.8 | | |
| r28 = 0.000 | d28 = 25.0 | n16 = 1.58913 | ν16 = 61.25 |
| r29 = 0.000 | d29 = 3.0 | n17 = 1.51680 | ν17 = 64.20 |

Zoom Data

| | Wide-angle end | Telephoto end |
|---|---|---|
| d8 = | 4.79 | 2.859 |
| d10 = | 9.1988 | 0.4289 |
| d16 = | 2.213 | 8.094 |
| d25 = | 1.31 | 6.1309 |

Figure 4:
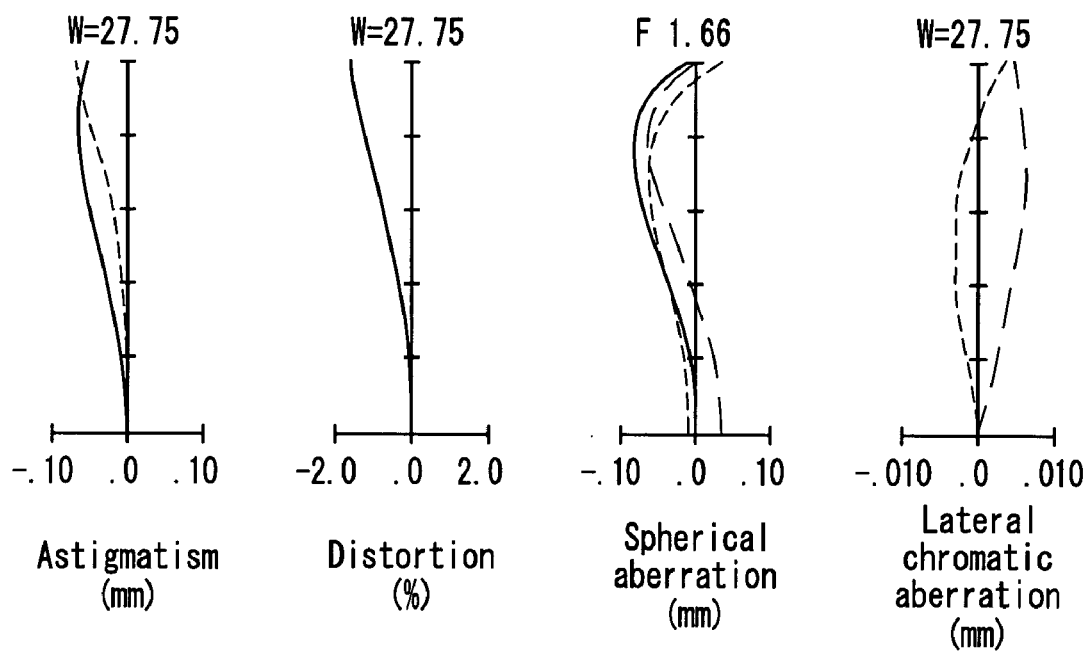
FIG. 4 shows the aberration graphs of a zoom lens at the wide-angle end in Example 1 according to a first embodiment of the present invention.
Figure 5:
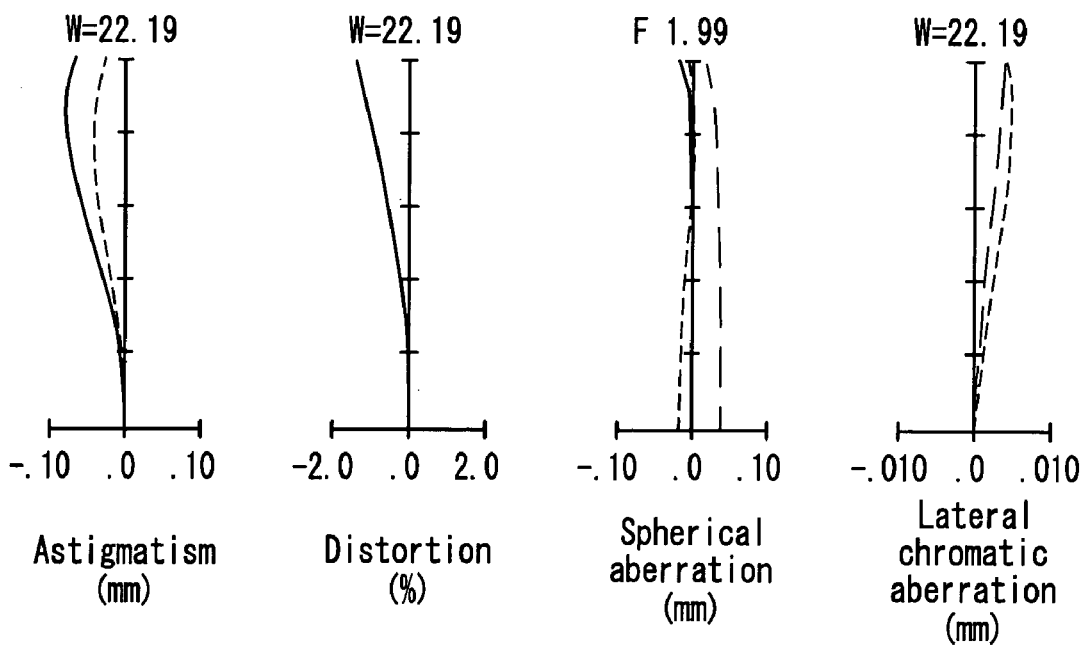
FIG. 5 shows the aberration graphs of a zoom lens at the telephoto end in Example 1 according to a first embodiment of the present invention.

FIG. 4 shows astigmatism (mm), distortion (%), spherical aberration (mm), and lateral chromatic aberration (mm) at the wide-angle end of the zoom lens according to this example. FIG. 5 shows astigmatism (mm), distortion (%), spherical aberration (mm), and lateral chromatic aberration (mm) at the telephoto end of the zoom lens according to this example. In the graph of the astigmatism, the solid line indicates a sagittal field curvature, and the broken line indicates a meridional field curvature. In the graphs of the spherical aberration and the lateral chromatic aberration, the solid line indicates a value for the d line, the short broken line indicates a value for the F line, and the long broken line indicates a value for the C line (these are also applicable to the another examples described later).

EXAMPLE 2

Figure 6:
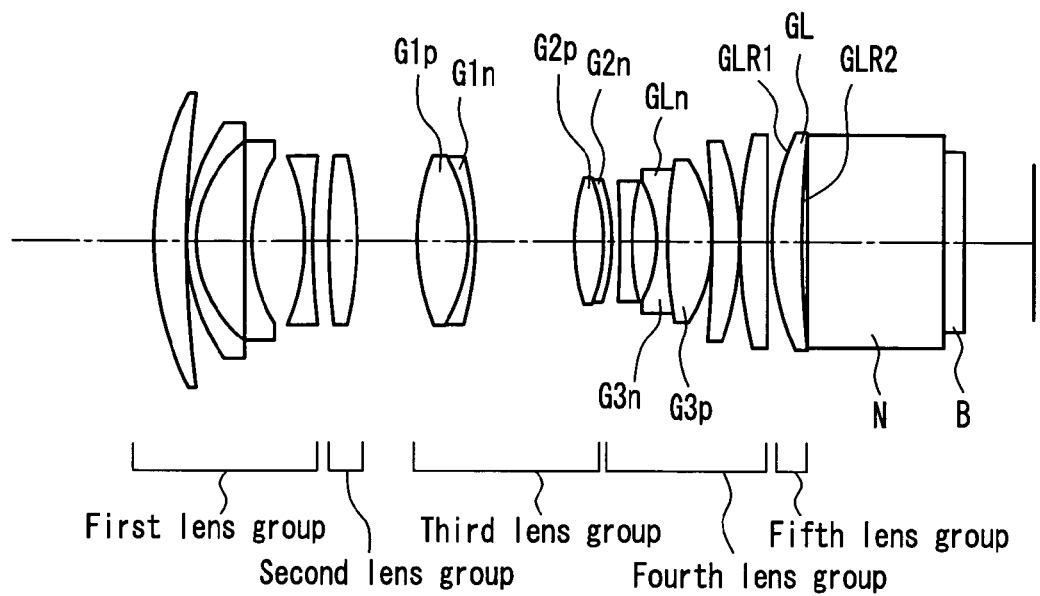
FIG. 6 shows the configuration of a zoom lens at the wide-angle end in Example 2 according to a first embodiment of the present invention.
Figure 7:
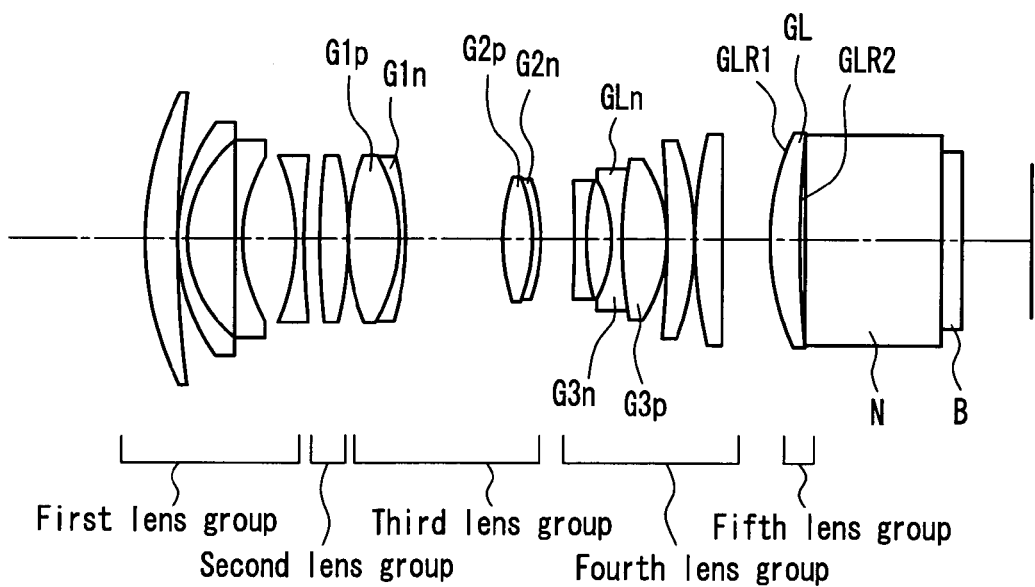
FIG. 7 shows the configuration of a zoom lens at the telephoto end in Example 2 according to a first embodiment of the present invention.

FIG. 6 shows the configuration of a zoom lens at the wide-angle end in Example 2 according to the first embodiment of the present invention. FIG. 7 shows the configuration of the zoom lens at the telephoto end in Example 2 according to the first embodiment of the present invention.

In this example, a zoom lens having an F number $F_{NO}$ of 1.7, a focal length f of 23.90 mm, and a half angle of view W of 27.81° at the wide-angle end was designed based on the configuration of the present invention so as not to cause ghosts or reduce the contrast.

Table 3 shows a specific numerical example.

TABLE 3

| Conditional expression (1) | (GLR1/GLnd − Bfw)/fw = −0.2678 |
|---|---|
| Conditional expression (2) | (GLR2 − Bfw)/fw = 10.077 |
| Conditional expression (3) | fGL/fw = 2.824 |
| Conditional expression (4) | PgFGL − 0.6457 + 0.0017 × vdGL = 0.0137 |
| Conditional expression (5) | PgFGLn = 0.609 |
| Conditional expression (6) | (PgFGLn − PgFGL)/(vdGLn − vdGL) = −0.0037 |
| Conditional expression (7) | vdGp1 − vdGn1 = 8.3 |
| Conditional expression (8) | PgFGp1 − PgFGn1 = −0.0233 |
| Conditional expression (9) | vdGp2 − vdGn2 = 29.02 |
| Conditional expression (10) | |PgFGp2 − PgFGn2| = 0.0056 |
| Conditional expression (11) | |PgFGp3 − PgFGn3| = 0.0608 |

| Radius of curvature (mm) | Axial distance between surfaces (mm) | Refractive index (d line) | Abbe number (d line) |
|---|---|---|---|
| r1 = 54.648 | d1 = 6.5 | n1 = 1.80420 | ν1 = 46.50 |
| r2 = 188.068 | d2 = 0.2 | | |
| r3 = 41.959 | d3 = 1.6 | n2 = 1.77250 | ν2 = 49.62 |
| r4 = 23.133 | d4 = 7.7 | | |
| r5 = 316.256 | d5 = 1.5 | n3 = 1.60311 | ν3 = 60.69 |
| r6 = 25.598 | d6 = 10.0 | | |
| r7 = −42.359 | d7 = 1.4 | n4 = 1.49700 | ν4 = 81.61 |
| r8 = 91.398 | d8 = 3.1 | | |
| r9 = 224.823 | d9 = 5.0 | n5 = 1.83500 | ν5 = 42.98 |
| r10 = −80.326 | d10 = 11.6 | | |
| r11 = 43.250 | d11 = 8.4 | n6 = 1.64769 | ν6 = 33.84 |
| r12 = −32.362 | d12 = 1.0 | n7 = 1.80518 | ν7 = 25.46 |
| r13 = −81.239 | d13 = 18.4 | | |
| r14 = 49.320 | d14 = 5.0 | n8 = 1.45650 | ν8 = 90.27 |
| r15 = −24.951 | d15 = 1.0 | n9 = 1.58913 | ν9 = 61.25 |
| r16 = −39.851 | d16 = 2.2 | | |
| r17 = −116.231 | d17 = 2.0 | n10 = 1.71736 | ν10 = 29.50 |
| r18 = 43.783 | d18 = 5.1 | | |
| r19 = −18.518 | d19 = 1.0 | n11 = 1.75520 | ν11 = 27.53 |
| r20 = 54.935 | d20 = 8.1 | n12 = 1.62000 | ν12 = 62.19 |
| r21 = −25.371 | d21 = 0.2 | | |
| r22 = −175.768 | d22 = 5.4 | n13 = 1.77250 | ν13 = 49.62 |
| r23 = −51.972 | d23 = 0.2 | | |
| r24 = 74.777 | d24 = 4.4 | n14 = 1.60311 | ν14 = 60.69 |
| r25 = 0.000 | d25 = 1.3 | | |
| r26 = 45.039 | d26 = 5.5 | n15 = 1.78472 | ν15 = 25.72 |
| r27 = 272.468 | d27 = 0.8 | | |
| r28 = 0.000 | d28 = 25.0 | n16 = 1.58913 | ν16 = 61.25 |
| r29 = 0.000 | d29 = 3.0 | n17 = 1.51680 | ν17 = 64.20 |

Zoom Data

| | Wide-angle end | Telephoto end |
|---|---|---|
| d8 = | 3.0825 | 2.939 |
| d10 = | 11.6199 | 0.4289 |
| d16 = | 2.213 | 6.4804 |
| d25 = | 1.27 | 9.299 |

Figure 8:
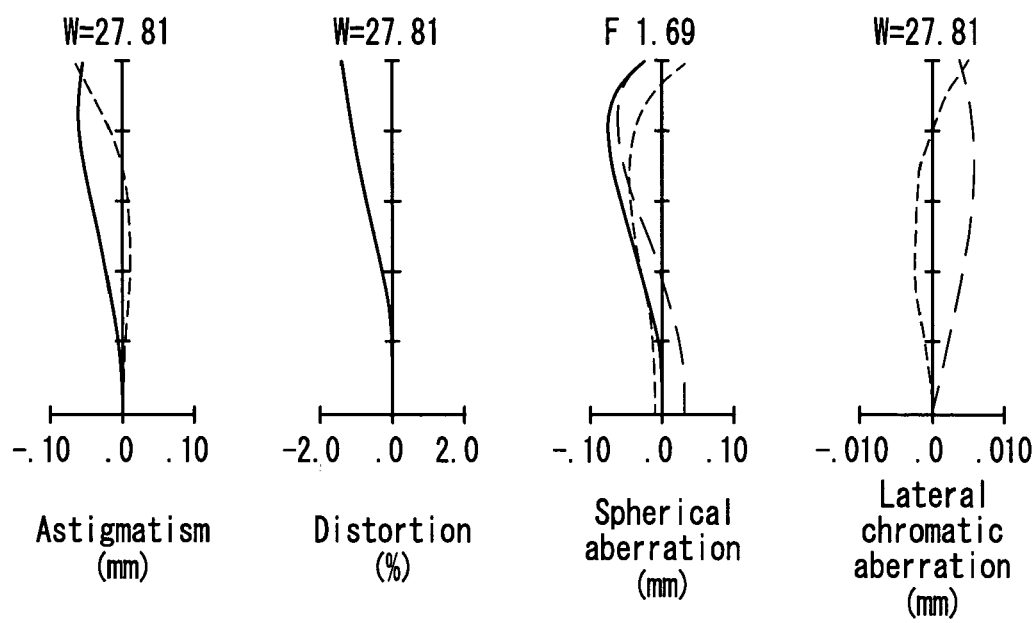
FIG. 8 shows the aberration graphs of a zoom lens at the wide-angle end in Example 2 according to a first embodiment of the present invention.
Figure 9:
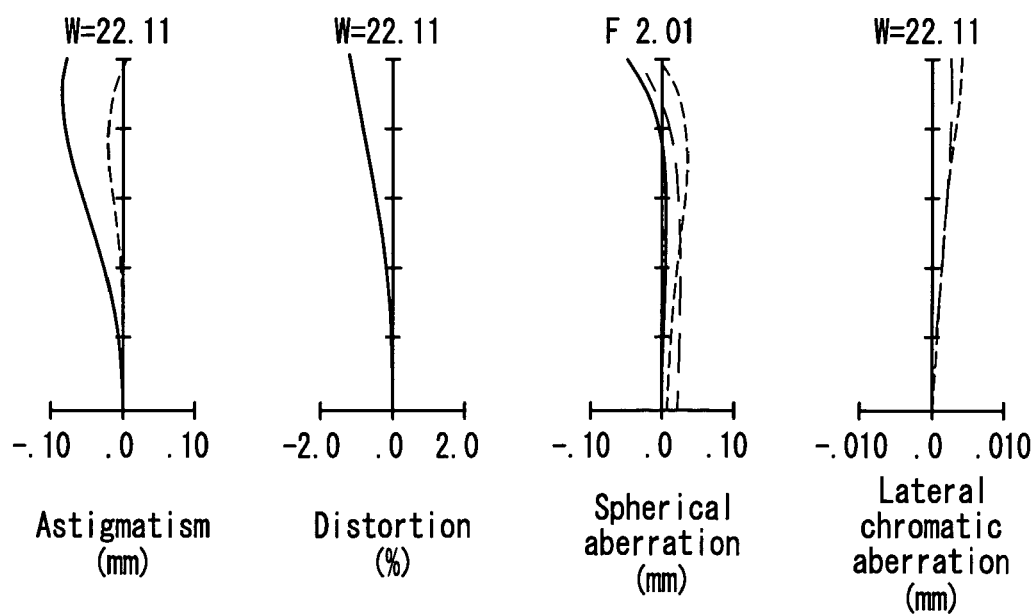
FIG. 9 shows the aberration graphs of a zoom lens at the telephoto end in Example 2 according to a first embodiment of the present invention.

FIG. 8 shows astigmatism (mm), distortion (%), spherical aberration (mm), and lateral chromatic aberration (mm) at the wide-angle end of the zoom lens according to this example. FIG. 9 shows astigmatism (mm), distortion (%), spherical aberration (mm), and lateral chromatic aberration (mm) at the telephoto end of the zoom lens according to this example.

EXAMPLE 3

Figure 11:
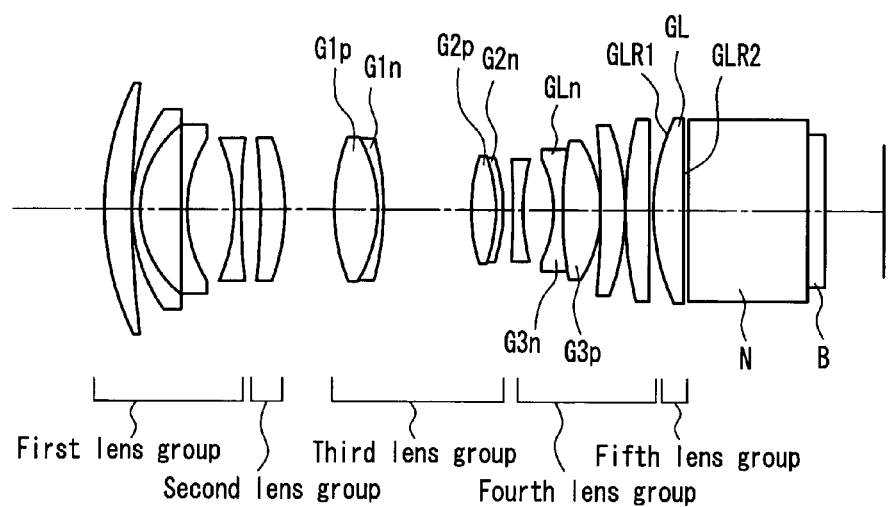
FIG. 11 shows the configuration of a zoom lens at the wide-angle end in Example 3 according to a first embodiment of the present invention.
Figure 12:
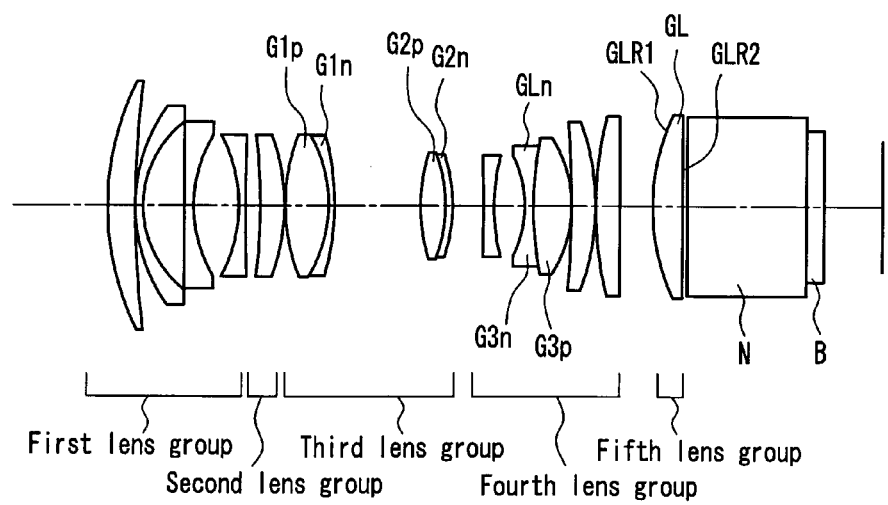
FIG. 12 shows the configuration of a zoom lens at the telephoto end in Example 3 according to a first embodiment of the present invention.

FIG. 11 shows the configuration of a zoom lens at the wide-angle end in Example 3 according to the first embodiment of the present invention. FIG. 12 shows the configuration of the zoom lens at the telephoto end in Example 3 according to the first embodiment of the present invention.

In this example, a zoom lens having an F number $F_{NO}$ of 1.7, a focal length f of 24.02 mm, and a half angle of view W of 27.69° at the wide-angle end was designed based on the configuration of the present invention so as not to cause ghosts or reduce the contrast.

Table 4 shows a specific numerical example.

TABLE 4

| Conditional expression (1) | (GLR1/GLnd − Bfw)/fw = −0.074 |
|---|---|
| Conditional expression (2) | (GLR2 − Bfw)/fw = 350.2 |
| Conditional expression (3) | fGL/fw = 2.822 |
| Conditional expression (4) | PgFGL − 0.6457 + 0.0017 × vdGL = 0.0137 |
| Conditional expression (5) | PgFGLn = 0.609 |
| Conditional expression (6) | (PgFGLn − PgFGL)/(vdGLn − vdGL) = −0.0037 |
| Conditional expression (7) | vdGp1 − vdGn1 = 8.3 |
| Conditional expression (8) | PgFGp1 − PgFGn1 = −0.0233 |
| Conditional expression (9) | vdGp2 − vdGn2 = 29.02 |
| Conditional expression (10) | |PgFGp2 − PgFGn2| = 0.0056 |
| Conditional expression (11) | |PgFGp3 − PgFGn3| = 0.0688 |

| Radius of curvature (mm) | Axial distance between surfaces (mm) | Refractive index (d line) | Abbe number (d line) |
|---|---|---|---|
| r1 = 52.673 | d1 = 6.5 | n1 = 1.80420 | v1 = 46.50 |
| r2 = 184.619 | d2 = 0.2 | | |
| r3 = 40.589 | d3 = 1.6 | n2 = 1.77250 | v2 = 49.62 |
| r4 = 22.445 | d4 = 7.7 | | |
| r5 = 508.072 | d5 = 1.5 | n3 = 1.60311 | v3 = 60.69 |
| r6 = 24.888 | d6 = 10.0 | | |
| r7 = −33.592 | d7 = 1.4 | n4 = 1.49700 | v4 = 81.61 |
| r8 = 1310.356 | d8 = 3.8 | | |
| r9 = −141.278 | d9 = 5.0 | n5 = 1.83500 | v5 = 42.98 |
| r10 = −48.003 | d10 = 10.6 | | |
| r11 = 41.009 | d11 = 8.4 | n6 = 1.64769 | v6 = 33.84 |
| r12 = −33.196 | d12 = 1.0 | n7 = 1.80518 | v7 = 25.46 |
| r13 = −96.420 | d13 = 18.4 | | |
| r14 = 44.646 | d14 = 5.0 | n8 = 1.45650 | v8 = 90.27 |
| r15 = −30.308 | d15 = 1.0 | n9 = 1.58913 | v9 = 61.25 |
| r16 = −46.486 | d16 = 2.2 | | |
| r17 = −6338.448 | d17 = 2.0 | n10 = 1.71736 | v10 = 29.50 |
| r18 = 37.223 | d18 = 6.4 | | |
| r19 = −18.356 | d19 = 1.0 | n11 = 1.75520 | v11 = 27.53 |
| r20 = 49.754 | d20 = 8.1 | n12 = 1.60311 | v12 = 60.69 |
| r21 = −26.403 | d21 = 0.2 | | |
| r22 = −197.682 | d22 = 5.4 | n13 = 1.77250 | v13 = 49.62 |
| r23 = −54.292 | d23 = 0.2 | | |
| r24 = 69.359 | d24 = 4.4 | n14 = 1.60311 | v14 = 60.69 |
| r25 = 0.000 | d25 = 1.3 | | |
| r26 = 53.314 | d26 = 5.5 | n15 = 1.78472 | v15 = 25.72 |
| r27 = 8444.105 | d27 = 0.8 | | |
| r28 = 0.000 | d28 = 25.0 | n16 = 1.58913 | v16 = 61.25 |
| r29 = 0.000 | d29 = 3.0 | n17 = 1.51680 | v17 = 64.20 |

Zoom Data

| Wide-angle end | Telephoto end |
|---|---|
| d8 = 3.7992 | 2.939 |
| d10 = 10.6069 | 0.4289 |
| d16 = 2.213 | 7.0657 |
| d25 = 1.27 | 7.47 |

Figure 13:
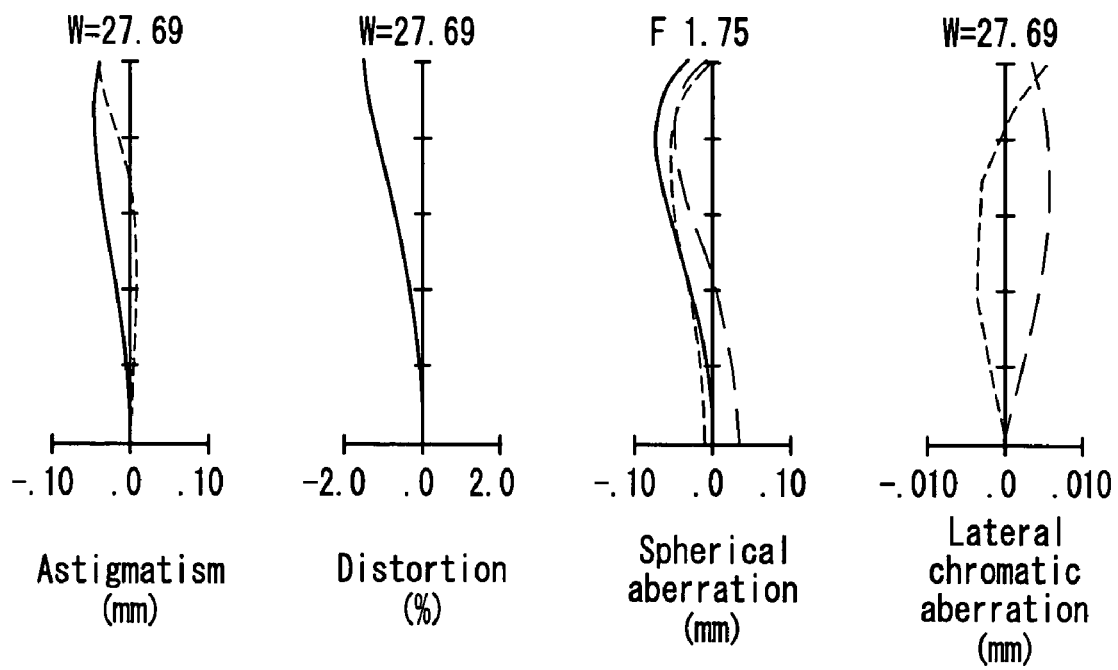
FIG. 13 shows the aberration graphs of a zoom lens at the wide-angle end in Example 3 according to a first embodiment of the present invention.
Figure 14:
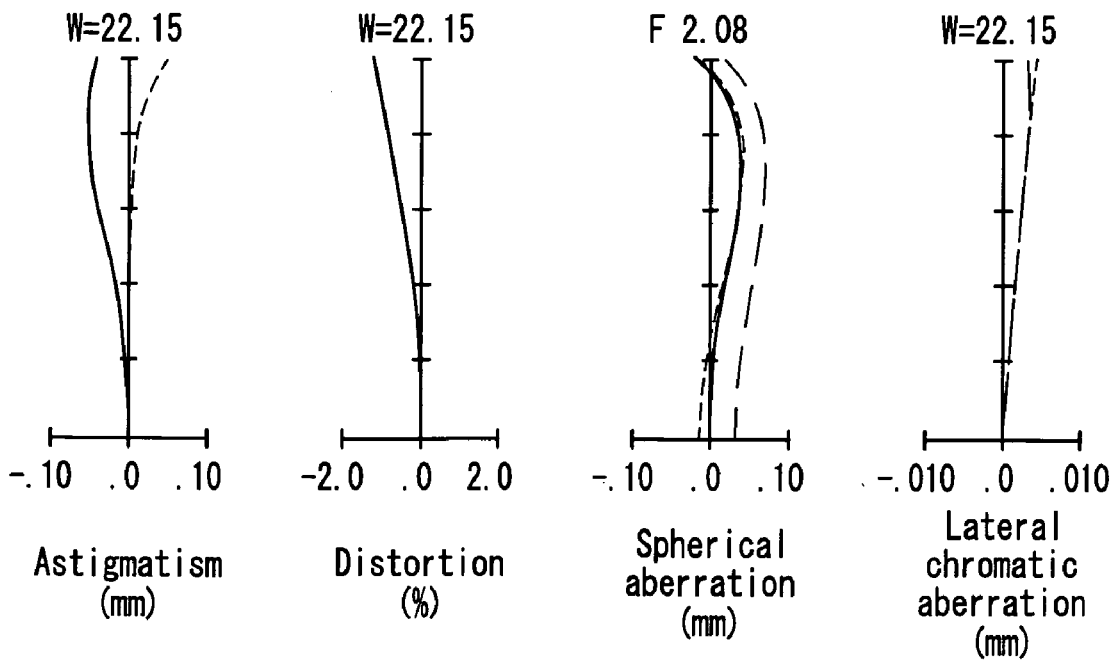
FIG. 14 shows the aberration graphs of a zoom lens at the telephoto end in Example 3 according to a first embodiment of the present invention.

FIG. 13 shows astigmatism (mm), distortion (%), spherical aberration (mm), and lateral chromatic aberration (mm) at the wide-angle end of the zoom lens according to this example. FIG. 14 shows astigmatism (mm), distortion (%), spherical aberration (mm), and lateral chromatic aberration (mm) at the telephoto end of the zoom lens according to this example.

The effect of the conditional expression (1) will be described by referring to Comparative Examples 1 and 2.

COMPARATIVE EXAMPLE 1

A zoom lens of this comparative example is composed of five lens groups and has an F number $F_{NO}$ of 1.8, a focal length f of 23.94 mm, and a half angle of view W of 27.8° at the wide-angle end.

Table 5 shows a numerical example of this comparative example.

TABLE 5

| Conditional expression (1) | (GLR1/GLnd − Bfw)/fw = 0.1577 |
|---|---|
| Conditional expression (2) | (GLR2 − Bfw)/fw = −26.985 |
| Conditional expression (3) | fGL/fw = 2.94144 |
| Conditional expression (4) | PgFGL − 0.6457 + 0.0017 × vdGL = 0.0137 |
| Conditional expression (5) | PgFGLn = 0.609 |
| Conditional expression (6) | (PgFGLn − PgFGL)/(vdGLn − vdGL) = −0.0037 |
| Conditional expression (7) | vdGp1 − vdGn1 = 8.3 |
| Conditional expression (8) | PgFGp1 − PgFGn1 = −0.0233 |
| Conditional expression (9) | vdGp2 − vdGn2 = 29.02 |
| Conditional expression (10) | |PgFGp2 − PgFGn2| = 0.0056 |
| Conditional expression (11) | |PgFGp3 − PgFGn3| = 0.0688 |

| Radius of curvature (mm) | Axial distance between surfaces (mm) | Refractive index (d line) | Abbe number (d line) |
|---|---|---|---|
| r1 = 73.987 | d1 = 6.5 | n1 = 1.80420 | v1 = 46.50 |
| r2 = 332.503 | d2 = 0.2 | | |
| r3 = 38.760 | d3 = 1.6 | n2 = 1.77250 | v2 = 49.62 |
| r4 = 23.517 | d4 = 7.0 | | |
| r5 = 216.726 | d5 = 1.5 | n3 = 1.60311 | v3 = 60.69 |
| r6 = 27.660 | d6 = 7.7 | | |
| r7 = −37.071 | d7 = 1.4 | n4 = 1.49700 | v4 = 81.61 |
| r8 = 55.411 | d8 = 4.6 | | |
| r9 = 103.900 | d9 = 5.0 | n5 = 1.83500 | v5 = 42.98 |
| r10 = −85.168 | d10 = 9.5 | | |
| r11 = 48.456 | d11 = 8.4 | n6 = 1.64769 | v6 = 33.84 |
| r12 = −30.313 | d12 = 1.0 | n7 = 1.80518 | v7 = 25.46 |
| r13 = −73.216 | d13 = 18.4 | | |
| r14 = 45.117 | d14 = 5.0 | n8 = 1.45650 | v8 = 90.27 |
| r15 = −28.989 | d15 = 1.0 | n9 = 1.58913 | v9 = 61.25 |
| r16 = −41.277 | d16 = 2.2 | | |
| r17 = −152.991 | d17 = 2.2 | n10 = 1.71736 | v10 = 29.50 |
| r18 = 37.555 | d18 = 5.5 | | |
| r19 = −17.294 | d19 = 1.0 | n11 = 1.75520 | v11 = 27.53 |
| r20 = 52.037 | d20 = 9.1 | n12 = 1.60311 | v12 = 60.69 |
| r21 = −24.466 | d21 = 0.2 | | |
| r22 = −4576.813 | d22 = 5.5 | n13 = 1.77250 | v13 = 49.62 |
| r23 = −60.737 | d23 = 0.2 | | |
| r24 = 66.106 | d24 = 5.7 | n14 = 1.60311 | v14 = 60.69 |
| r25 = 1371.728 | d25 = 1.3 | | |
| r26 = 60.992 | d26 = 6.1 | n15 = 1.78472 | v15 = 25.72 |
| r27 = −615.667 | d27 = 0.8 | | |
| r28 = 0.000 | d28 = 25.0 | n16 = 1.58913 | v16 = 61.25 |
| r29 = 0.000 | d29 = 3.0 | n17 = 1.51680 | v17 = 64.20 |

Zoom Data

| Wide-angle end | Telephoto end |
|---|---|
| d8 = 4.293 | 2.859 |
| d10 = 9.56 | 0.4289 |
| d16 = 2.213 | 7.3351 |
| d25 = 1.31 | 7.4278 |

COMPARATIVE EXAMPLE 2

A zoom lens of this comparative example is composed of five lens groups and has an F number $F_{NO}$ of 1.8, a focal length f of 23.94 mm, and a half angle of view W of 27.75° at the wide-angle end.

Table 6 shows a numerical example of this comparative example.

TABLE 6

| Conditional expression (1) | (GLR1/GLnd − Bfw)/fw = 0.664 |
| Conditional expression (2) | (GLR2 − Bfw)/fw = −10.24 |
| Conditional expression (3) | fGL/fw = 3.2012 |
| Conditional expression (4) | PgFGL − 0.6457 + 0.0017 × vdGL = 0.0137 |
| Conditional expression (5) | PgFGLn = 0.609 |
| Conditional expression (6) | (PgFGLn − PgFGL)/(vdGLn − vdGL) = −0.0037 |
| Conditional expression (7) | vdGp1 − vdGn1 does not meet the condition. |
| Conditional expression (8) | PgFGp1 − PgFGn1 does not meet the condition. |
| Conditional expression (9) | vdGp2 − vdGn2 does not meet the condition. |
| Conditional expression (10) | |PgFGp2 − PgFGn2| does not meet the condition. |
| Conditional expression (11) | |PgFGp3 − PgFGn3| does not meet the condition. |

| Radius of curvature (mm) | Axial distance between surfaces (mm) | Refractive index (d line) | Abbe number (d line) |
|---|---|---|---|
| r1 = 70.057 | d1 = 6.5 | n1 = 1.80420 | v1 = 46.50 |
| r2 = 262.785 | d2 = 0.2 | | |
| r3 = 42.319 | d3 = 1.6 | n2 = 1.77250 | v2 = 49.62 |
| r4 = 23.943 | d4 = 9.3 | | |
| r5 = −280.845 | d5 = 1.5 | n3 = 1.60311 | v3 = 60.69 |
| r6 = 28.623 | d6 = 7.7 | | |
| r7 = −59.999 | d7 = 1.4 | n4 = 1.49700 | v4 = 81.61 |
| r8 = 124.924 | d8 = 6.3 | | |
| r9 = 171.496 | d9 = 5.0 | n5 = 1.83500 | v5 = 42.98 |
| r10 = −57.464 | d10 = 10.4 | | |
| r11 = 32.268 | d11 = 8.4 | n6 = 1.64769 | v6 = 33.84 |
| r12 = 41.969 | d12 = 17.5 | | |
| r13 = 34.859 | d13 = 4.8 | n7 = 1.45650 | v7 = 90.27 |
| r14 = −52.047 | d14 = 0.7 | | |
| r15 = −145.062 | d15 = 3.7 | n8 = 1.49700 | v8 = 81.61 |
| r16 = −25.826 | d16 = 1.0 | n9 = 1.58913 | v9 = 61.25 |
| r17 = −121.754 | d17 = 2.2 | | |
| r18 = 46.146 | d18 = 2.2 | n10 = 1.71736 | v10 = 29.50 |
| r19 = 25.405 | d19 = 5.6 | | |
| r20 = −18.502 | d20 = 1.0 | n11 = 1.75520 | v11 = 27.53 |
| r21 = 41.453 | d21 = 9.1 | n12 = 1.60311 | v12 = 60.69 |
| r22 = −31.914 | d22 = 0.2 | | |
| r23 = −263.903 | d23 = 5.5 | n13 = 1.77250 | v13 = 49.62 |
| r24 = −43.670 | d24 = 0.2 | | |
| r25 = 51.494 | d25 = 5.7 | n14 = 1.60311 | v14 = 60.69 |
| r26 = 211.276 | d26 = 1.3 | | |
| r27 = 83.490 | d27 = 6.1 | n15 = 1.78472 | v15 = 25.72 |
| r28 = −214.371 | d28 = 0.8 | | |
| r29 = 0.000 | d29 = 25.0 | n16 = 1.58913 | v16 = 61.25 |
| r30 = 0.000 | d30 = 3.0 | n17 = 1.51680 | v17 = 64.20 |

Zoom Data

| Wide-angle end | Telephoto end |
|---|---|
| d8 = 6.2601 | 2.859 |
| d10 = 10.3603 | 0.4289 |
| d16 = 2.213 | 10.2669 |
| d25 = 1.31 | 6.5895 |

Table 7 shows the results of evaluating ghosts and a reduction in contrast caused when zoom lenses having the lens data of Example 2, Example 3, Comparative Example 1, and Comparative Example 2 were used as a projection lens of a projector. In Table 7, ○ represents that a ghost or the reduction in contrast was not observed (good image quality), while X represents that a ghost or the reduction in contrast was observed (poor image quality).

TABLE 7

Figure 10:
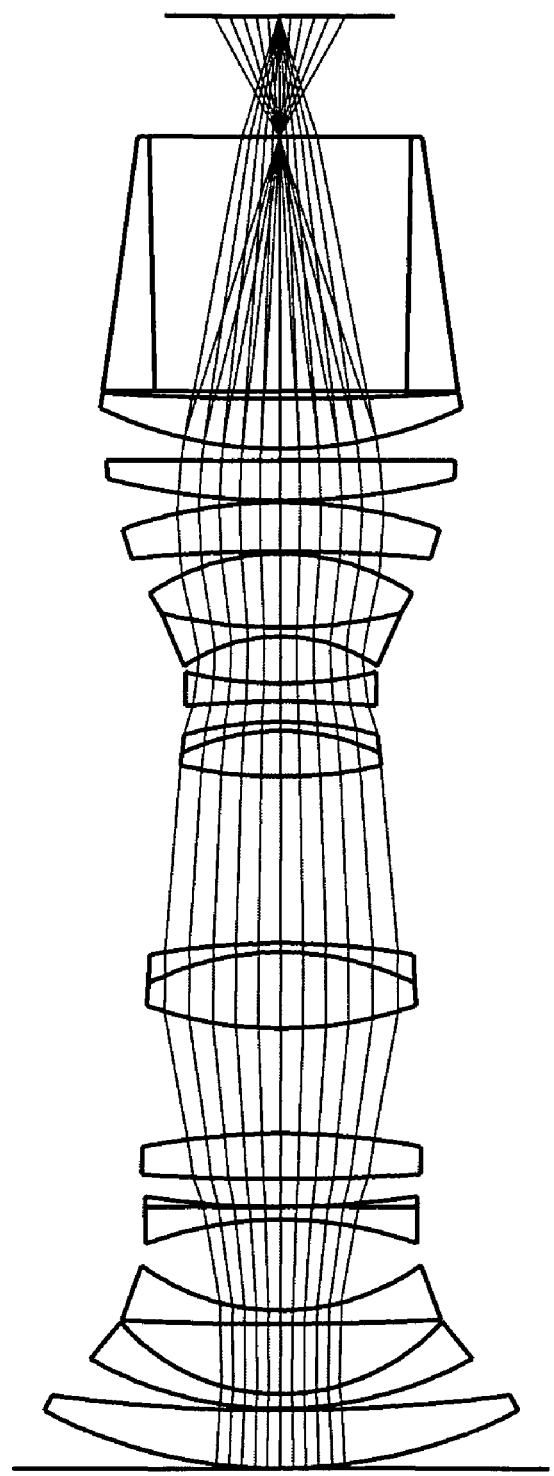
FIG. 10 is an optical path diagram when the zoom lens in Example 2 according to a first embodiment of the present invention is used as a projection lens for a projector.
Figure 15:
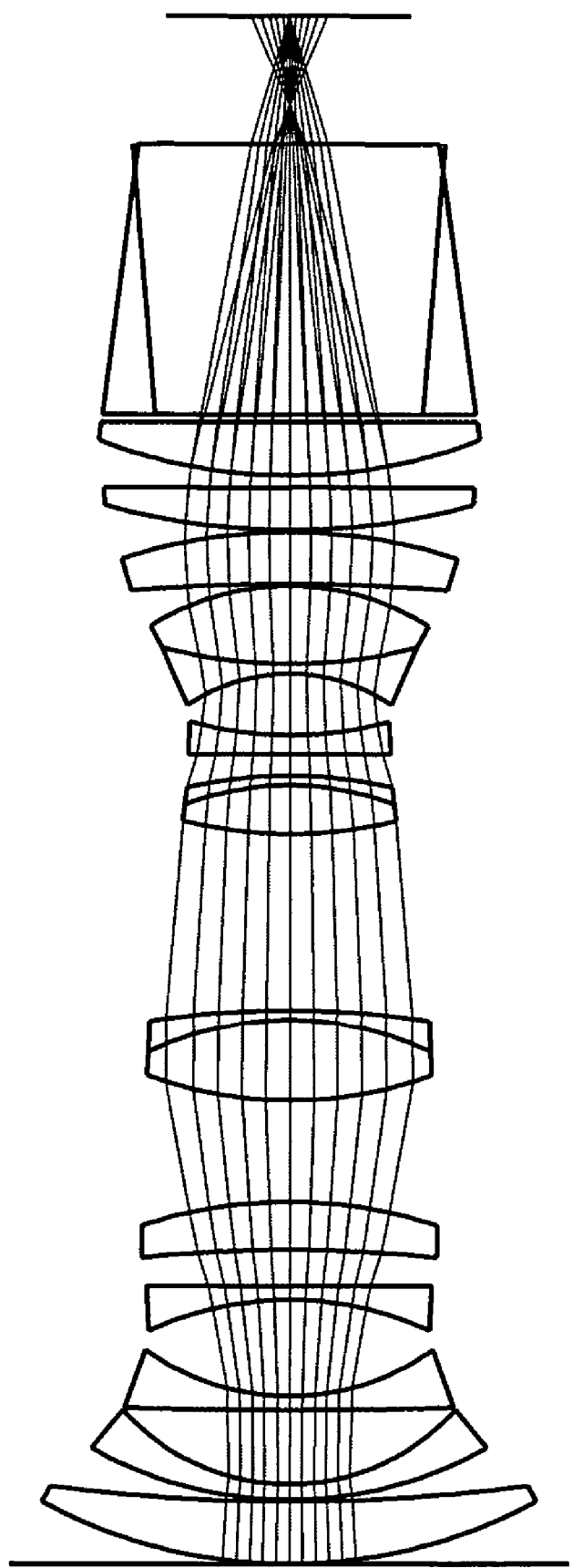
FIG. 15 is an optical path diagram when the zoom lens in Example 3 according to a first embodiment of the present invention is used as a projection lens for a projector.
Figure 16:
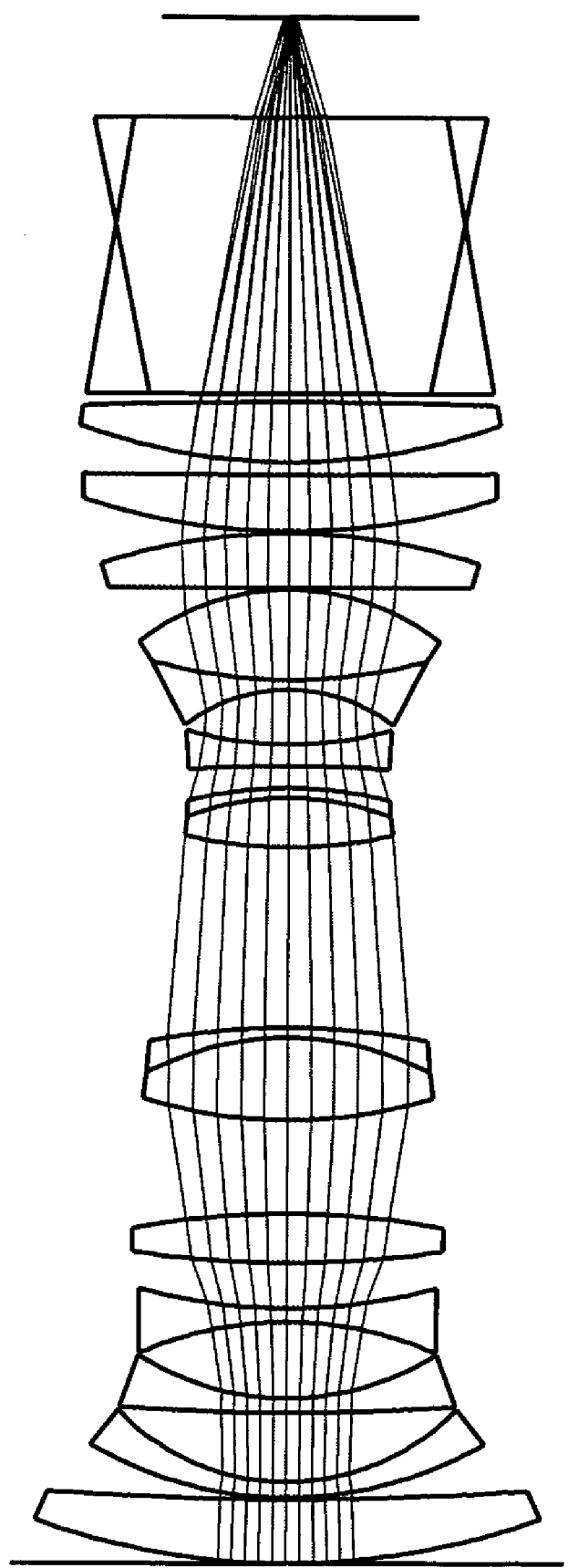
FIG. 16 is an optical path diagram when a zoom lens in Comparative Example 1 according to a first embodiment of the present invention is used as a projection lens for a projector.
Figure 17:
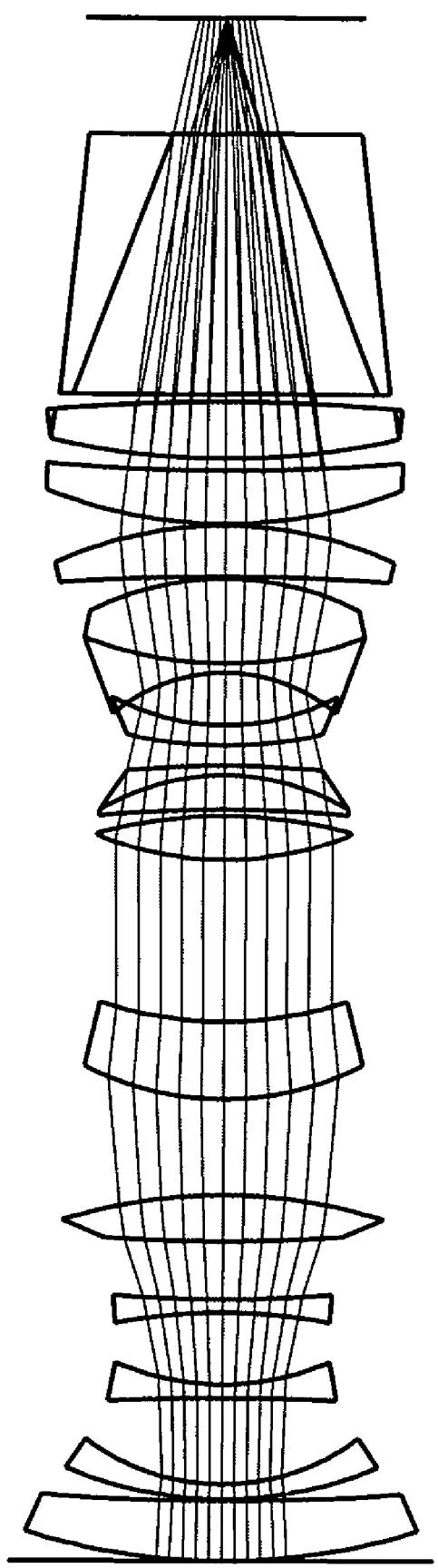
FIG. 17 is an optical path diagram when a zoom lens in Comparative Example 2 according to a first embodiment of the present invention is used as a projection lens for a projector.

| Value of conditional expression (1) | Size (radius) of reflected light on spatial optical modulating element | Ghost | Contrast | | Figure |
|---|---|---|---|---|---|
| −0.3 or less | No data was obtained due to unsuccessful aberration correction. | X | X | | |
| −0.267 | 7 mm | ○ | ○ | Example 2 | FIG. 10 |
| −0.074 | 3.8 mm | ○ | ○ | Example 3 | FIG. 15 |
| 0.157 | 0.3 mm | X | X | Comparative Example 1 | FIG. 16 |
| 0.66 | 2.88 mm | ○ | X | Comparative Example 2 | FIG. 17 |

FIGS. 10, 15, 16, and 17 show optical paths of light (normal light) emanating from a spatial optical modulating element and optical paths of unnecessary light reflected from a surface of the lens closest to the spatial optical modulating element, the surface facing the screen, when using the zoom lenses having the lens data of Example 2, Example 3, Comparative Example 1, and Comparative Example 2, respectively.

As shown in FIGS. 10 and 15, when the zoom lens having the lens data of Example 2 or 3 was used, the optical paths of unnecessary light reflected from the surface of the lens GL closest to the spatial optical modulating element, the surface facing the screen, broadened and reached the spatial optical modulating element. Thus, ghosts did not occur.

In contrast, when the zoom lens having the lens data of Comparative Example 1 was used, the value of the conditional expression (1) exceeded the upper limit. Therefore, as shown in FIG. 16, the optical paths of unnecessary light reflected from the surface of the lens GL closest to the spatial optical modulating element, the surface facing the screen, narrowed and reached the spatial optical modulating element. Thus, ghosts occurred.

As shown in FIG. 17, when the zoom lens having the lens data of Comparative Example 2 was used, although the value of the conditional expression (1) exceeded the upper limit, the optical paths of unnecessary light reflected from the surface of the lens GL closest to the spatial optical modulating element, the surface facing the screen, broadened and reached the spatial optical modulating element. Thus, ghosts did not occur. However, the angle between the optical paths of unnecessary light returning to the spatial optical modulating element and the optical axis was small, and most of light rays reflected from the spatial optical modulating element passed through the zoom lens and reached the screen. Consequently, the contrast was reduced.

EXAMPLE 4

Figure 18:
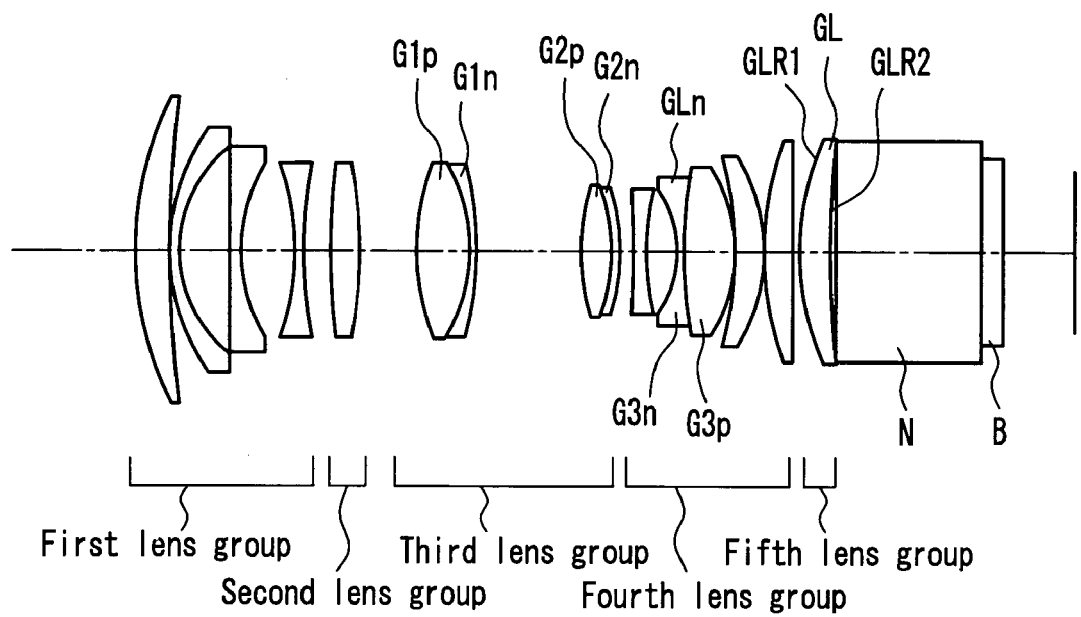
FIG. 18 shows the configuration of a zoom lens at the wide-angle end in Example 4 according to a first embodiment of the present invention.
Figure 19:
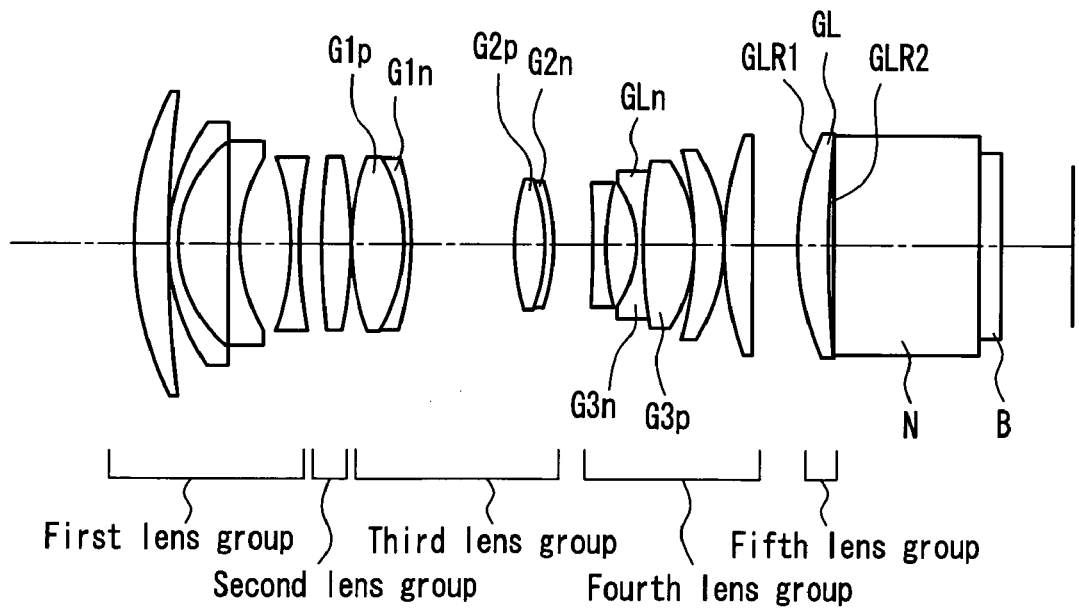
FIG. 19 shows the configuration of a zoom lens at the telephoto end in Example 4 according to a first embodiment of the present invention.

FIG. 18 shows the configuration of a zoom lens at the wide-angle end in Example 4 according to the first embodiment of the present invention. FIG. 19 shows the configuration of the zoom lens at the telephoto end in Example 4 according to the first embodiment of the present invention.

In this example, a zoom lens having an F number $F_{NO}$ of 1.7, a focal length f of 24.04 mm, and a half angle of view W of 27.66° at the wide-angle end was designed based on the configuration of the present invention so as not to cause ghosts or reduce the contrast.

Table 8 shows a specific numerical example.

TABLE 8

| Conditional expression (1) | (GLR1/GLnd − Bfw)/fw = −0.2311 |
| --- | --- |
| Conditional expression (2) | (GLR2 − Bfw)/fw = 5.6683 |
| Conditional expression (3) | fGL/fw = 3.3246 |
| Conditional expression (4) | PgFGL − 0.6457 + 0.0017 × vdGL = 0.0137 |
| Conditional expression (5) | PgFGLn = 0.609 |
| Conditional expression (6) | (PgFGLn − PgFGL)/(vdGLn − vdGL) = −0.0037 |
| Conditional expression (7) | vdGp1 − vdGn1 = 8.3 |
| Conditional expression (8) | PgFGp1 − PgFGn1 = −0.0233 |
| Conditional expression (9) | vdGp2 − vdGn2 = 29.02 |
| Conditional expression (10) | |PgFGp2 − PgFGn2| = 0.0056 |
| Conditional expression (11) | |PgFGp3 − PgFGn3| = 0.0688 |

| Radius of curvature (mm) | Axial distance between surfaces (mm) | Refractive index (d line) | Abbe number (d line) |
| --- | --- | --- | --- |
| r1 = 53.890 | d1 = 6.5 | n1 = 1.80420 | ν1 = 46.50 |
| r2 = 172.046 | d2 = 0.2 | | |
| r3 = 37.911 | d3 = 1.6 | n2 = 1.77250 | ν2 = 49.62 |
| r4 = 22.443 | d4 = 7.7 | | |
| r5 = 191.381 | d5 = 1.5 | n3 = 1.60311 | ν3 = 60.69 |
| r6 = 25.247 | d6 = 10.0 | | |
| r7 = −39.874 | d7 = 1.4 | n4 = 1.49700 | ν4 = 81.61 |
| r8 = 79.792 | d8 = 4.5 | | |
| r9 = 188.618 | d9 = 5.0 | n5 = 1.83500 | ν5 = 42.98 |
| r10 = −80.838 | d10 = 10.0 | | |
| r11 = 51.905 | d11 = 8.4 | n6 = 1.64769 | ν6 = 33.84 |
| r12 = −28.826 | d12 = 1.0 | n7 = 1.80518 | ν7 = 25.46 |
| r13 = −70.278 | d13 = 18.4 | | |
| r14 = 60.515 | d14 = 5.0 | n8 = 1.45650 | ν8 = 90.27 |
| r15 = −33.341 | d15 = 1.0 | n9 = 1.58913 | ν9 = 61.25 |
| r16 = −40.018 | d16 = 2.2 | | |
| r17 = −2321.494 | d17 = 2.0 | n10 = 1.71736 | ν10 = 29.50 |
| r18 = 39.883 | d18 = 5.5 | | |
| r19 = −18.280 | d19 = 1.0 | n11 = 1.75520 | ν11 = 27.53 |
| r20 = 61.351 | d20 = 8.1 | n12 = 1.60311 | ν12 = 60.69 |
| r21 = −27.550 | d21 = 0.2 | | |
| r22 = −72.107 | d22 = 5.4 | n13 = 1.77250 | ν13 = 49.62 |
| r23 = −37.134 | d23 = 0.2 | | |
| r24 = 57.457 | d24 = 4.4 | n14 = 1.60311 | ν14 = 60.69 |
| r25 = 0.000 | d25 = 1.3 | | |
| r26 = 46.607 | d26 = 5.5 | n15 = 1.78472 | ν15 = 25.72 |
| r27 = 167.958 | d27 = 0.8 | | |
| r28 = 0.000 | d28 = 25.0 | n16 = 1.58913 | ν16 = 61.25 |
| r29 = 0.000 | d29 = 3.0 | n17 = 1.51680 | ν17 = 64.20 |

| Zoom Data | |
| --- | --- |
| Wide-angle end | Telephoto end |
| d8 = 4.516 | 2.939 |
| d10 = 10.0224 | 0.4289 |
| d16 = 2.213 | 7.2455 |
| d25 = 1.27 | 7.4146 |

Figure 20:
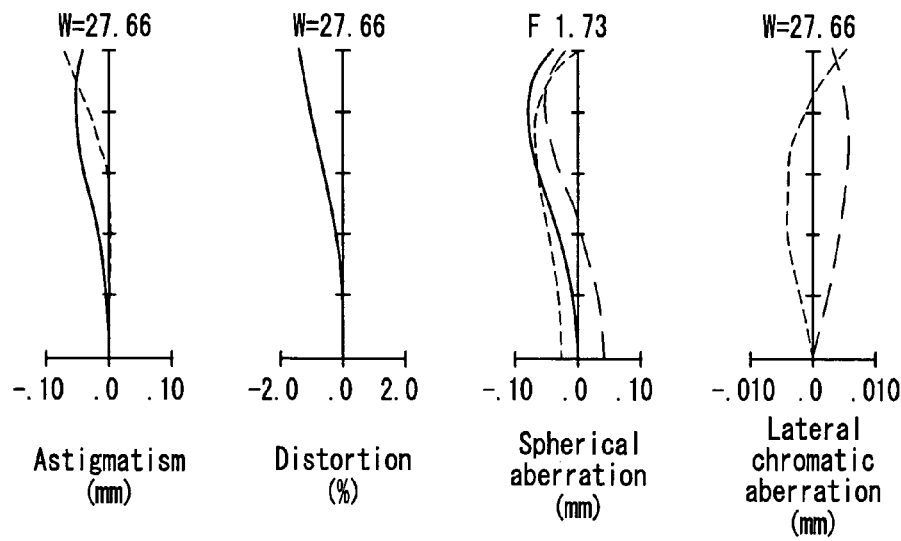
FIG. 20 shows the aberration graphs of a zoom lens at the wide-angle end in Example 4 according to a first embodiment of the present invention.
Figure 21:
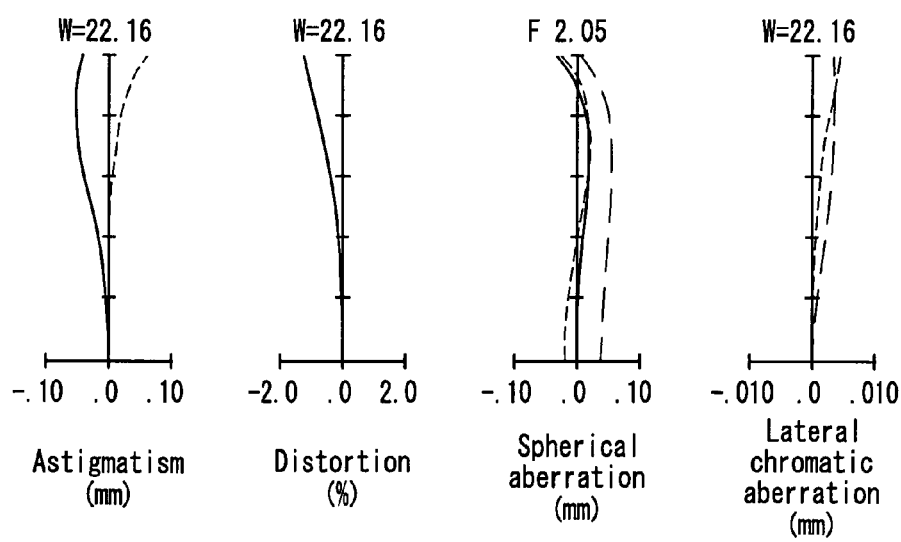
FIG. 21 shows the aberration graphs of a zoom lens at the telephoto end in Example 4 according to a first embodiment of the present invention.

FIG. 20 shows astigmatism (mm), distortion (%), spherical aberration (mm), and lateral chromatic aberration (mm) at the wide-angle end of the zoom lens according to this example. FIG. 21 shows astigmatism (mm), distortion (%), spherical aberration (mm), and lateral chromatic aberration (mm) at the telephoto end of the zoom lens according to this example.

EXAMPLE 5

Figure 23:
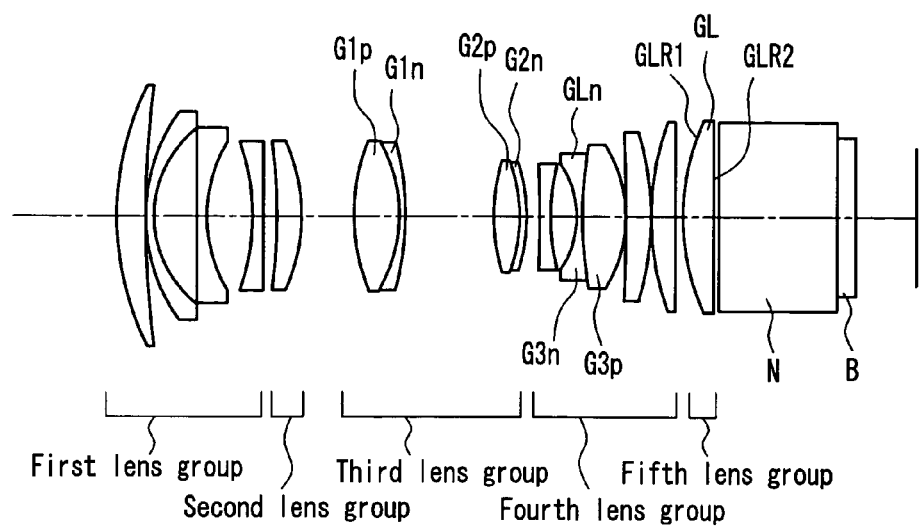
FIG. 23 shows the configuration of a zoom lens at the wide-angle end in Example 5 according to a first embodiment of the present invention.
Figure 24:
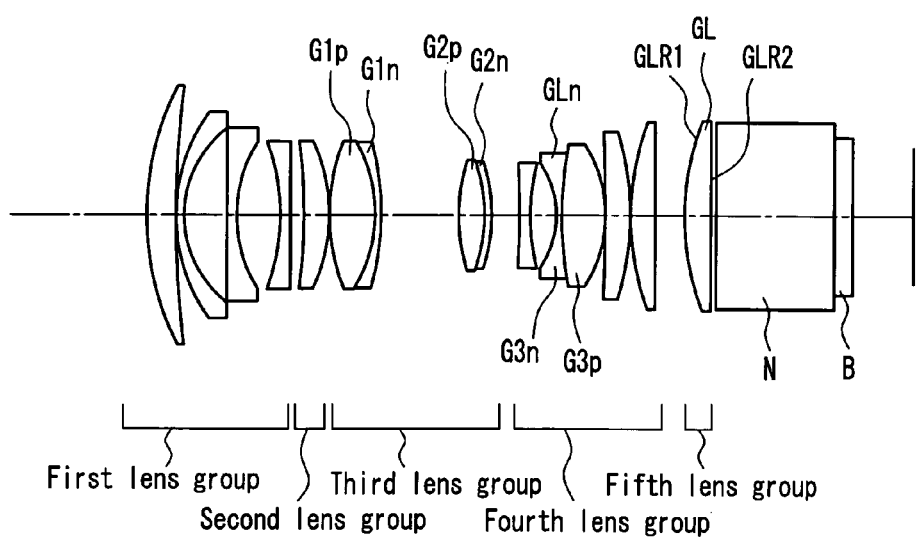
FIG. 24 shows the configuration of a zoom lens at the telephoto end in Example 5 according to a first embodiment of the present invention.

FIG. 23 shows the configuration of a zoom lens at the wide-angle end in Example 5 according to the first embodiment of the present invention. FIG. 24 shows the configuration of the zoom lens at the telephoto end in Example 5 according to the first embodiment of the present invention.

In this example, a zoom lens having an F number $F_{NO}$ of 1.7, a focal length f of 24.08 mm, and a half angle of view W of 27.69° at the wide-angle end was designed based on the configuration of the present invention so as not to cause ghosts or reduce the contrast.

Table 9 shows a specific numerical example.

TABLE 9

| Conditional expression (1) | (GLR1/GLnd − Bfw)/fw = −0.116 |
| --- | --- |
| Conditional expression (2) | (GLR2 − Bfw)/fw = 437.9 |
| Conditional expression (3) | fGL/fw = 2.7133 |
| Conditional expression (4) | PgFGL − 0.6457 + 0.0017 × vdGL = 0.0137 |
| Conditional expression (5) | PgFGLn = 0.609 |
| Conditional expression (6) | (PgFGLn − PgFGL)/(vdGLn − vdGL) = −0.0037 |
| Conditional expression (7) | vdGp1 − vdGn1 = 8.3 |
| Conditional expression (8) | PgFGp1 − PgFGn1 = −0.0233 |
| Conditional expression (9) | vdGp2 − vdGn2 = 29.02 |
| Conditional expression (10) | |PgFGp2 − PgFGn2| = 0.0056 |
| Conditional expression (11) | |PgFGp3 − PgFGn3| = 0.0688 |

| Radius of curvature (mm) | Axial distance between surfaces (mm) | Refractive index (d line) | Abbe number (d line) |
| --- | --- | --- | --- |
| r1 = 52.926 | d1 = 6.5 | n1 = 1.80420 | ν1 = 46.50 |
| r2 = 186.790 | d2 = 0.2 | | |
| r3 = 38.235 | d3 = 1.6 | n2 = 1.77250 | ν2 = 49.62 |
| r4 = 22.221 | d4 = 7.7 | | |
| r5 = 494.600 | d5 = 1.5 | n3 = 1.60311 | ν3 = 60.69 |
| r6 = 23.641 | d6 = 10.0 | | |
| r7 = −32.693 | d7 = 1.4 | n4 = 1.49700 | ν4 = 81.61 |
| r8 = −1161.535 | d8 = 3.8 | | |
| r9 = −100.960 | d9 = 5.0 | n5 = 1.83500 | ν5 = 42.98 |
| r10 = −43.889 | d10 = 10.3 | | |
| r11 = 40.324 | d11 = 8.4 | n6 = 1.64769 | ν6 = 33.84 |
| r12 = −34.106 | d12 = 1.0 | n7 = 1.80518 | ν7 = 25.46 |
| r13 = −100.166 | d13 = 18.4 | | |
| r14 = 45.947 | d14 = 5.0 | n8 = 1.45650 | ν8 = 90.27 |
| r15 = −25.211 | d15 = 1.0 | n9 = 1.58913 | ν9 = 61.25 |
| r16 = −41.393 | d16 = 2.2 | | |
| r17 = −1448.769 | d17 = 2.0 | n10 = 1.71736 | ν10 = 29.50 |
| r18 = 38.272 | d18 = 6.2 | | |
| r19 = −18.444 | d19 = 1.0 | n11 = 1.75520 | ν11 = 27.53 |
| r20 = 49.387 | d20 = 8.1 | n12 = 1.60311 | ν12 = 60.69 |
| r21 = −26.397 | d21 = 0.2 | | |
| r22 = −267.560 | d22 = 5.4 | n13 = 1.77250 | ν13 = 49.62 |
| r23 = −58.014 | d23 = 0.2 | | |
| r24 = 77.202 | d24 = 4.4 | n14 = 1.60311 | ν14 = 60.69 |
| r25 = 0.000 | d25 = 1.3 | | |
| r26 = 51.442 | d26 = 5.5 | n15 = 1.78472 | ν15 = 25.72 |
| r27 = 10574.205 | d27 = 0.8 | | |
| r28 = 0.000 | d28 = 25.0 | n16 = 1.58913 | ν16 = 61.25 |
| r29 = 0.000 | d29 = 3.0 | n17 = 1.51680 | ν17 = 64.20 |

| Zoom Data | |
| --- | --- |
| Wide-angle end | Telephoto end |
| d8 = 3.8291 | 2.939 |
| d10 = 10.2637 | 0.4289 |
| d16 = 2.213 | 7.2122 |
| d25 = 1.27 | 7.0113 |

Figure 25:
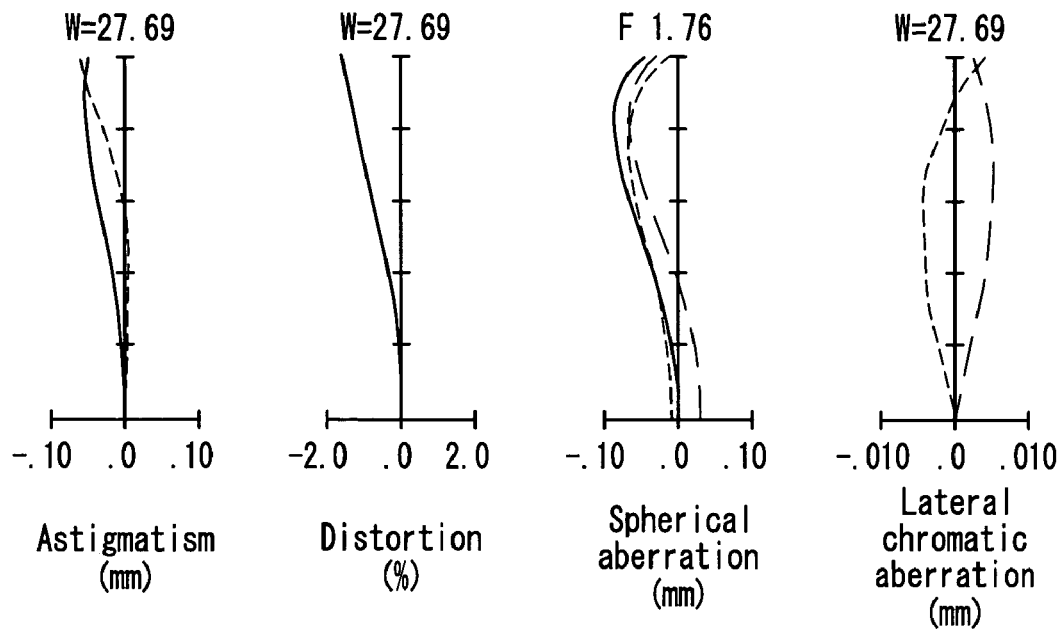
FIG. 25 shows the aberration graphs of a zoom lens at the wide-angle end in Example 5 according to a first embodiment of the present invention.
Figure 26:
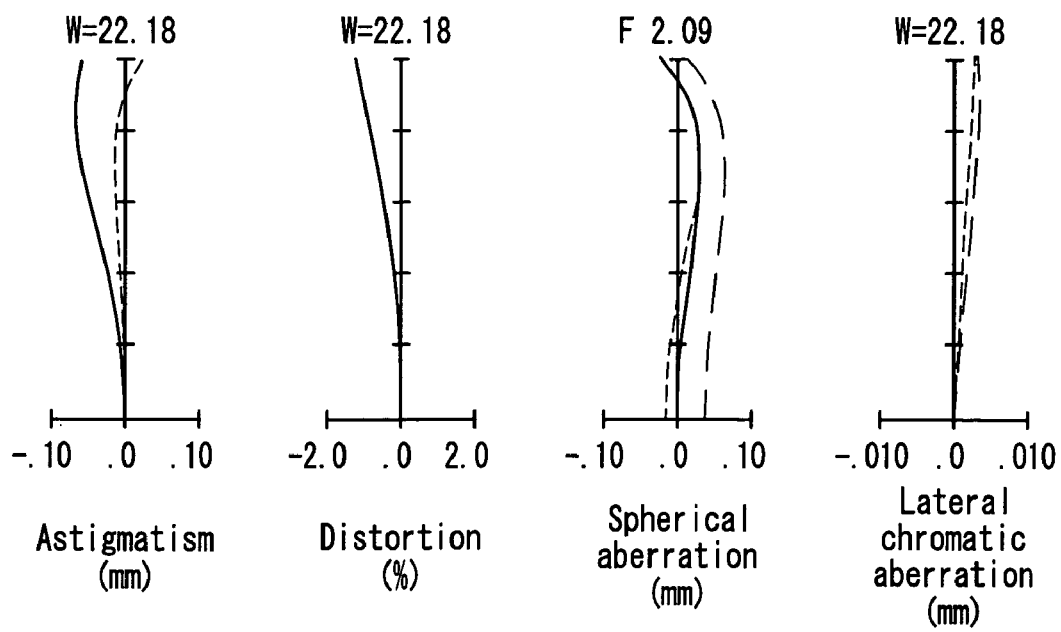
FIG. 26 shows the aberration graphs of a zoom lens at the telephoto end in Example 5 according to a first embodiment of the present invention.

FIG. 25 shows astigmatism (mm), distortion (%), spherical aberration (mm), and lateral chromatic aberration (mm) at the wide-angle end of the zoom lens according to this example. FIG. 26 shows astigmatism (mm), distortion (%), spherical aberration (mm), and lateral chromatic aberration (mm) at the telephoto end of the zoom lens according to this example.

Table 10 shows the effect of the conditional expression (2), i.e., the results of evaluating ghosts and a reduction in contrast caused when zoom lenses having the lens data of Example 4 and Example 5 were used as a projection lens of a projector. In Table 10, ○ represents that a ghost or the reduction in contrast was not observed (good image quality), while X represents that a ghost or the reduction in contrast was observed (poor image quality).

TABLE 10

Figure 27:
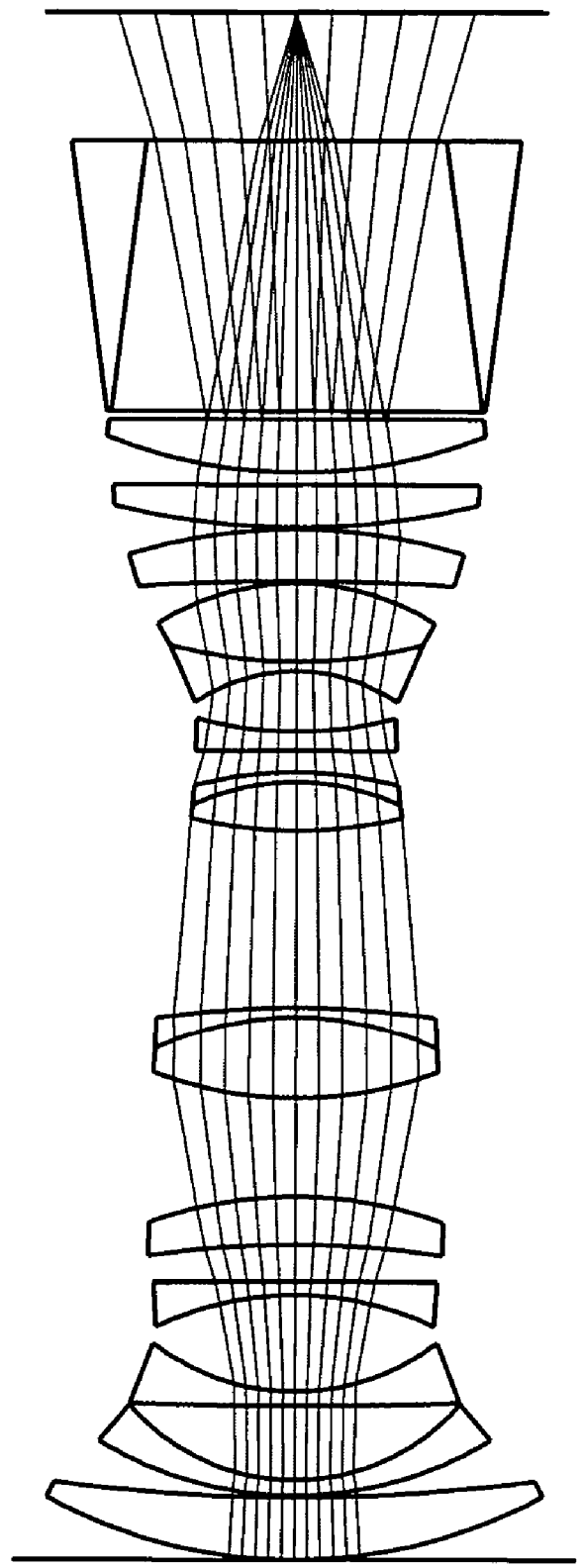
FIG. 27 is an optical path diagram when the zoom lens in Example 5 according to a first embodiment of the present invention is used as a projection lens for a projector.

| Value of conditional expression (2) | Size (radius) of reflected light on spatial optical modulating element | Ghost | Contrast | | Figure |
|---|---|---|---|---|---|
| 5 or less | No data was obtained due to unsuccessful aberration correction. | X | X | | |
| 5.664 | 16 mm | ○ | ○ | Example 4 | FIG. 20 |
| 437.9 | 18.3 mm | ○ | ○ | Example 5 | FIG. 27 |

Figure 22:
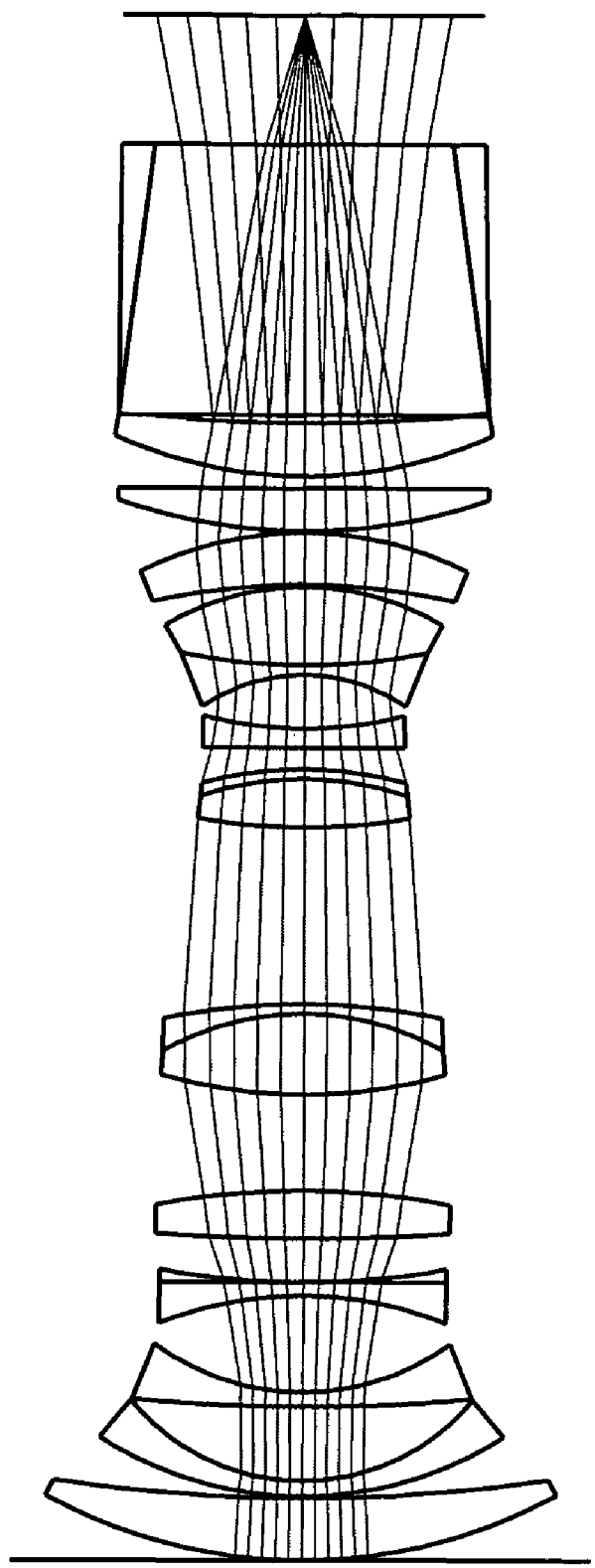
FIG. 22 is an optical path diagram when the zoom lens in Example 4 according to a first embodiment of the present invention is used as a projection lens for a projector.

FIGS. 22 and 27 show optical paths of light (normal light) emanating from a spatial optical modulating element and optical paths of unnecessary light reflected from a surface of a lens closest to the spatial optical modulating element, the surface facing the screen, when using the zoom lenses having the lens data of Example 4 and Example 5, respectively.

As shown in FIGS. 22 and 27, when the zoom lens having the lens data of Examples 4 and 5 was used, the optical paths of unnecessary light reflected from the surface of the lens GL closest to the spatial optical modulating element, the surface facing the spatial optical modulating element, broadened and reached the spatial optical modulating element. Thus, ghosts did not occur.

EXAMPLE 6

Figure 28:
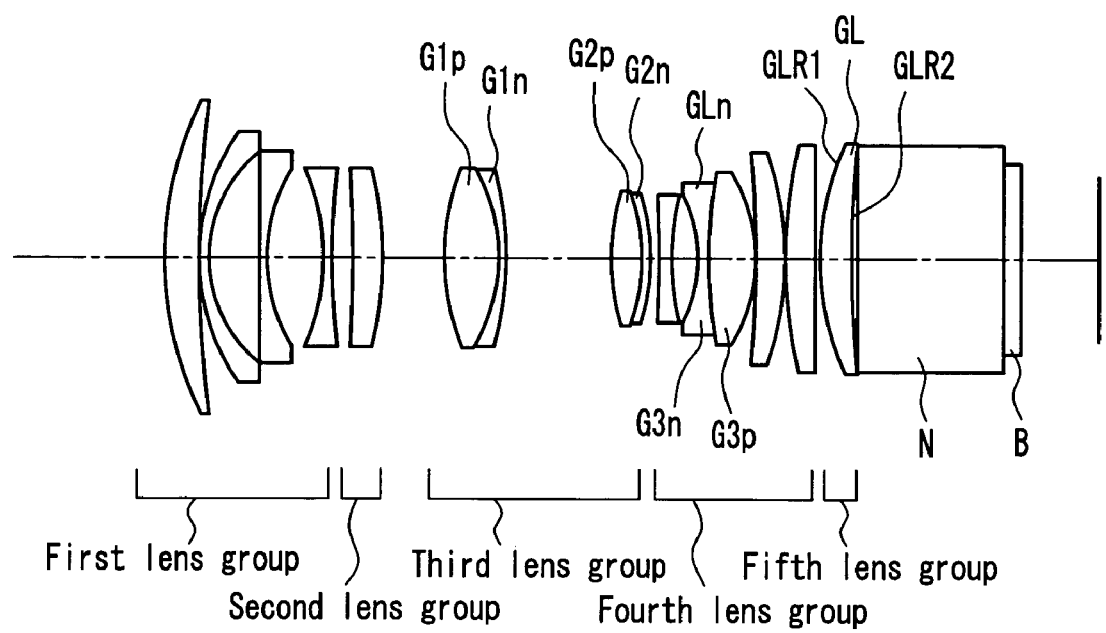
FIG. 28 shows the configuration of a zoom lens at the wide-angle end in Example 6 according to a first embodiment of the present invention.
Figure 29:
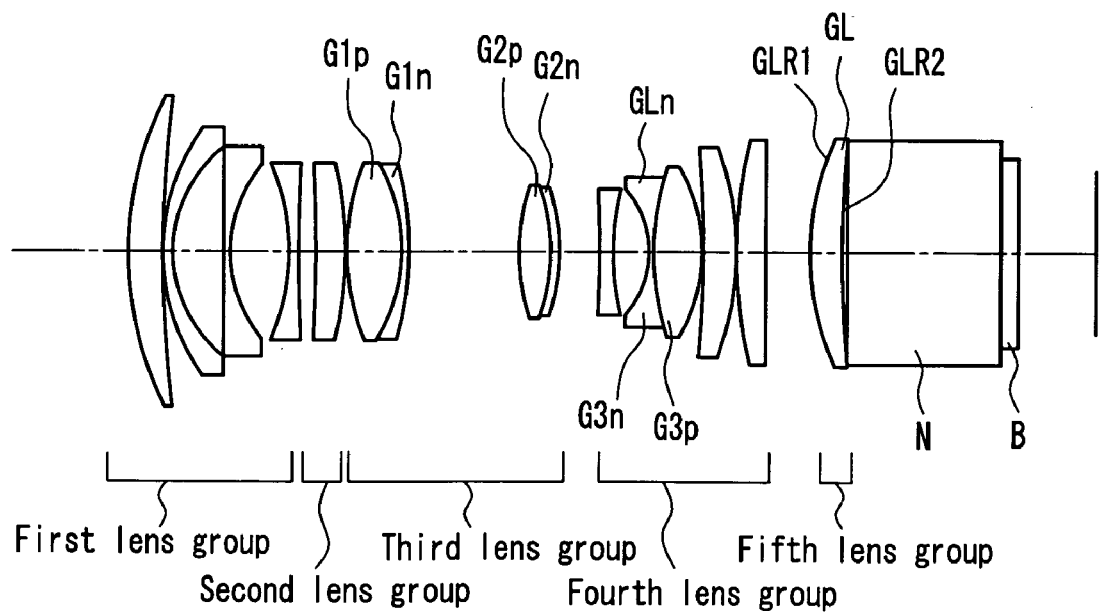
FIG. 29 shows the configuration of a zoom lens at the telephoto end in Example 6 according to a first embodiment of the present invention.

FIG. 28 shows the configuration of a zoom lens at the wide-angle end in Example 6 according to the first embodiment of the present invention. FIG. 29 shows the configuration of the zoom lens at the telephoto end in Example 6 according to the first embodiment of the present invention.

In this example, a zoom lens having an F number $F_{NO}$ of 1.7, a focal length f of 24.08 mm, and a half angle of view W of 27.62° at the wide-angle end was designed based on the configuration of the present invention so as not to cause ghosts or reduce the contrast.

Table 11 shows a specific numerical example.

TABLE 11

| Conditional expression (1) | (GLR1/GLnd − Bfw)/fw = −0.2444 |
|---|---|
| Conditional expression (2) | (GLR2 − Bfw)/fw = 9.62 |
| Conditional expression (3) | fGL/fw = 2.9355 |
| Conditional expression (4) | PgFGL − 0.6457 + 0.0017 × vdGL = 0.01172 |
| Conditional expression (5) | PgFGLn = 0.6058 |
| Conditional expression (6) | (PgFGLn − PgFGL)/(vdGLn − vdGL) = −0.00372 |
| Conditional expression (7) | vdGp1 − vdGn1 = 8.3 |
| Conditional expression (8) | PgFGp1 − PgFGn1 = −0.0233 |
| Conditional expression (9) | vdGp2 − vdGn2 = 29.02 |
| Conditional expression (10) | |PgFGp2 − PgFGn2| = 0.0056 |
| Conditional expression (11) | |PgFGp3 − PgFGn3| = 0.0656 |

| Radius of curvature (mm) | Axial distance between surfaces (mm) | Refractive index (d line) | Abbe number (d line) |
|---|---|---|---|
| r1 = 53.027 | d1 = 6.5 | n1 = 1.80420 | ν1 = 46.50 |
| r2 = 170.578 | d2 = 0.2 | | |
| r3 = 35.507 | d3 = 1.6 | n2 = 1.77250 | ν2 = 49.62 |
| r4 = 21.692 | d4 = 7.7 | | |
| r5 = 194.307 | d5 = 1.5 | n3 = 1.60311 | ν3 = 60.69 |
| r6 = 23.330 | d6 = 10.0 | | |
| r7 = −35.820 | d7 = 1.4 | n4 = 1.49700 | ν4 = 81.61 |
| r8 = 217.216 | d8 = 3.6 | | |

TABLE 11-continued

| | | | |
|---|---|---|---|
| r9 = −251.787 | d9 = 5.0 | n5 = 1.83500 | ν5 = 42.98 |
| r10 = −58.311 | d10 = 10.4 | | |
| r11 = 44.852 | d11 = 8.4 | n6 = 1.64769 | ν6 = 33.84 |
| r12 = −29.194 | d12 = 1.0 | n7 = 1.80518 | ν7 = 25.46 |
| r13 = −70.886 | d13 = 18.4 | | |
| r14 = 53.791 | d14 = 5.0 | n8 = 1.45650 | ν8 = 90.27 |
| r15 = −25.128 | d15 = 1.0 | n9 = 1.58913 | ν9 = 61.25 |
| r16 = −37.260 | d16 = 2.2 | | |
| r17 = −243.849 | d17 = 2.0 | n10 = 1.71736 | ν10 = 29.50 |
| r18 = 41.248 | d18 = 5.6 | | |
| r19 = −17.697 | d19 = 1.0 | n11 = 1.72825 | ν11 = 28.32 |
| r20 = 55.275 | d20 = 8.1 | n12 = 1.60311 | ν12 = 60.69 |
| r21 = −25.423 | d21 = 0.2 | | |
| r22 = −122.934 | d22 = 5.4 | n13 = 1.77250 | ν13 = 49.62 |
| r23 = −48.627 | d23 = 0.2 | | |
| r24 = 69.940 | d24 = 4.4 | n14 = 1.60311 | ν14 = 60.69 |
| r25 = 0.000 | d25 = 1.3 | | |
| r26 = 45.405 | d26 = 5.5 | n15 = 1.76182 | ν15 = 26.61 |
| r27 = 263.291 | d27 = 0.8 | | |
| r28 = 0.000 | d28 = 25.0 | n16 = 1.58913 | ν16 = 61.25 |
| r29 = 0.000 | d29 = 3.0 | n17 = 1.51680 | ν17 = 64.20 |

| Zoom Data | |
|---|---|
| Wide-angle end | Telephoto end |
| d8 = 3.6311 | 2.939 |
| d10 = 10.3766 | 0.4289 |
| d16 = 2.213 | 6.9597 |
| d25 = 1.27 | 7.1686 |

Figure 30:
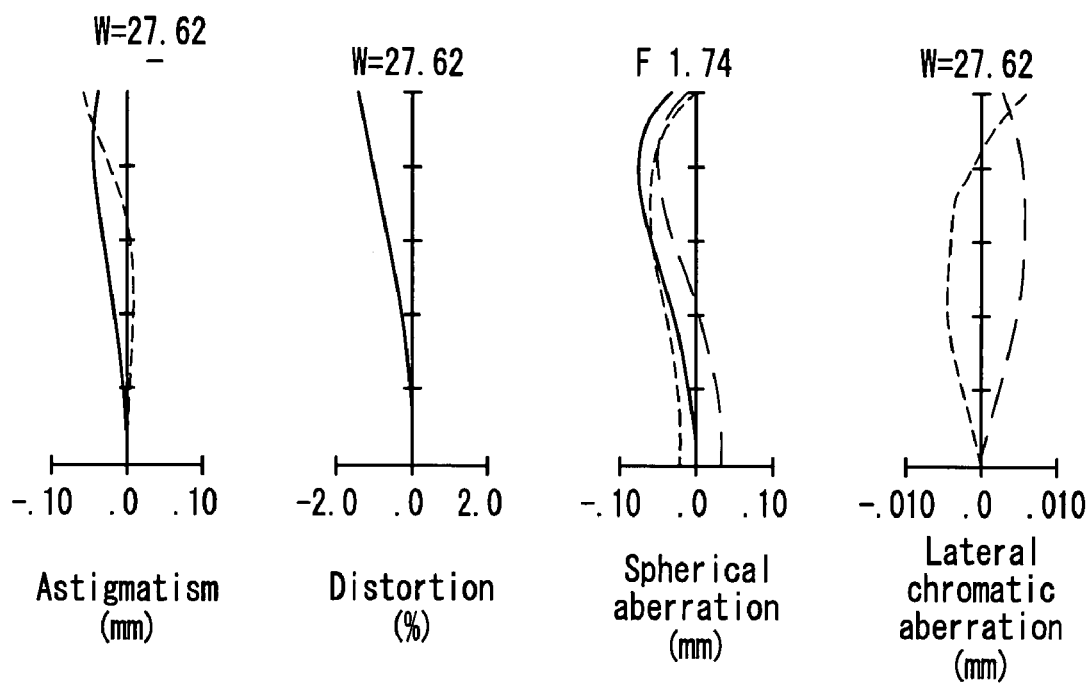
FIG. 30 shows the aberration graphs of a zoom lens at the wide-angle end in Example 6 according to a first embodiment of the present invention.
Figure 31:
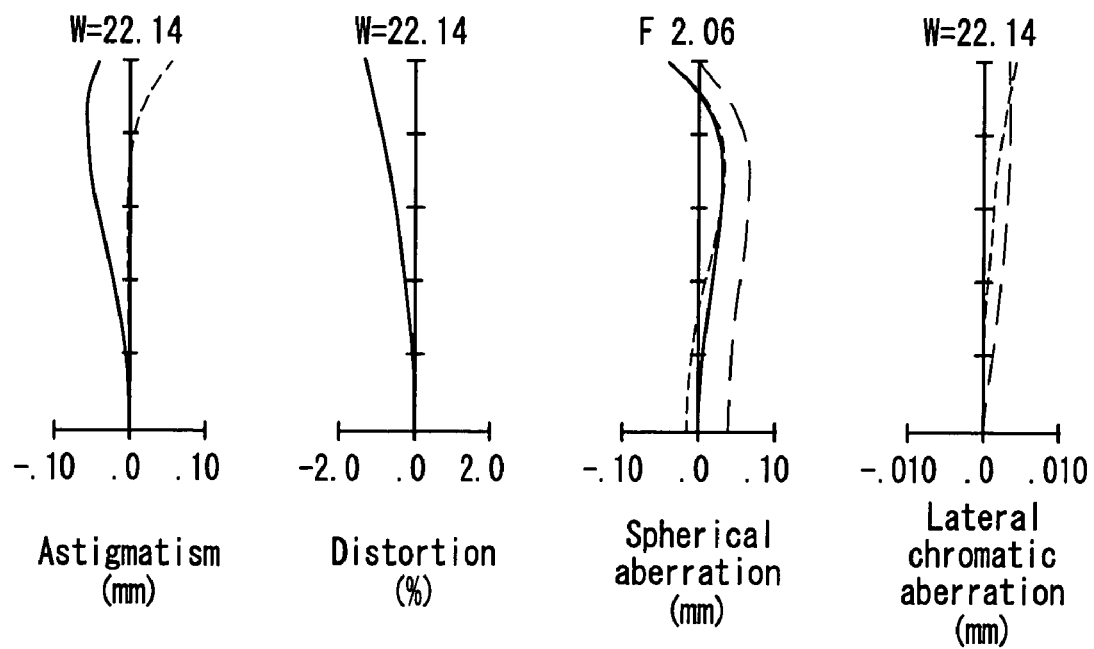
FIG. 31 shows the aberration graphs of a zoom lens at the telephoto end in Example 6 according to a first embodiment of the present invention.

FIG. 30 shows astigmatism (mm), distortion (%), spherical aberration (mm), and lateral chromatic aberration (mm) at the wide-angle end of the zoom lens according to this example. FIG. 31 shows astigmatism (mm), distortion (%), spherical aberration (mm), and lateral chromatic aberration (mm) at the telephoto end of the zoom lens according to this example.

EXAMPLE 7

Figure 32:
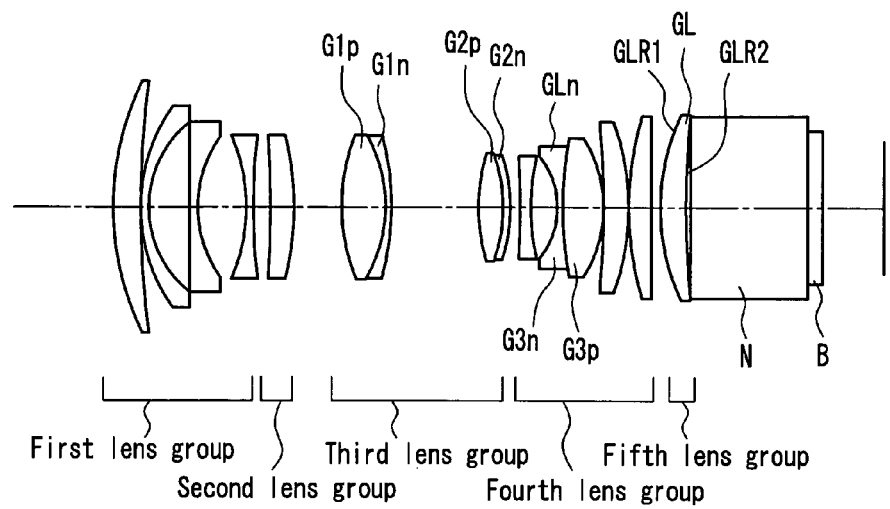
FIG. 32 shows the configuration of a zoom lens at the wide-angle end in Example 7 according to a first embodiment of the present invention.
Figure 33:
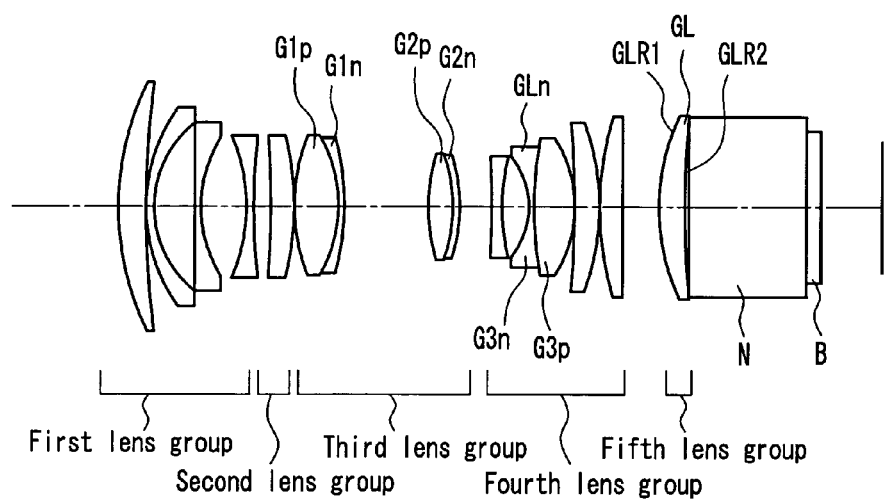
FIG. 33 shows the configuration of a zoom lens at the telephoto end in Example 7 according to a first embodiment of the present invention.

FIG. 32 shows the configuration of a zoom lens at the wide-angle end in Example 7 according to the first embodiment of the present invention. FIG. 33 shows the configuration of the zoom lens at the telephoto end in Example 7 according to the first embodiment of the present invention.

In this example, a zoom lens having an F number $F_{NO}$ of 1.7, a focal length f of 24.06 mm, and a half angle of view W of 27.64° at the wide-angle end was designed based on the configuration of the present invention so as not to cause ghosts or reduce the contrast.

Table 12 shows a specific numerical example.

TABLE 12

| Conditional expression (1) | (GLR1/GLnd − Bfw)/fw = −0.2494 |
|---|---|
| Conditional expression (2) | (GLR2 − Bfw)/fw = 7.913 |
| Conditional expression (3) | fGL/fw = 3.045 |
| Conditional expression (4) | PgFGL − 0.6457 + 0.0017 × vdGL = 0.01607 |
| Conditional expression (5) | PgFGLn = 0.609 |
| Conditional expression (6) | (PgFGLn − PgFGL)/(vdGLn − vdGL) = −0.00416 |
| Conditional expression (7) | vdGp1 − vdGn1 = 8.3 |
| Conditional expression (8) | PgFGp1 − PgFGn1 = −0.0233 |
| Conditional expression (9) | vdGp2 − vdGn2 = 29.02 |
| Conditional expression (10) | |PgFGp2 − PgFGn2| = 0.0056 |
| Conditional expression (11) | |PgFGp3 − PgFGn3| = 0.0656 |

TABLE 12-continued

| Radius of curvature (mm) | Axial distance between surfaces (mm) | Refractive index (d line) | Abbe number (d line) |
|---|---|---|---|
| r1 = 54.424 | d1 = 6.5 | n1 = 1.80420 | ν1 = 46.50 |
| r2 = 187.650 | d2 = 0.2 | | |
| r3 = 36.414 | d3 = 1.6 | n2 = 1.77250 | ν2 = 49.62 |
| r4 = 22.255 | d4 = 7.7 | | |
| r5 = 264.148 | d5 = 1.5 | n3 = 1.60311 | ν3 = 60.69 |
| r6 = 23.834 | d6 = 10.0 | | |
| r7 = −37.729 | d7 = 1.4 | n4 = 1.49700 | ν4 = 81.61 |
| r8 = 111.551 | d8 = 3.5 | | |
| r9 = −1402.124 | d9 = 5.0 | n5 = 1.83500 | ν5 = 42.98 |
| r10 = −65.737 | d10 = 10.5 | | |
| r11 = 43.154 | d11 = 8.4 | n6 = 1.64769 | ν6 = 33.84 |
| r12 = −29.676 | d12 = 1.0 | n7 = 1.80518 | ν7 = 25.46 |
| r13 = −73.408 | d13 = 18.4 | | |
| r14 = 49.403 | d14 = 5.0 | n8 = 1.45650 | ν8 = 90.27 |
| r15 = −25.516 | d15 = 1.0 | n9 = 1.58913 | ν9 = 61.25 |
| r16 = −39.010 | d16 = 2.2 | | |
| r17 = −169.873 | d17 = 2.0 | n10 = 1.71736 | ν10 = 29.50 |
| r18 = 43.217 | d18 = 5.6 | | |
| r19 = −18.026 | d19 = 1.0 | n11 = 1.75520 | ν11 = 27.53 |
| r20 = 62.357 | d20 = 8.1 | n12 = 1.60311 | ν12 = 60.69 |
| r21 = −24.963 | d21 = 0.2 | | |
| r22 = −149.985 | d22 = 5.4 | n13 = 1.77250 | ν13 = 49.62 |
| r23 = −49.888 | d23 = 0.2 | | |
| r24 = 68.536 | d24 = 4.4 | n14 = 1.60311 | ν14 = 60.69 |
| r25 = 0.000 | d25 = 1.3 | | |
| r26 = 44.922 | d26 = 5.5 | n15 = 1.75211 | ν15 = 25.05 |
| r27 = 222.055 | d27 = 0.8 | | |
| r28 = 0.000 | d28 = 25.0 | n16 = 1.58913 | ν16 = 61.25 |
| r29 = 0.000 | d29 = 3.0 | n17 = 1.51680 | ν17 = 64.20 |

Zoom Data

| Wide-angle end | Telephoto end |
|---|---|
| d8 = 3.4616 | 2.939 |
| d10 = 10.5437 | 0.4289 |
| d16 = 2.2131 | 6.917 |
| d25 = 1.27 | 7.2171 |

Figure 34:
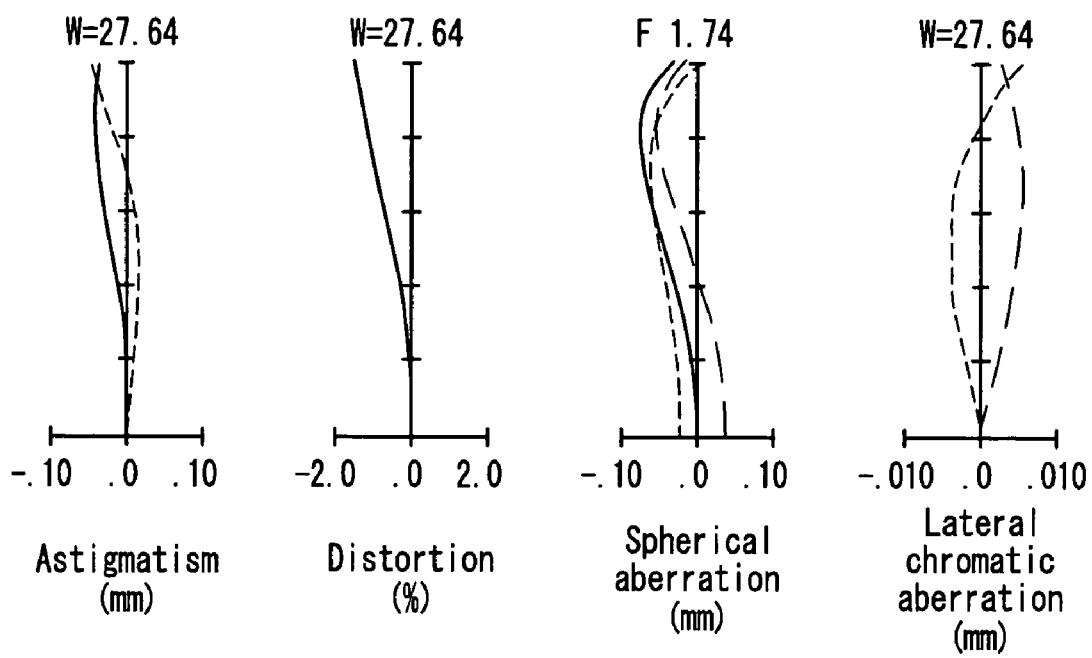
FIG. 34 shows the aberration graphs of a zoom lens at the wide-angle end in Example 7 according to a first embodiment of the present invention.
Figure 35:
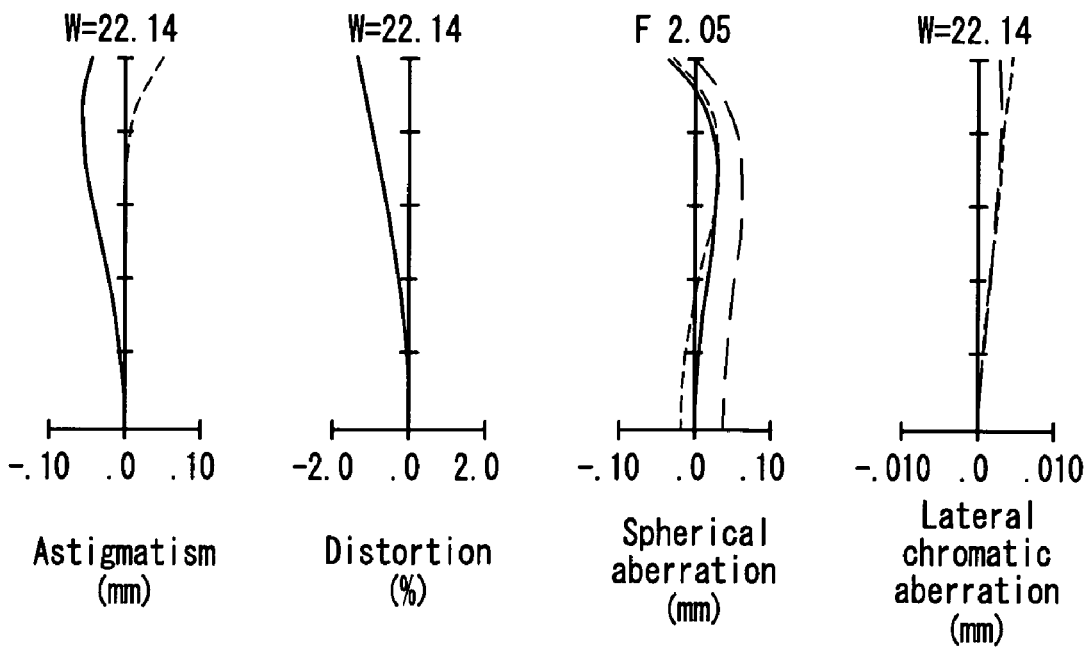
FIG. 35 shows the aberration graphs of a zoom lens at the telephoto end in Example 7 according to a first embodiment of the present invention.

FIG. 34 shows astigmatism (mm), distortion (%), spherical aberration (mm), and lateral chromatic aberration (mm) at the wide-angle end of the zoom lens according to this example. FIG. 35 shows astigmatism (mm), distortion (%), spherical aberration (mm), and lateral chromatic aberration (mm) at the telephoto end of the zoom lens according to this example.

EXAMPLE 8

Figure 36:
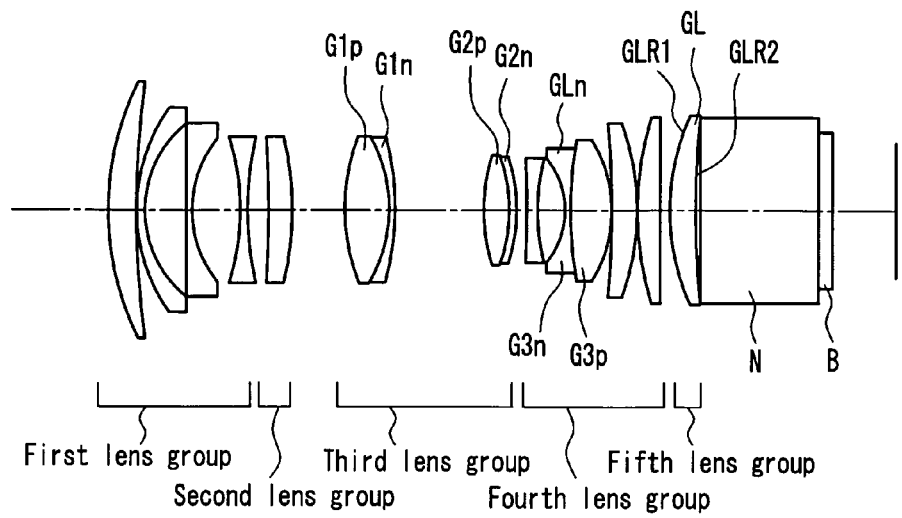
FIG. 36 shows the configuration of a zoom lens at the wide-angle end in Example 8 according to a first embodiment of the present invention.
Figure 37:
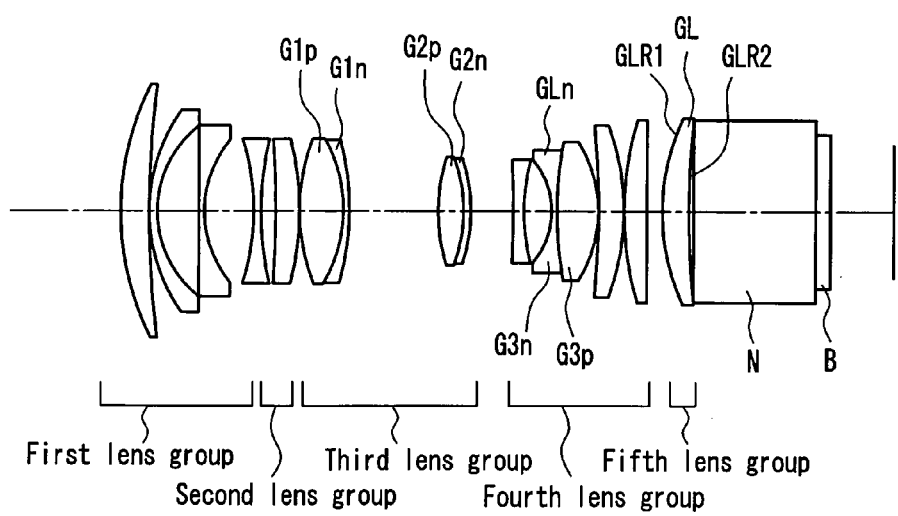
FIG. 37 shows the configuration of a zoom lens at the telephoto end in Example 8 according to a first embodiment of the present invention.

FIG. 36 shows the configuration of a zoom lens at the wide-angle end in Example 8 according to the first embodiment of the present invention. FIG. 37 shows the configuration of the zoom lens at the telephoto end in Example 8 according to the first embodiment of the present invention.

In this example, a zoom lens having an F number $F_{NO}$ of 1.7, a focal length f of 23.89 mm, and a half angle of view W of 27.81° at the wide-angle end was designed based on the configuration of the present invention so as not to cause ghosts or reduce the contrast.

Table 13 shows a specific numerical example.

TABLE 13

| | |
|---|---|
| Conditional expression (1) | (GLR1/GLnd − Bfw)/fw = −0.14481 |
| Conditional expression (2) | (GLR2 − Bfw)/fw = 9.245 |
| Conditional expression (3) | fGL/fw = 3.2819 |
| Conditional expression (4) | PgFGL − 0.6457 + 0.0017 × vdGL = 0.0137 |
| Conditional expression (5) | PgFGLn = 0.609 |

TABLE 13-continued

| | |
|---|---|
| Conditional expression (6) | (PgFGLn − PgFGL)/(vdGLn − vdGL) = −0.0037 |
| Conditional expression (7) | vdGp1 − vdGn1 = 10.6 |
| Conditional expression (8) | PgFGp1 − PgFGn1 = −0.0286 |
| Conditional expression (9) | vdGp2 − vdGn2 = 21.0 |
| Conditional expression (10) | |PgFGp2 − PgFGn2| = 0.0027 |
| Conditional expression (11) | |PgFGp3 − PgFGn3| = 0.0656 |

| Radius of curvature (mm) | Axial distance between surfaces (mm) | Refractive index (d line) | Abbe number (d line) |
|---|---|---|---|
| r1 = 54.634 | d1 = 6.5 | n1 = 1.80420 | ν1 = 46.50 |
| r2 = 179.057 | d2 = 0.2 | | |
| r3 = 36.987 | d3 = 1.6 | n2 = 1.77250 | ν2 = 49.62 |
| r4 = 22.631 | d4 = 7.7 | | |
| r5 = 204.301 | d5 = 1.5 | n3 = 1.60311 | ν3 = 60.69 |
| r6 = 24.083 | d6 = 10.0 | | |
| r7 = −39.931 | d7 = 1.4 | n4 = 1.49700 | ν4 = 81.61 |
| r8 = 65.204 | d8 = 3.8 | | |
| r9 = 304.480 | d9 = 5.0 | n5 = 1.80420 | ν5 = 46.50 |
| r10 = −70.059 | d10 = 11.0 | | |
| r11 = 41.848 | d11 = 8.4 | n6 = 1.62004 | ν6 = 36.30 |
| r12 = −34.535 | d12 = 1.0 | n7 = 1.78472 | ν7 = 25.72 |
| r13 = −73.405 | d13 = 18.4 | | |
| r14 = 61.881 | d14 = 5.0 | n8 = 1.49700 | ν8 = 81.61 |
| r15 = −26.154 | d15 = 1.0 | n9 = 1.64000 | ν9 = 60.20 |
| r16 = −42.908 | d16 = 2.2 | | |
| r17 = −136.915 | d17 = 2.0 | n10 = 1.71736 | ν10 = 29.50 |
| r18 = 46.267 | d18 = 5.6 | | |
| r19 = −18.475 | d19 = 1.0 | n11 = 1.75520 | ν11 = 27.53 |
| r20 = 67.041 | d20 = 8.1 | n12 = 1.60311 | ν12 = 60.69 |
| r21 = −26.352 | d21 = 0.2 | | |
| r22 = −229.169 | d22 = 5.4 | n13 = 1.77250 | ν13 = 49.62 |
| r23 = −49.786 | d23 = 0.2 | | |
| r24 = 65.567 | d24 = 4.4 | n14 = 1.60311 | ν14 = 60.69 |
| r25 = 0.000 | d25 = 1.3 | | |
| r26 = 50.265 | d26 = 5.5 | n15 = 1.78472 | ν15 = 25.72 |
| r27 = 252.444 | d27 = 0.8 | | |
| r28 = 0.000 | d28 = 25.0 | n16 = 1.58913 | ν16 = 61.25 |
| r29 = 0.000 | d29 = 3.0 | n17 = 1.51680 | ν17 = 64.20 |

Zoom Data

| Wide-angle end | Telephoto end |
|---|---|
| d8 = 3.8331 | 2.939 |
| d10 = 11.0122 | 0.4289 |
| d16 = 2.2131 | 8.831 |
| d25 = 1.27 | 3.0896 |

Figure 38:
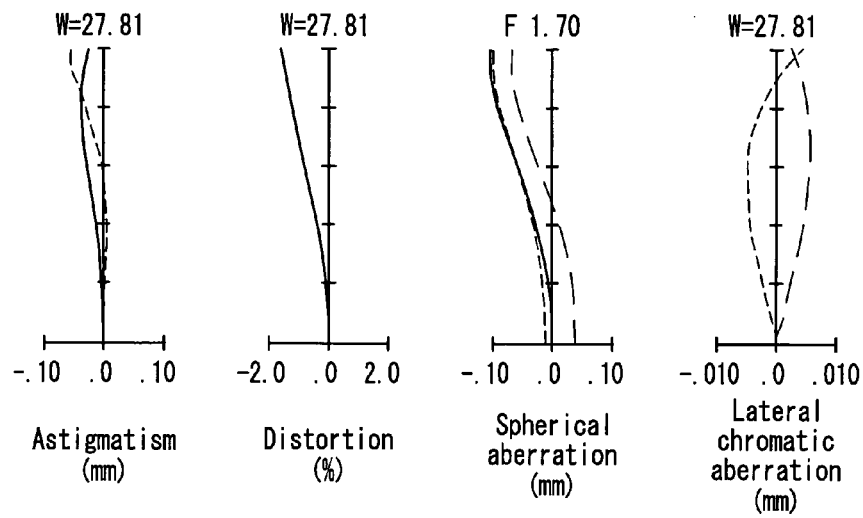
FIG. 38 shows the aberration graphs of a zoom lens at the wide-angle end in Example 8 according to a first embodiment of the present invention.
Figure 39:
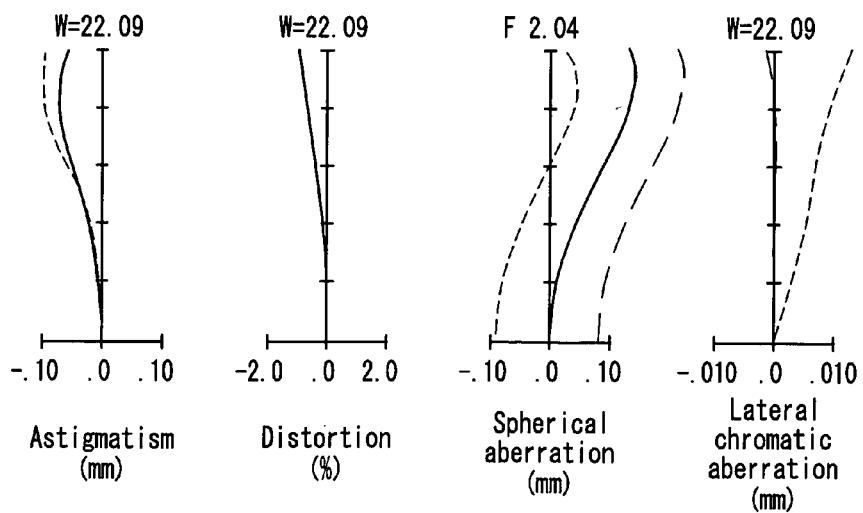
FIG. 39 shows the aberration graphs of a zoom lens at the telephoto end in Example 8 according to a first embodiment of the present invention.

FIG. 38 shows astigmatism (mm), distortion (%), spherical aberration (mm), and lateral chromatic aberration (mm) at the wide-angle end of the zoom lens according to this example. FIG. 39 shows astigmatism (mm), distortion (%), spherical aberration (mm), and lateral chromatic aberration (mm) at the telephoto end of the zoom lens according to this example.

Second Embodiment

Figure 40:
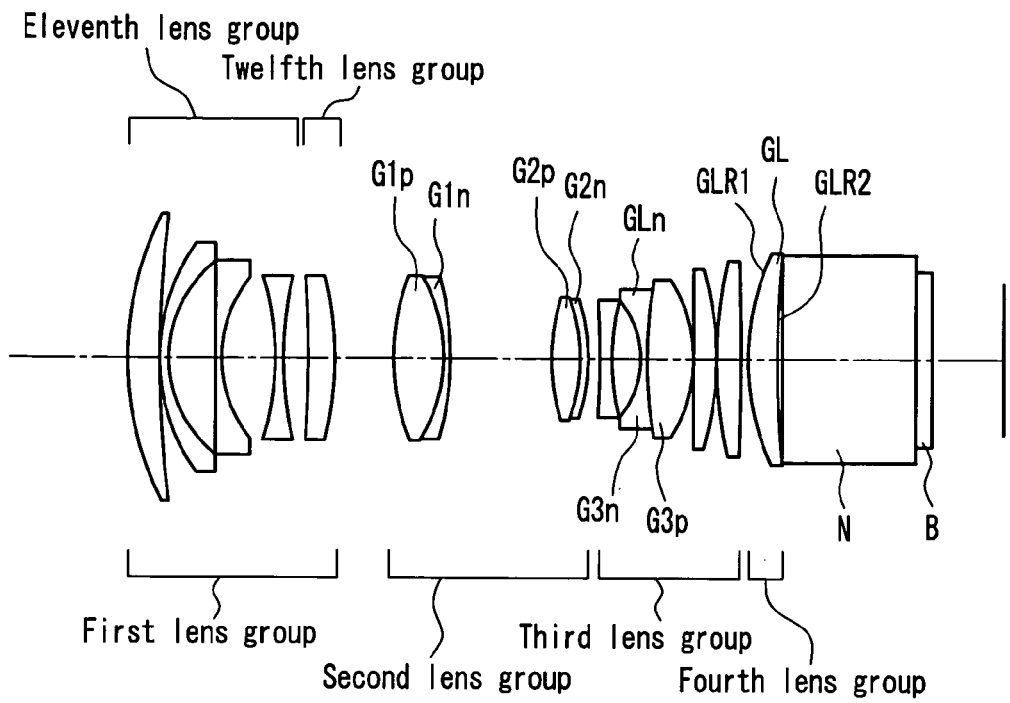
FIG. 40 shows the configuration of a zoom lens at the wide-angle end in Example 9 according to a second embodiment of the present invention.
Figure 41:
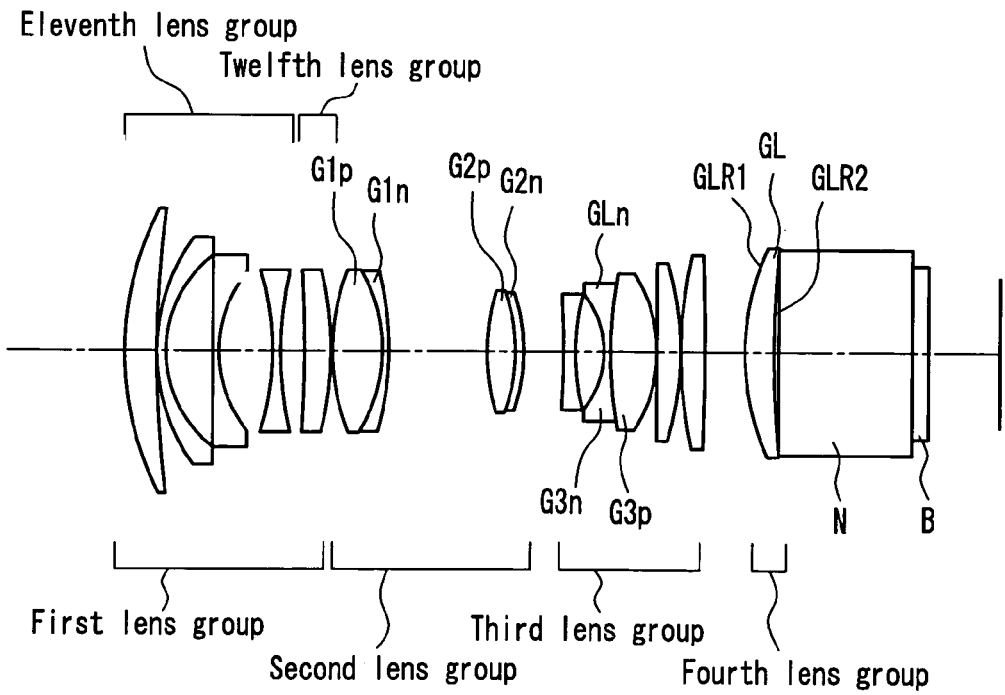
FIG. 41 shows the configuration of a zoom lens at the telephoto end in Example 9 according to a second embodiment of the present invention.

FIG. 40 shows the configuration of a zoom lens at the wide-angle end according to a second embodiment of the present invention. FIG. 41 shows the configuration of the zoom lens at the telephoto end according to the second embodiment of the present invention (FIGS. 40 and 41 also show a zoom lens in Example 9, which will be described later).

As shown in FIG. 40, the zoom lens of this embodiment includes a first lens group having a negative refractive power, a second lens group having a positive refractive power, a third lens group having a negative refractive power, and a fourth lens group having a positive refractive power (four group configuration), arranged in the indicated order from the screen side (on the left in FIG. 40). This embodiment differs from the first embodiment in that the lens configuration is changed from a five group configuration to a four group configuration. By reducing the number of lens groups, it is possible not only to simplify the configuration of the lens barrel, but also to reduce the cost of the components and the difficulty of assembling the zoom lens.

As shown in FIGS. 40 and 41, when zooming from a wide-angle end to a telephoto end, the second lens group and the third lens group are moved toward the screen along the optical axis, while the first lens group and the fourth lens group are stationary.

The first lens group includes an eleventh lens group having a negative refractive power and a twelfth lens group having a positive refractive power, arranged in the indicated order from the screen side. The eleventh lens group is composed of a positive lens, a negative lens, a negative lens, and a negative lens, arranged in the indicated order from the screen side. The twelfth lens group is composed of a single meniscus positive lens whose convex surface faces the spatial optical modulating element B. When the projection distance is changed, focusing is performed by changing a space between the eleventh lens group and the twelfth lens group (i.e., by moving some of the lenses of the first lens group). In this manner, some of the lenses of the first lens group are moved to perform focusing, so that the movement required for the focusing can be reduced, and a variation in aberration can be suppressed during focusing.

Hereinafter, a zoom lens of this embodiment will be described in more detail by way of specific examples.

EXAMPLE 9

FIG. 40 shows the configuration of a zoom lens at the wide-angle end in Example 9 according to the second embodiment of the present invention. FIG. 41 shows the configuration of the zoom lens at the telephoto end in Example 9 according to the second embodiment of the present invention.

In this example, a zoom lens having an F number $F_{NO}$ of 1.7, a focal length f of 23.92 mm, and a half angle of view W of 27.77° at the wide-angle end was designed based on the configuration of the present invention so as to realize a simple lens barrel structure.

Table 14 shows a specific numerical example.

TABLE 14

| | |
|---|---|
| Conditional expression (1) | (GLR1/GLnd − Bfw)/fw = −0.21025 |
| Conditional expression (2) | (GLR2 − Bfw)/fw = 17.4468 |
| Conditional expression (3) | fGL/fw = 2.7954 |
| Conditional expression (4) | PgFGL − 0.6457 + 0.0017 × vdGL = 0.0137 |
| Conditional expression (5) | PgFGLn = 0.609 |
| Conditional expression (6) | (PgFGLn − PgFGL)/(vdGLn − vdGL) = −0.0037 |
| Conditional expression (7) | vdGp1 − vdGn1 = 8.3 |
| Conditional expression (8) | PgFGp1 − PgFGn1 = −0.0233 |
| Conditional expression (9) | vdGp2 − vdGn2 = 29.02 |
| Conditional expression (10) | |PgFGp2 − PgFGn2| = 0.0056 |
| Conditional expression (11) | |PgFGp3 − PgFGn3| = 0.0688 |

| Radius of curvature (mm) | Axial distance between surfaces (mm) | Refractive index (d line) | Abbe number (d line) |
|---|---|---|---|
| r0 = 0.0 | d0 = 2760 | | |
| r1 = 55.793 | d1 = 6.5 | n1 = 1.80420 | v1 = 46.50 |
| r2 = 178.095 | d2 = 0.2 | | |
| r3 = 33.372 | d3 = 1.6 | n2 = 1.77250 | v2 = 49.62 |
| r4 = 22.126 | d4 = 7.7 | | |
| r5 = 148.691 | d5 = 1.5 | n3 = 1.60311 | v3 = 60.69 |
| r6 = 23.067 | d6 = 10.0 | | |
| r7 = −41.510 | d7 = 1.4 | n4 = 1.49700 | v4 = 81.61 |

TABLE 14-continued

| | | | |
|---|---|---|---|
| r8 = 109.800 | d8 = 0.0 | | |
| r9 = 0.000 | d9 = 4.8 | | |
| r10 = −125.595 | d10 = 5.0 | n5 = 1.83481 | v5 = 42.72 |
| r11 = −55.879 | d11 = 11.2 | | |
| r12 = 40.772 | d12 = 8.4 | n6 = 1.64769 | v6 = 33.84 |
| r13 = −31.187 | d13 = 1.0 | n7 = 1.80518 | v7 = 25.46 |
| r14 = −82.137 | d14 = 18.5 | | |
| r15 = 47.721 | d15 = 5.9 | n8 = 1.45650 | v8 = 90.27 |
| r16 = −26.281 | d16 = 1.0 | n9 = 1.58913 | v9 = 61.25 |
| r17 = −42.046 | d17 = 2.2 | | |
| r18 = −473.400 | d18 = 2.0 | n10 = 1.71736 | v10 = 29.50 |
| r19 = 39.296 | d19 = 5.1 | | |
| r20 = −18.150 | d20 = 1.0 | n11 = 1.75520 | v11 = 27.53 |
| r21 = 53.074 | d21 = 8.7 | n12 = 1.60311 | v12 = 60.69 |
| r22 = −25.409 | d22 = 0.2 | | |
| r23 = −358.400 | d23 = 3.7 | n13 = 1.77250 | v13 = 49.62 |
| r24 = −63.345 | d24 = 0.2 | | |
| r25 = 75.997 | d25 = 4.4 | n14 = 1.60311 | v14 = 60.69 |
| r26 = −3162.740 | d26 = 1.3 | | |
| r27 = 47.587 | d27 = 5.5 | n15 = 1.78472 | v15 = 25.72 |
| r28 = 449.074 | d28 = 0.8 | | |
| r29 = 0.000 | d29 = 25.0 | n16 = 1.58913 | v16 = 61.25 |
| r30 = 0.000 | d30 = 3.0 | n17 = 1.51680 | v17 = 64.20 |

| Zoom Data | | |
|---|---|---|
| | Wide-angle end | Telephoto end |
| d11 = | 11.1774 | 0.4289 |
| d17 = | 2.2131 | 7.153 |
| d26 = | 1.27 | 7.0796 |

| Focus Data | | |
|---|---|---|
| d0 = | 2760 | 1380 | 5470 |
| d8 = | 0.0 | 0.19 | −0.11 |

Figure 42:
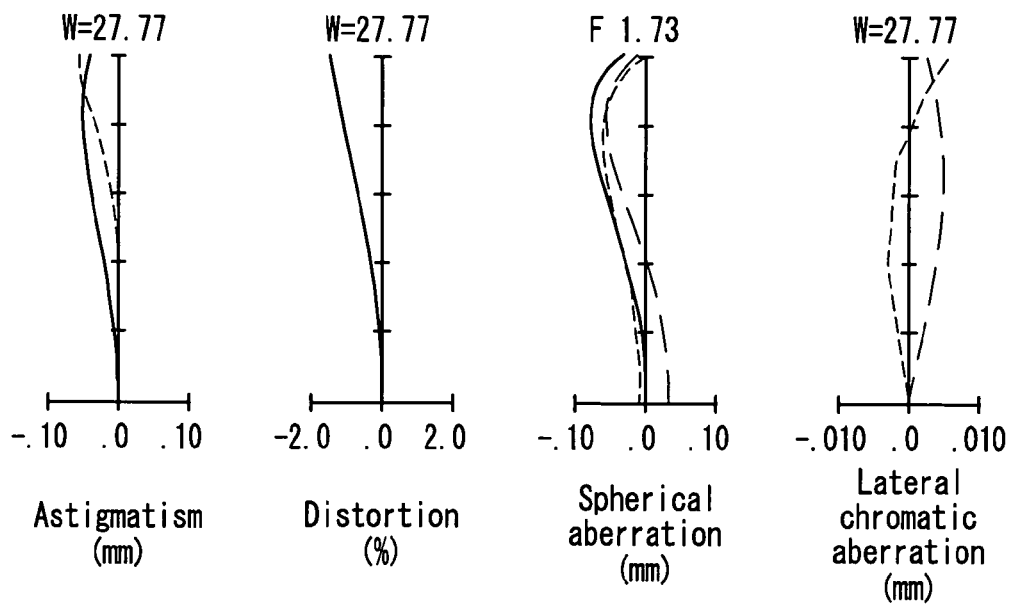
FIG. 42 shows the aberration graphs of a zoom lens at the wide-angle end in Example 9 according to a second embodiment of the present invention.
Figure 43:
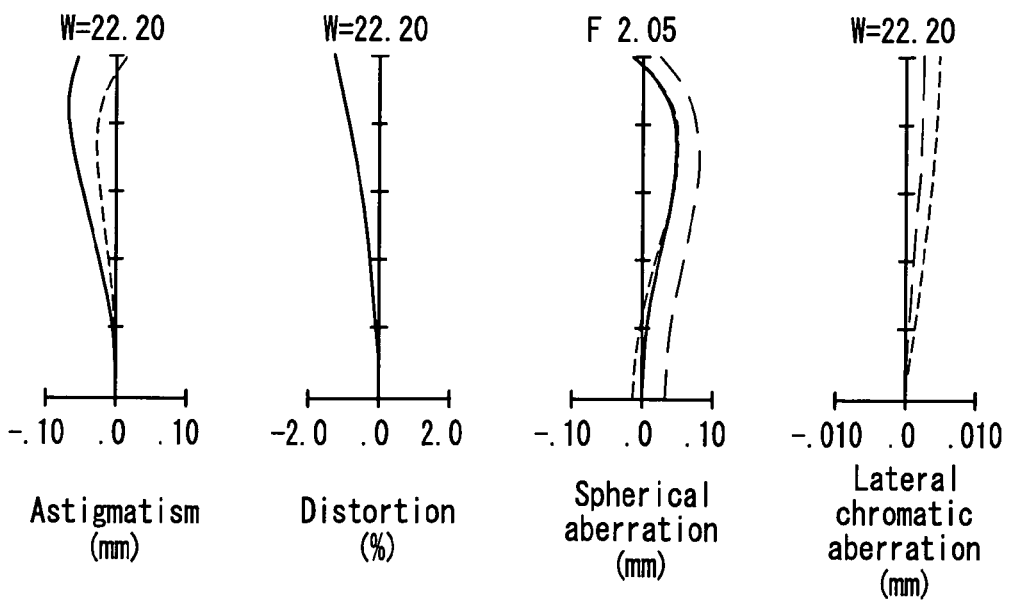
FIG. 43 shows the aberration graphs of a zoom lens at the telephoto end in Example 9 according to a second embodiment of the present invention.

FIG. 42 shows astigmatism (mm), distortion (%), spherical aberration (mm), and lateral chromatic aberration (mm) at the wide-angle end of the zoom lens according to this example. FIG. 43 shows astigmatism (mm), distortion (%), spherical aberration (mm), and lateral chromatic aberration (mm) at the telephoto end of the zoom lens according to this example.

Third Embodiment

Figure 44:
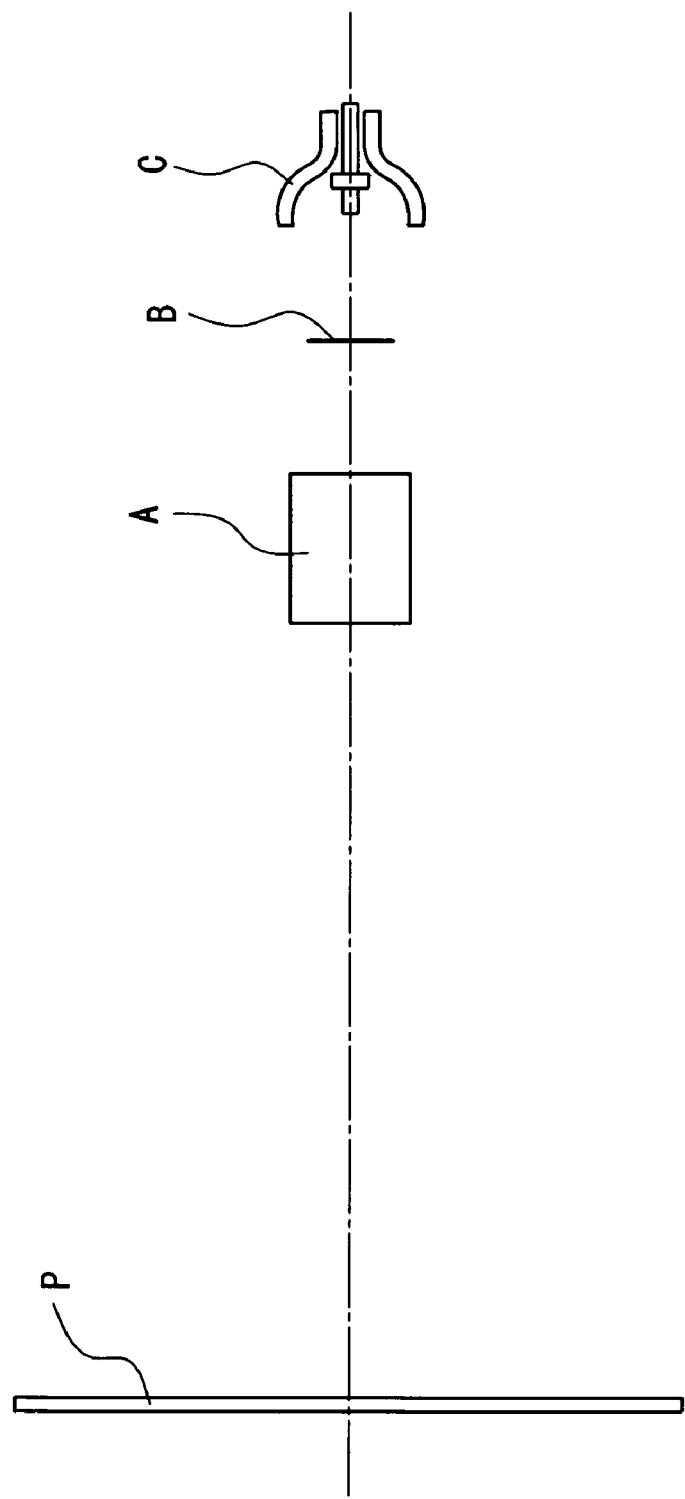
FIG. 44 shows the schematic configuration of an image magnification projection system according to a third embodiment of the present invention.

FIG. 44 shows the schematic configuration of an image magnification projection system according to a third embodiment of the present invention.

As shown in FIG. 44, the image magnification projection system of this embodiment includes a light source C, a spatial optical modulating element B that is illuminated with light emitted from the light source C and forms an optical image, and a projection lens A as projection means for projecting the optical image formed on the spatial optical modulating element B. In this case, the zoom lens of the first embodiment is used as the projection lens A. In FIG. 44, P denotes a focus plane of an image projected by the image magnification projection system.

In the image magnification projection system of this embodiment, the optical image formed on the spatial optical modulating element B that is illuminated by the light source C is magnified and projected onto the focus plane P by the projection lens A. The image magnification projection system uses the zoom lens of the first embodiment as the projection lens A and thus can project an image while reducing unnecessary light. Accordingly, it is possible to realize the image magnification projection system that is capable of obtaining a projected image in which ghosts and a reduction in contrast are suppressed.

In this embodiment, the zoom lens of the first embodiment is used as the projection lens A. However, the zoom lens of the second embodiment may be used as the projection lens A.

Fourth Embodiment

Figure 45:
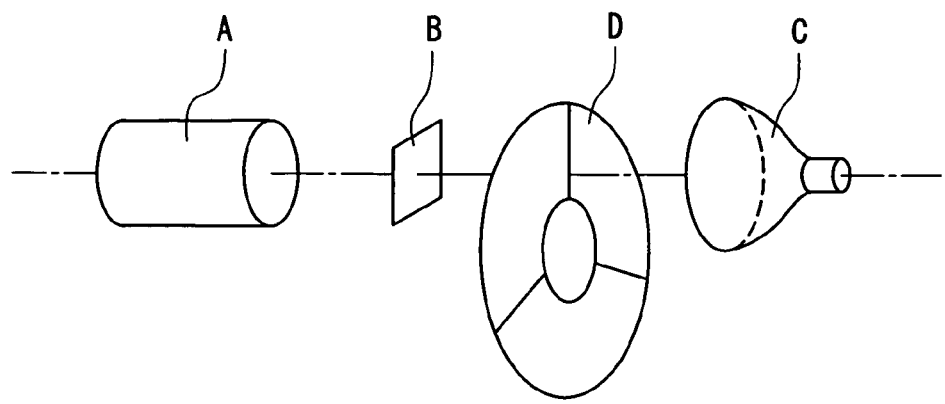
FIG. 45 shows the schematic configuration of a video projector according to a fourth embodiment of the present invention.

FIG. 45 shows the schematic configuration of a video projector according to a fourth embodiment of the present invention.

As shown in FIG. 45, the video projector of this embodiment includes a light source C, a means D for temporally restricting light from the light source C to three colors of blue, green and red by rotating a filter that corresponds to R, G and B, a spatial optical modulating element B that is illuminated with light emitted from the light source C and forms optical images corresponding to the three colors of blue, green and red that are changed temporally, and a projection lens A as projection means for projecting the optical images formed on the spatial optical modulating element B. In this case, the zoom lens of the first embodiment is used as the projection lens A.

In the video projector of this embodiment, the light from the light source C is temporally separated into three colors of blue, green and red by the means D, and then illuminates the spatial optical modulating element B. The three types of optical images of blue, green and red are temporally separated and formed on the spatial optical modulating element B, and magnified and projected by the projection lens A. The video projector of this embodiment uses the projection lens of the first embodiment as the projection lens A and thus can correct the lateral chromatic aberration favorably, so that the three color images of blue, green and red can be superimposed on the screen without deviating from one another. Accordingly, it is possible to realize the video projector that is capable of obtaining a bright and high-definition image.

In this embodiment, the zoom lens of the first embodiment is used as the projection lens A. However, the zoom lens of the second embodiment may be used as the projection lens A.

Fifth Embodiment

Figure 46:
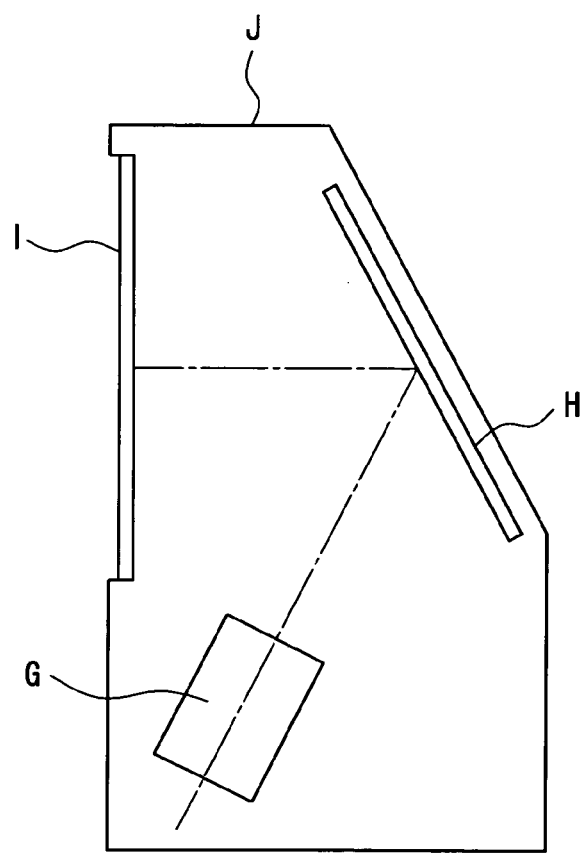
FIG. 46 shows the schematic configuration of a rear projector according to a fifth embodiment of the present invention.

FIG. 46 shows the schematic configuration of a rear projector according to a fifth embodiment of the present invention.

As shown in FIG. 46, the rear projector of this embodiment includes the video projector G of the fourth embodiment, a mirror H for bending light projected by the projection lens A (see FIG. 45) as projection means in the video projector G, and a transmission-type screen I for displaying an image of the light bent by the mirror H. In FIG. 46, J denotes a cabinet for housing the rear projector.

In the rear projector of this embodiment, an image projected from the video projector G is reflected from the mirror H, and the image is formed on the transmission-type screen I. By using the video projector of the fourth embodiment as the video projector G, it is possible to realize the rear projector that is capable of obtaining a high-definition image.

Sixth Embodiment

Figure 47:
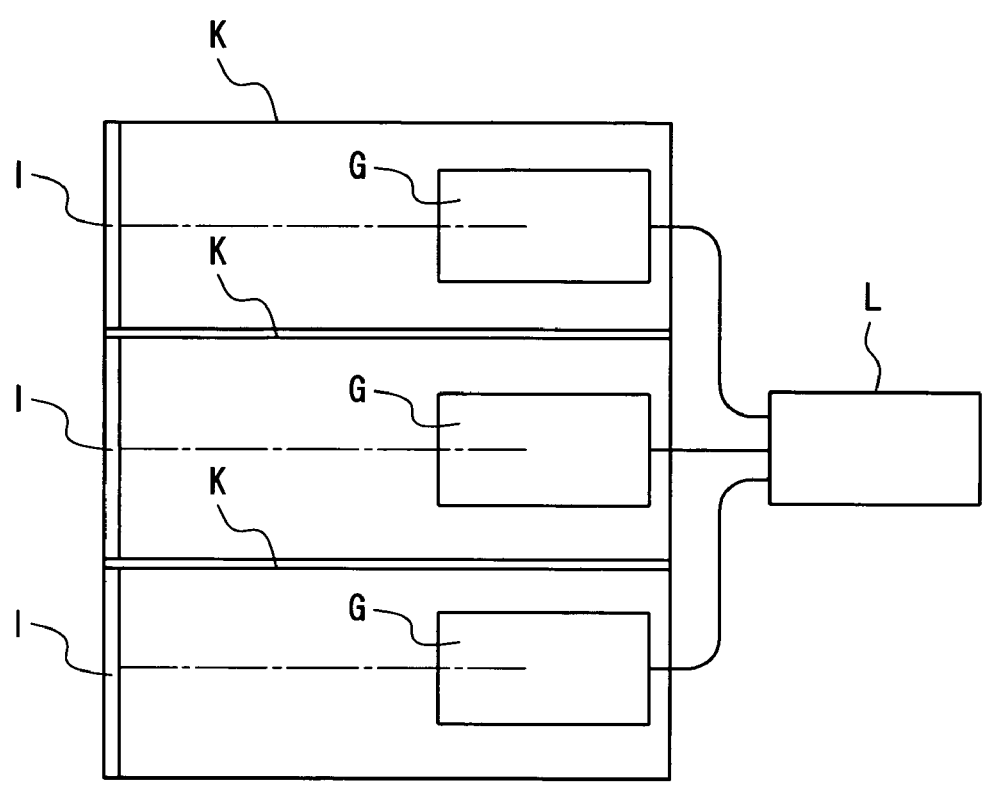
FIG. 47 shows the schematic configuration of a multi-vision system according to a sixth embodiment of the present invention.

FIG. 47 shows the schematic configuration of a multi-vision system according to a sixth embodiment of the present invention.

As shown in FIG. 47, the multi-vision system of this embodiment includes a plurality of systems, each of which includes the video projector G of the fourth embodiment, a transmission-type screen I for displaying an image of light projected by the projection lens A (see FIG. 45) as projection means in the video projector G, and a cabinet K, and an image dividing circuit L for dividing an image signal, and sending the divided image signal to each of the video projectors G.

In the multi-vision system of this embodiment, the image signal is processed and divided by the image dividing circuit L, and then is sent to each of the video projectors G. The images projected by the individual video projectors G are formed on the transmission-type screens I. The multi-vision system of this embodiment uses the video projector of the fourth embodiment as the video projector G and thus can correct the distortion favorably, so that portions joining the images from the video projectors coincide exactly. Accordingly, it is possible to realize the multi-vision system that is capable of obtaining a high-definition projected image.

The invention claimed is:

1. A zoom lens used as a projection lens of a projector in which a prism is located between the projection lens and a spatial optical modulating element,
   wherein a lens closest to the spatial optical modulating element is a meniscus positive lens whose convex surface faces a screen, and a refractive index of the meniscus positive lens is 1.75 or more, and
   wherein the following conditional expressions (1) and (2) are satisfied:

$$-0.3 < (GLR1/GLnd - Bfw)/fw < -0.05 \quad (1)$$

$$2.5 < fGL/fw < 3.5 \quad (2)$$

where GLR1 is a radius of curvature of a surface of the lens closest to the spatial optical modulating element, the surface facing the screen, GLnd is a refractive index at the d-line of the lens, Bfw is a air equivalent back focus of the zoom lens at a wide-angle end, and fw is a focal length of an entire zoom lens system at the wide-angle end, and fGL is a focal length of the lens closest to the spatial optical modulating element.

2. The zoom lens according to claim 1, wherein the following conditional expression (3) is satisfied:

$$5 < (GLR2 - Bfw)/fw \quad (3)$$

where GLR2 is a radius of curvature of a surface of the lens closest to the spatial optical modulating element, the surface facing the spatial optical modulating element.

3. The zoom lens according to claim 1, wherein an Abbe number of the lens closest to the spatial optical modulating element is 30 or less.

4. The zoom lens according to claim 1, wherein the following conditional expression (4) is satisfied:

$$0.01 < PgFGL - 0.6457 + 0.0017 \times vdGL \quad (4)$$

where PgFGL is a partial dispersion of the lens closest to the spatial optical modulating element, and vdGL is an Abbe number of the lens.

5. The zoom lens according to claim 1, wherein the following conditional expressions (5) and (6) are satisfied:

$$PgFGLn < 0.61 \quad (5)$$

$$(PgFGLn - PgFGL)/(vdGLn - vdGL) < -0.0027 \quad (6)$$

where PgFGLn is a partial dispersion of a negative lens closest to the spatial optical modulating element, vdGLn is an Abbe number of the negative lens, PgFGL is a partial dispersion of the lens closest to the spatial optical modulating element, and vdGL is an Abbe number of the lens.

6. An image magnification projection system comprising:
a light source;
a spatial optical modulating element that is illuminated with light emitted from the light source and forms an optical image; and
a projection means for projecting the optical image formed on the spatial optical modulating element,
wherein the zoom lens according to claim 1 is used as the projection means.

7. A video projector comprising:
a light source;
a means for temporally restricting light from the light source to three colors of blue, green and red;
a spatial optical modulating element that is illuminated with light emitted from the light source and forms optical images corresponding to the three colors of blue, green and red that are changed temporally; and
a projection means for projecting the optical images formed on the spatial optical modulating element, wherein the zoom lens according to claim 1 is used as the projection means.

8. A rear projector comprising:
the video projector according to claim 7;
a mirror for bending light projected by the projection means; and
a transmission-type screen for displaying an image of the light bent by the mirror.

9. A multi-vision system comprising:
a plurality of systems, each of which comprises the video projector according to claim 7, a transmission-type screen for displaying an image of light projected by the projection means, and a cabinet, and
an image dividing circuit for dividing an image signal, and sending the divided image signal to each of the video projectors.

* * * * *